United States Patent
Goren et al.

(10) Patent No.: US 12,282,118 B2
(45) Date of Patent: Apr. 22, 2025

(54) MULTIPLE SIMULTANEOUS LASER BEAM EMISSION AND ILLUMINATION WHILE ENSURING EYE SAFETY

(71) Applicant: INNOVIZ TECHNOLOGIES LTD., Rosh Ha'Ayin (IL)

(72) Inventors: Nir Goren, Herut (IL); Ronen Eshel, Herzliya (IL)

(73) Assignee: Innoviz Technologies Ltd., Rosh HaAyin (IL)

(*) Notice: Subject to any disclaimer, the term of this patent is extended or adjusted under 35 U.S.C. 154(b) by 0 days.

(21) Appl. No.: 18/340,386

(22) Filed: Jun. 23, 2023

(65) Prior Publication Data
US 2023/0350026 A1 Nov. 2, 2023

Related U.S. Application Data

(63) Continuation of application No. 17/668,008, filed on Feb. 9, 2022, now Pat. No. 11,726,181, which is a continuation of application No. PCT/IB2021/000581, filed on Aug. 24, 2021.

(60) Provisional application No. 63/077,933, filed on Sep. 14, 2020, provisional application No. 63/069,403, filed on Aug. 24, 2020.

(51) Int. Cl.
*G01S 7/48* (2006.01)
*G01S 7/481* (2006.01)
*G01S 17/931* (2020.01)

(52) U.S. Cl.
CPC .......... *G01S 7/4815* (2013.01); *G01S 7/4817* (2013.01); *G01S 17/931* (2020.01)

(58) Field of Classification Search
USPC ....................................................... 356/5.01
See application file for complete search history.

(56) References Cited

U.S. PATENT DOCUMENTS

| 10,627,516 B2 | 4/2020 | Eichenholz |
| 11,016,178 B2 | 5/2021 | Donovan |
| 11,726,181 B2 * | 8/2023 | Goren ................... G01S 7/4817 356/5.01 |
| 2004/0119957 A1 | 6/2004 | Renwick et al. |

(Continued)

FOREIGN PATENT DOCUMENTS

| CN | 110398724 A | 11/2019 |
| CN | 112955776 A * | 6/2021 ............. G01S 17/10 |

(Continued)

OTHER PUBLICATIONS

International Search Report and Written Opinion in International Application No. PCT/IB2021/000581 dated Dec. 10, 2021 (11 pages).

Primary Examiner — James R Hulka

(57) ABSTRACT

A LIDAR system is disclosed. The system may include a laser light projection system that may simultaneously provide at least two laser light beams. The system may also include an optical system, including one or more deflectors to project the at least two laser light beams toward a field of view of the LIDAR system. Each of the laser light beams may have an energy density below an eye safe level. However, a total combined energy density of the laser light beams may exceed an eye safe level. The laser light beams may be projected from the deflector are spaced apart from one another by an angular spacing ranging from 2.5 mrad to 6 mrad.

17 Claims, 33 Drawing Sheets

(56) References Cited

U.S. PATENT DOCUMENTS

| | | |
|---|---|---|
| 2008/0297360 A1 | 12/2008 | Knox et al. |
| 2017/0146454 A1 | 5/2017 | Knox et al. |
| 2017/0307736 A1 | 10/2017 | Donovan |
| 2017/0322015 A1 | 11/2017 | Knüttel |
| 2018/0081037 A1 | 3/2018 | Medina et al. |
| 2018/0081038 A1 | 3/2018 | Medina et al. |
| 2018/0100928 A1 | 4/2018 | Keilaf et al. |
| 2018/0113216 A1 | 4/2018 | Kremer et al. |
| 2018/0259623 A1 | 9/2018 | Donovan |
| 2019/0317217 A1 | 10/2019 | Day et al. |
| 2019/0318177 A1 | 10/2019 | Steinberg et al. |
| 2020/0025923 A1 | 1/2020 | Eichenholz |
| 2020/0142040 A1 | 5/2020 | Pardhan et al. |
| 2020/0200874 A1 | 6/2020 | Donovan |
| 2020/0249324 A1 | 8/2020 | Steinberg et al. |
| 2020/0249349 A1 | 8/2020 | Steinberg |
| 2020/0249354 A1 | 8/2020 | Yeruhami et al. |
| 2021/0389467 A1 * | 12/2021 | Eshel ............... G01S 17/931 |
| 2022/0171031 A1 * | 6/2022 | Goren ............... G01S 17/931 |

FOREIGN PATENT DOCUMENTS

| | | | |
|---|---|---|---|
| KR | 10-2019-0049871 A | 5/2019 | |
| WO | WO-2017184336 A2 * | 10/2017 | ............ B60W 40/02 |
| WO | WO-2018127789 A1 * | 7/2018 | ............... A01C 5/04 |
| WO | WO-2018169758 A1 * | 9/2018 | ............. G01S 17/89 |
| WO | WO-2019064062 A1 * | 4/2019 | ................ B60S 1/02 |
| WO | WO-2020148567 A2 * | 7/2020 | .......... B60Q 1/0023 |
| WO | WO-2021040250 A1 * | 3/2021 | ............. G01S 17/08 |
| WO | 2022/043749 A1 | 3/2022 | |
| WO | WO-2022053874 A2 * | 3/2022 | ............. G01S 17/06 |

* cited by examiner

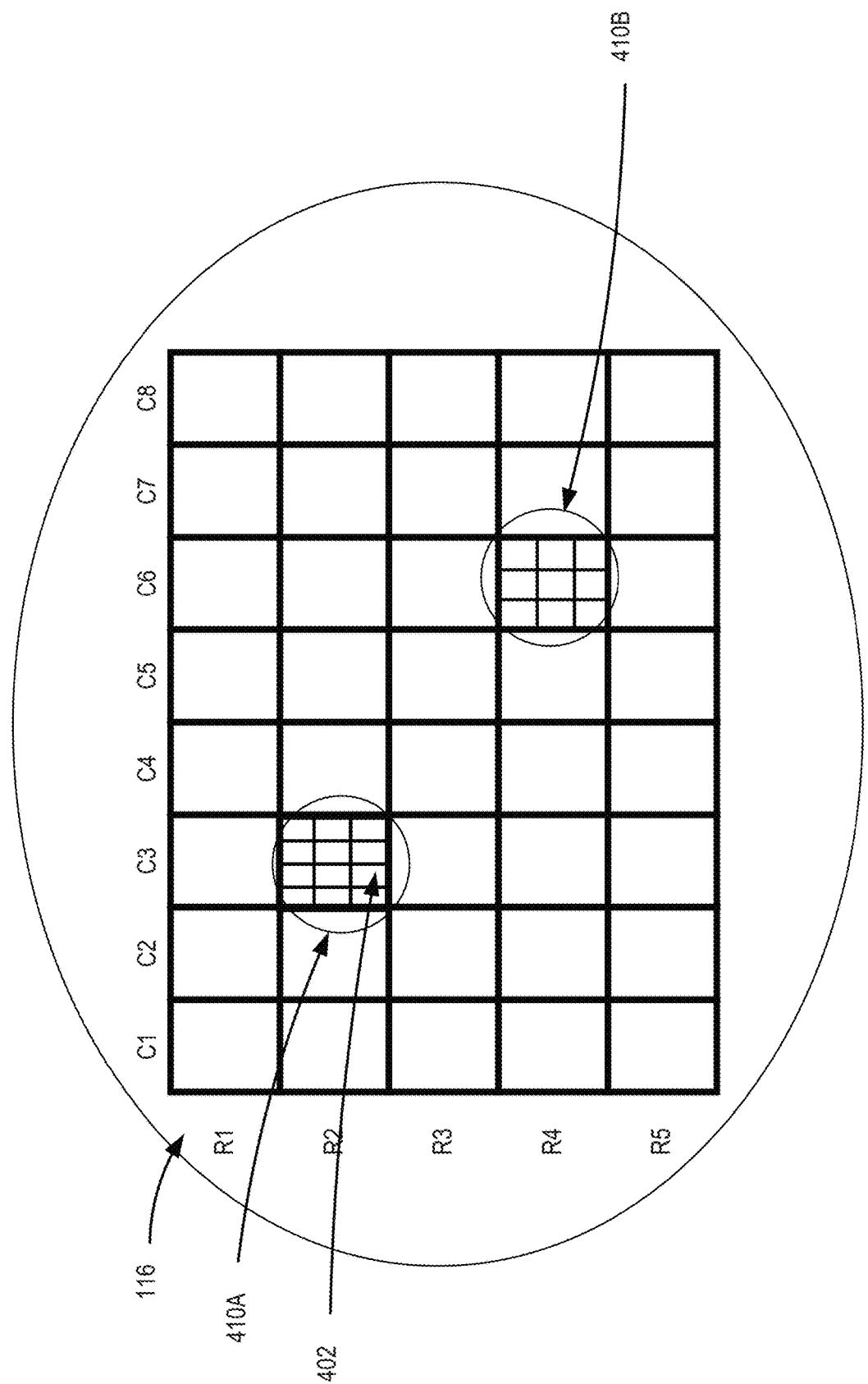

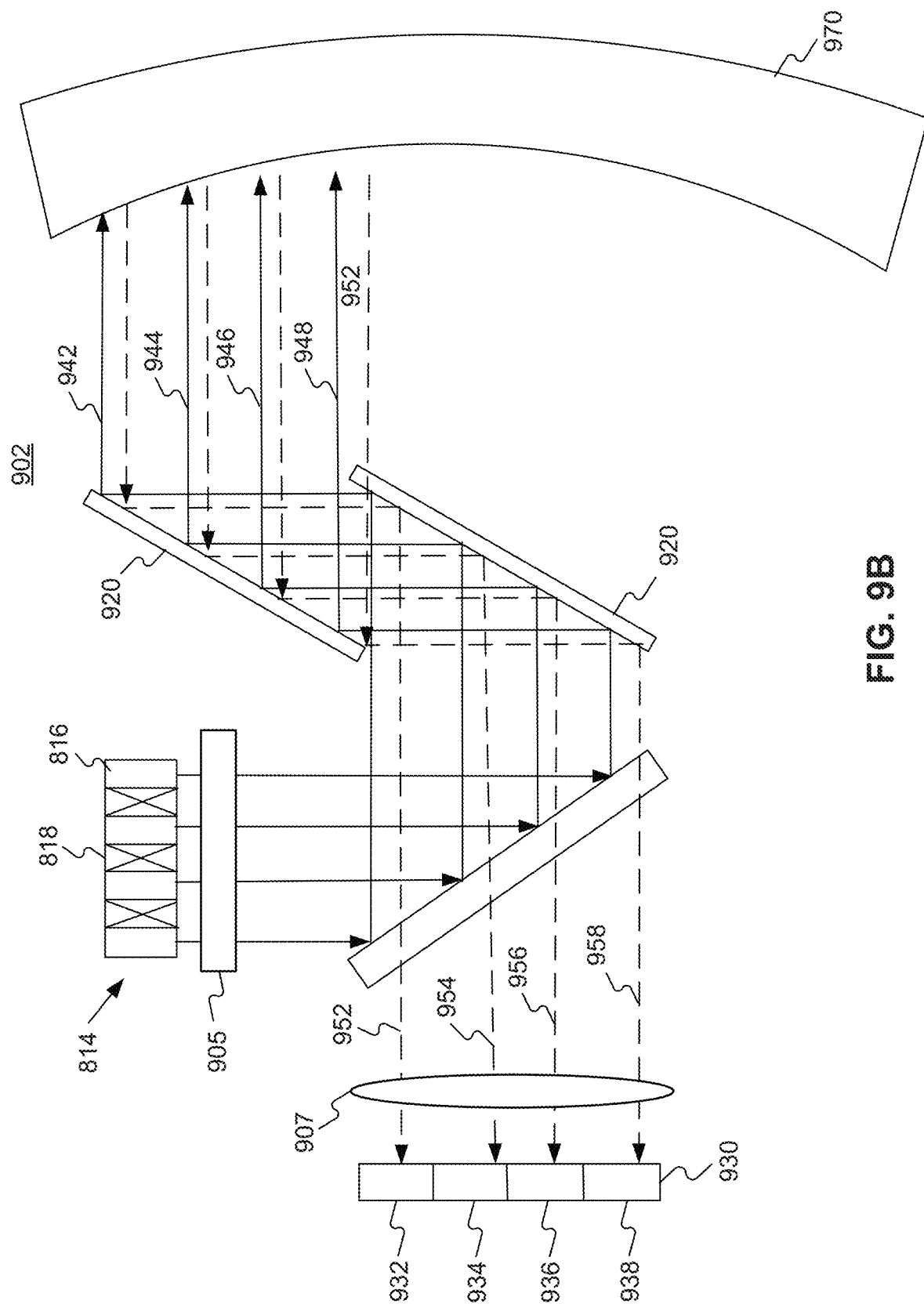

MULTIPLE SIMULTANEOUS LASER BEAM EMISSION AND ILLUMINATION WHILE ENSURING EYE SAFETY

CROSS REFERENCE TO RELATED APPLICATION

The present application is a continuation of and claims priority to U.S. application Ser. No. 17/668,008, filed on Feb. 9, 2022, which is a continuation of and claims priority to International Application No. PCT/IB2021/000581, filed on Aug. 24, 2021, which claims priority to U.S. Provisional Patent Application No. 63/069,403 filed Aug. 24, 2020 and U.S. Provisional Patent Application No. 63/077,933 filed Sep. 14, 2020, the contents of all of which are incorporated herein by reference in their entirety.

BACKGROUND

I. Technical Field

The present disclosure relates generally to technology for scanning a surrounding environment and, for example, to systems and methods that use LIDAR technology to detect objects in the surrounding environment.

II. Background Information

With the advent of driver assist systems and autonomous vehicles, automobiles need to be equipped with systems capable of reliably sensing and interpreting their surroundings, including identifying obstacles, hazards, objects, and other physical parameters that might impact navigation of the vehicle. To this end, a number of differing technologies have been suggested including radar, LIDAR, camera-based systems, operating alone or in a redundant manner.

One consideration with driver assistance systems and autonomous vehicles is an ability of the system to determine surroundings across different conditions including, rain, fog, darkness, bright light, and snow. A light detection and ranging system, (LIDAR a/k/a LADAR) is an example of technology that can work well in differing conditions, by measuring distances to objects by illuminating objects with light and measuring the reflected pulses with a sensor. A laser is one example of a light source that can be used in a LIDAR system. An electro-optical system such as a LIDAR system may include a light deflector for projecting light emitted by a light source into the environment of the electro-optical system. The light deflector may be controlled to pivot around at least one axis for projecting the light into a desired location in the field of view of the electro-optical system. It may be desirable to design improved systems and methods for determining the position and/or orientation of the light deflector for controlling and/or monitoring the movement of the light deflector with precision.

The systems and methods of the present disclosure are directed towards improving performance of monitoring the position and/or orientation of a light deflector used in electro-optical systems.

SUMMARY

In one aspect, a LIDAR system may include a laser light projection system configured to simultaneously provide at least two laser light beams; and an optical system, including one or more deflectors configured to project the at least two laser light beams toward a field of view of the LIDAR system. Each of the at least two laser light beams may have an energy density below an eye safe level. But a total combined energy density of the at least two laser light beams may be above an eye safe level. The at least two laser light beams may be projected toward the field of view such that chief rays associated with the at least two laser light beams are spaced apart from one another by at least 7 mm.

In another aspect, a LIDAR system may include a laser light projection system configured to simultaneously project at least two laser light beams; and a deflector configured to project the at least two laser light beams toward a field of view of the LIDAR system. Each of the at least two laser light beams may have an energy density below an eye safe level. But a total combined energy density of the at least two laser light beams may be above an eye safe level. The at least two laser light beams projected from the deflector may be separated from one another by an angular spacing of at least 5 mrad (milli-radian).

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIGS. 4A, 4B, 4C, 4D, and 4E are diagrams illustrating different configurations of sensing units in accordance with some embodiments of the present disclosure.

FIGS. 9A-9C are diagrams illustrating exemplary LIDAR systems in accordance with some embodiments of the present disclosure.

DETAILED DESCRIPTION

Figure 1A:
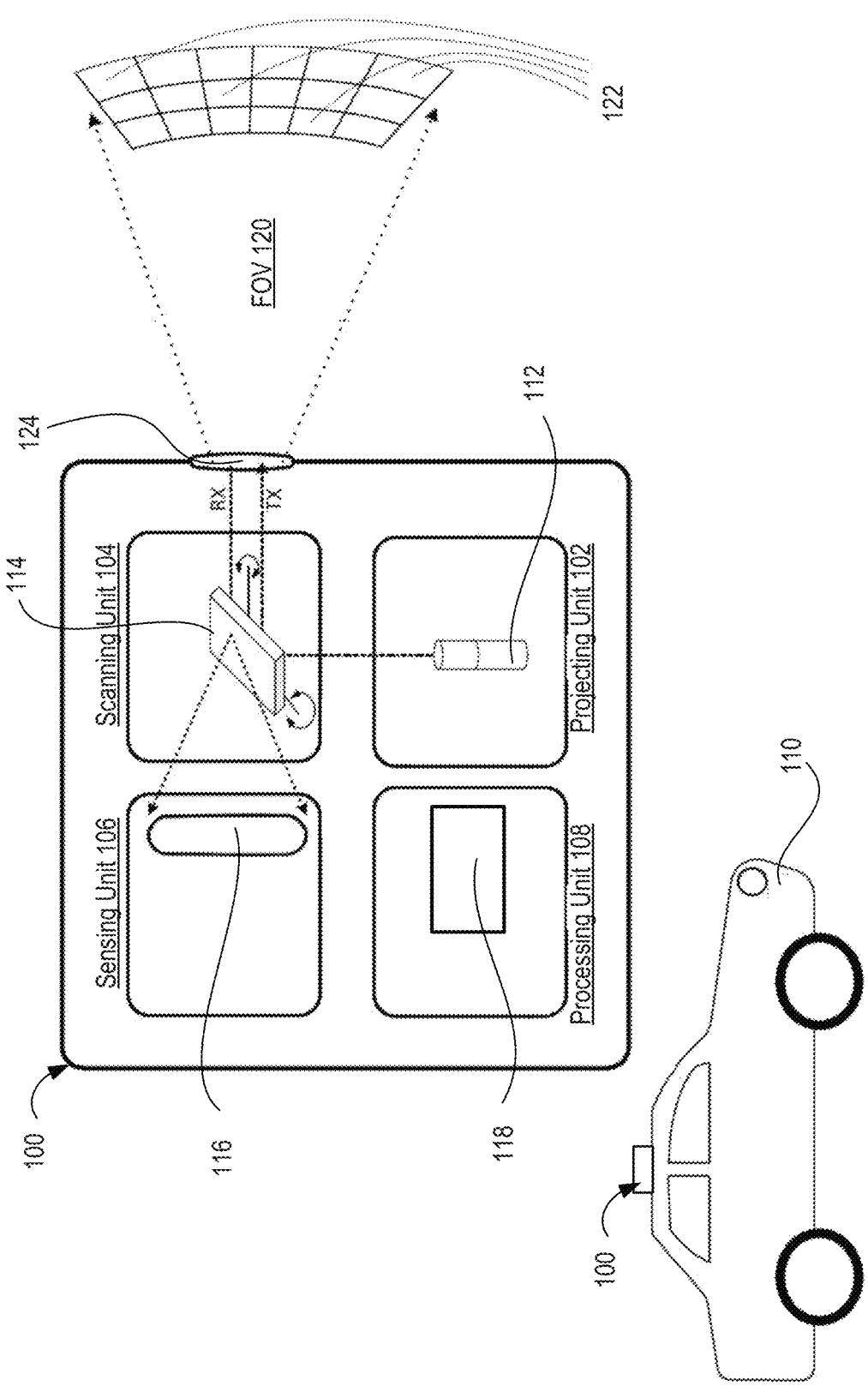
FIG. 1A is a diagram illustrating an exemplary LIDAR system consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Terms Definitions

Disclosed embodiments may involve an optical system. As used herein, the term "optical system" broadly includes any system that is used for the generation, detection and/or manipulation of light. By way of example only, an optical system may include one or more optical components for generating, detecting and/or manipulating light. For example, light sources, lenses, mirrors, prisms, beam splitters, collimators, polarizing optics, optical modulators, optical switches, optical amplifiers, optical detectors, optical sensors, fiber optics, semiconductor optic components, while each not necessarily required, may each be part of an optical system. In addition to the one or more optical components, an optical system may also include other non-optical components such as electrical components, mechanical components, chemical reaction components, and semiconductor components. The non-optical components may cooperate with optical components of the optical system. For example, the optical system may include at least one processor for analyzing detected light.

Consistent with the present disclosure, the optical system may be a LIDAR system. As used herein, the term "LIDAR system" broadly includes any system which can determine values of parameters indicative of a distance between a pair of tangible objects based on reflected light. In one embodiment, the LIDAR system may determine a distance between a pair of tangible objects based on reflections of light emitted by the LIDAR system. As used herein, the term "determine distances" broadly includes generating outputs which are indicative of distances between pairs of tangible objects. The determined distance may represent the physical dimension between a pair of tangible objects. By way of example only, the determined distance may include a line of flight distance between the LIDAR system and another tangible object in a field of view of the LIDAR system. In another embodiment, the LIDAR system may determine the relative velocity between a pair of tangible objects based on reflections of light emitted by the LIDAR system. Examples of outputs indicative of the distance between a pair of tangible objects include: a number of standard length units between the tangible objects (e.g. number of meters, number of inches, number of kilometers, number of millimeters), a number of arbitrary length units (e.g. number of LIDAR system lengths), a ratio between the distance to another length (e.g. a ratio to a length of an object detected in a field of view of the LIDAR system), an amount of time (e.g. given as standard unit, arbitrary units or ratio, for example, the time it takes light to travel between the tangible objects), one or more locations (e.g. specified using an agreed coordinate system, specified in relation to a known location), and more.

The LIDAR system may determine the distance between a pair of tangible objects based on reflected light. In one embodiment, the LIDAR system may process detection results of a sensor which creates temporal information indicative of a period of time between the emission of a light signal and the time of its detection by the sensor. The period of time is occasionally referred to as "time of flight" of the light signal. In one example, the light signal may be a short pulse, whose rise and/or fall time may be detected in reception. Using known information about the speed of light in the relevant medium (usually air), the information regarding the time of flight of the light signal can be processed to provide the distance the light signal traveled between emission and detection. In another embodiment, the LIDAR system may determine the distance based on frequency phase-shift (or multiple frequency phase-shift). Specifically, the LIDAR system may process information indicative of one or more modulation phase shifts (e.g. by solving some simultaneous equations to give a final measure) of the light signal. For example, the emitted optical signal may be modulated with one or more constant frequencies. The at least one phase shift of the modulation between the emitted signal and the detected reflection may be indicative of the distance the light traveled between emission and detection. The modulation may be applied to a continuous wave light signal, to a quasi-continuous wave light signal, or to another type of emitted light signal. It is noted that additional information may be used by the LIDAR system for determining the distance, e.g. location information (e.g. relative positions) between the projection location, the detection location of the signal (especially if distanced from one another), and more.

In some embodiments, the LIDAR system may be used for detecting a plurality of objects in an environment of the LIDAR system. The term "detecting an object in an environment of the LIDAR system" broadly includes generating information which is indicative of an object that reflected light toward a detector associated with the LIDAR system. The dimensions of the environment in which the LIDAR system detects objects may vary with respect to implementation. For example, the LIDAR system may be used for detecting a plurality of objects in an environment of a vehicle on which the LIDAR system is installed, up to a horizontal distance of 100 m (or 200 m, 300 m, etc.), and up to a vertical distance of 10 m (or 25 m, 50 m, etc.). In another example, the LIDAR system may be used for detecting a plurality of objects in an environment of a vehicle or within a predefined horizontal range (e.g., 25°, 50°, 100°, 180°, etc.), and up to a predefined vertical elevation (e.g., ±10°, ±20°, +40°-20°, ±90° or 0°-90°.

As used herein, the term "detecting an object" may broadly refer to determining an existence of the object (e.g., an object may exist in a certain direction with respect to the LIDAR system and/or to another reference location, or an object may exist in a certain spatial volume). Additionally or alternatively, the term "detecting an object" may refer to determining a distance between the object and another location (e.g. a location of the LIDAR system, a location on earth, or a location of another object). Additionally or alternatively, the term "detecting an object" may refer to identifying the object (e.g. classifying a type of object such as car, plant, tree, road; recognizing a specific object (e.g., the Washington Monument); determining a license plate number; determining a composition of an object (e.g., solid, liquid, transparent, semitransparent); determining a kinematic parameter of an object (e.g., whether it is moving, its velocity, its movement direction, expansion of the object). Additionally or alternatively, the term "detecting an object" may refer to generating a point cloud map in which every point of one or more points of the point cloud map correspond to a location in the object or a location on a face thereof. In one embodiment, the data resolution associated with the point cloud map representation of the field of view may be associated with 0.1°×0.1° or 0.3°×0.3° of the field of view.

Consistent with the present disclosure, the term "object" broadly includes a finite composition of matter that may reflect light from at least a portion thereof. For example, an object may be at least partially solid (e.g. cars, trees); at least partially liquid (e.g. puddles on the road, rain); at least partly gaseous (e.g. fumes, clouds); made from a multitude of distinct particles (e.g. sand storm, fog, spray); and may be of one or more scales of magnitude, such as ~1 millimeter (mm), ~5 mm, ~10 mm, ~50 mm, ~100 mm, ~500 mm, ~1 meter (m), ~5 m, ~10 m, ~50 m, ~100 m, and so on. Smaller or larger objects, as well as any size in between those examples, may also be detected. It is noted that for various reasons, the LIDAR system may detect only part of the object. For example, in some cases, light may be reflected from only some sides of the object (e.g., only the side opposing the LIDAR system will be detected); in other cases, light may be projected on only part of the object (e.g. laser beam projected onto a road or a building); in other cases, the object may be partly blocked by another object between the LIDAR system and the detected object; in other cases, the LIDAR's sensor may only detects light reflected from a portion of the object, e.g., because ambient light or other interferences interfere with detection of some portions of the object.

Consistent with the present disclosure, a LIDAR system may be configured to detect objects by scanning the environment of LIDAR system. The term "scanning the environment of LIDAR system" broadly includes illuminating the field of view or a portion of the field of view of the LIDAR system. In one example, scanning the environment of LIDAR system may be achieved by moving or pivoting a light deflector to deflect light in differing directions toward different parts of the field of view. In another example, scanning the environment of LIDAR system may be achieved by changing a positioning (i.e. location and/or orientation) of a sensor with respect to the field of view. In another example, scanning the environment of LIDAR system may be achieved by changing a positioning (i.e. location and/or orientation) of a light source with respect to the field of view. In yet another example, scanning the environment of LIDAR system may be achieved by changing the positions of at least one light source and of at least one sensor to move rigidly respect to the field of view (i.e. the relative distance and orientation of the at least one sensor and of the at least one light source remains).

As used herein the term "field of view of the LIDAR system" may broadly include an extent of the observable environment of LIDAR system in which objects may be detected. It is noted that the field of view (FOV) of the LIDAR system may be affected by various conditions such as but not limited to: an orientation of the LIDAR system (e.g. is the direction of an optical axis of the LIDAR system); a position of the LIDAR system with respect to the environment (e.g. distance above ground and adjacent topography and obstacles); operational parameters of the LIDAR system (e.g. emission power, computational settings, defined angles of operation), etc. The field of view of LIDAR system may be defined, for example, by a solid angle (e.g. defined using $\phi$, $\theta$ angles, in which $\phi$ and $\theta$ are angles defined in perpendicular planes, e.g. with respect to symmetry axes of the LIDAR system and/or its FOV). In one example, the field of view may also be defined within a certain range (e.g. up to 200 m).

Similarly, the term "instantaneous field of view" may broadly include an extent of the observable environment in which objects may be detected by the LIDAR system at any given moment. For example, for a scanning LIDAR system, the instantaneous field of view is narrower than the entire FOV of the LIDAR system, and it can be moved within the FOV of the LIDAR system in order to enable detection in other parts of the FOV of the LIDAR system. The movement of the instantaneous field of view within the FOV of the LIDAR system may be achieved by moving a light deflector of the LIDAR system (or external to the LIDAR system), so as to deflect beams of light to and/or from the LIDAR system in differing directions. In one embodiment, LIDAR system may be configured to scan scene in the environment in which the LIDAR system is operating. As used herein the term "scene" may broadly include some or all of the objects within the field of view of the LIDAR system, in their relative positions and in their current states, within an operational duration of the LIDAR system. For example, the scene may include ground elements (e.g. earth, roads, grass, sidewalks, road surface marking), sky, man-made objects (e.g. vehicles, buildings, signs), vegetation, people, animals, light projecting elements (e.g. flashlights, sun, other LIDAR systems), and so on.

Disclosed embodiments may involve obtaining information for use in generating reconstructed three-dimensional models. Examples of types of reconstructed three-dimensional models which may be used include point cloud models, and Polygon Mesh (e.g. a triangle mesh). The terms "point cloud" and "point cloud model" are widely known in the art, and should be construed to include a set of data points located spatially in some coordinate system (i.e., having an identifiable location in a space described by a respective coordinate system). The term "point cloud point" refer to a point in space (which may be dimensionless, or a miniature cellular space, e.g. 1 cm$^3$), and whose location may be described by the point cloud model using a set of coordinates (e.g. (X,Y,Z), (r,$\phi$,$\theta$)). By way of example only, the point cloud model may store additional information for some or all of its points (e.g. color information for points generated from camera images). Likewise, any other type of reconstructed three-dimensional model may store additional information for some or all of its objects. Similarly, the terms "polygon mesh" and "triangle mesh" are widely known in the art, and are to be construed to include, among other things, a set of vertices, edges and faces that define the shape of one or more 3D objects (such as a polyhedral object). The faces may include one or more of the following: triangles (triangle mesh), quadrilaterals, or other simple convex polygons, since this may simplify rendering. The faces may also include more general concave polygons, or polygons with holes. Polygon meshes may be represented using differing techniques, such as: Vertex-vertex meshes, Face-vertex meshes, Winged-edge meshes and Render dynamic meshes. Different portions of the polygon mesh (e.g., vertex, face, edge) are located spatially in some coordinate system (i.e., having an identifiable location in a space described by the respective coordinate system), either directly and/or relative to one another. The generation of the reconstructed three-dimensional model may be implemented using any standard, dedicated and/or novel photogrammetry technique, many of which are known in the art. It is noted that other types of models of the environment may be generated by the LIDAR system.

Consistent with disclosed embodiments, the LIDAR system may include at least one projecting unit with a light source configured to project light. As used herein the term "light source" broadly refers to any device configured to emit light. In one embodiment, the light source may be a laser such as a solid-state laser, laser diode, a high power laser, or an alternative light source such as, a light emitting diode (LED)-based light source. In addition, light source 112 as illustrated throughout the figures, may emit light in differing formats, such as light pulses, continuous wave (CW), quasi-CW, and so on. For example, one type of light source that may be used is a vertical-cavity surface-emitting laser (VCSEL). Another type of light source that may be used is an external cavity diode laser (ECDL). In some examples, the light source may include a laser diode configured to emit light at a wavelength between about 650 nm and 1150 nm. Alternatively, the light source may include a laser diode configured to emit light at a wavelength between about 800 nm and about 1000 nm, between about 850 nm and about 950 nm, or between about 1300 nm and about 1600 nm. Unless indicated otherwise, the term "about" with regards to a numeric value is defined as a variance of up to 5% with respect to the stated value. Additional details on the projecting unit and the at least one light source are described below with reference to FIGS. 2A-2C.

Consistent with disclosed embodiments, the LIDAR system may include at least one scanning unit with at least one light deflector configured to deflect light from the light source in order to scan the field of view. The term "light deflector" broadly includes any mechanism or module which is configured to make light deviate from its original path; for example, a mirror, a prism, controllable lens, a mechanical mirror, mechanical scanning polygons, active diffraction (e.g. controllable LCD), Risley prisms, non-mechanical-electro-optical beam steering (such as made by Vscent), polarization grating (such as offered by Boulder Non-Linear Systems), optical phased array (OPA), and more. In one embodiment, a light deflector may include a plurality of optical components, such as at least one reflecting element (e.g. a mirror), at least one refracting element (e.g. a prism, a lens), and so on. In one example, the light deflector may be movable, to cause light deviate to differing degrees (e.g. discrete degrees, or over a continuous span of degrees). The light deflector may optionally be controllable in different ways (e.g. deflect to a degree α, change deflection angle by Δα, move a component of the light deflector by M millimeters, change speed in which the deflection angle changes). In addition, the light deflector may optionally be operable to change an angle of deflection within a single plane (e.g., θ coordinate). The light deflector may optionally be operable to change an angle of deflection within two non-parallel planes (e.g., θ and φ coordinates). Alternatively or in addition, the light deflector may optionally be operable to change an angle of deflection between predetermined settings (e.g. along a predefined scanning route) or otherwise. With respect the use of light deflectors in LIDAR systems, it is noted that a light deflector may be used in the outbound direction (also referred to as transmission direction, or TX) to deflect light from the light source to at least a part of the field of view. However, a light deflector may also be used in the inbound direction (also referred to as reception direction, or RX) to deflect light from at least a part of the field of view to one or more light sensors. Additional details on the scanning unit and the at least one light deflector are described below with reference to FIGS. 3A-3C.

Disclosed embodiments may involve pivoting the light deflector in order to scan the field of view. As used herein the term "pivoting" broadly includes rotating of an object (especially a solid object) about one or more axis of rotation, while substantially maintaining a center of rotation fixed. In one embodiment, the pivoting of the light deflector may include rotation of the light deflector about a fixed axis (e.g., a shaft), but this is not necessarily so. For example, in some MEMS mirror implementation, the MEMS mirror may move by actuation of a plurality of benders connected to the mirror, the mirror may experience some spatial translation in addition to rotation. Nevertheless, such mirror may be designed to rotate about a substantially fixed axis, and therefore consistent with the present disclosure it considered to be pivoted. In other embodiments, some types of light deflectors (e.g. non-mechanical-electro-optical beam steering, OPA) do not require any moving components or internal movements in order to change the deflection angles of deflected light. It is noted that any discussion relating to moving or pivoting a light deflector is also mutatis mutandis applicable to controlling the light deflector such that it changes a deflection behavior of the light deflector. For example, controlling the light deflector may cause a change in a deflection angle of beams of light arriving from at least one direction.

Disclosed embodiments may involve receiving reflections associated with a portion of the field of view corresponding to a single instantaneous position of the light deflector. As used herein, the term "instantaneous position of the light deflector" (also referred to as "state of the light deflector") broadly refers to the location or position in space where at least one controlled component of the light deflector is situated at an instantaneous point in time, or over a short span of time. In one embodiment, the instantaneous position of light deflector may be gauged with respect to a frame of reference. The frame of reference may pertain to at least one fixed point in the LIDAR system. Or, for example, the frame of reference may pertain to at least one fixed point in the scene. In some embodiments, the instantaneous position of the light deflector may include some movement of one or more components of the light deflector (e.g. mirror, prism), usually to a limited degree with respect to the maximal degree of change during a scanning of the field of view. For example, a scanning of the entire the field of view of the LIDAR system may include changing deflection of light over a span of 30°, and the instantaneous position of the at least one light deflector may include angular shifts of the light deflector within 0.05°. In other embodiments, the term "instantaneous position of the light deflector" may refer to the positions of the light deflector during acquisition of light which is processed to provide data for a single point of a point cloud (or another type of 3D model) generated by the LIDAR system. In some embodiments, an instantaneous position of the light deflector may correspond with a fixed position or orientation in which the deflector pauses for a short time during illumination of a particular sub-region of the LIDAR field of view. In other cases, an instantaneous position of the light deflector may correspond with a certain position/orientation along a scanned range of positions/ orientations of the light deflector that the light deflector passes through as part of a continuous or semi-continuous scan of the LIDAR field of view. In some embodiments, the light deflector may be moved such that during a scanning cycle of the LIDAR FOV the light deflector is located at a plurality of different instantaneous positions. In other words, during the period of time in which a scanning cycle occurs, the deflector may be moved through a series of different instantaneous positions/orientations, and the deflector may reach each different instantaneous position/orientation at a different time during the scanning cycle.

Consistent with disclosed embodiments, the LIDAR system may include at least one sensing unit with at least one sensor configured to detect reflections from objects in the field of view. The term "sensor" broadly includes any device, element, or system capable of measuring properties (e.g., power, frequency, phase, pulse timing, pulse duration) of electromagnetic waves and to generate an output relating to the measured properties. In some embodiments, the at least one sensor may include a plurality of detectors constructed from a plurality of detecting elements. The at least one sensor may include light sensors of one or more types. It is noted that the at least one sensor may include multiple sensors of the same type which may differ in other characteristics (e.g., sensitivity, size). Other types of sensors may also be used. Combinations of several types of sensors can be used for different reasons, such as improving detection over a span of ranges (especially in close range); improving the dynamic range of the sensor; improving the temporal response of the sensor; and improving detection in varying environmental conditions (e.g. atmospheric temperature, rain, etc.). In one embodiment, the at least one sensor includes a SiPM (Silicon photomultipliers) which is a solid-state single-photon-sensitive device built from an array of avalanche photodiode (APD), single photon avalanche diode (SPAD), serving as detection elements on a common silicon substrate. In one example, a typical distance between SPADs may be between about 10 µm and about 50 µm, wherein each SPAD may have a recovery time of between about 20 ns and about 100 ns. Similar photomultipliers from other, non-silicon materials may also be used. Although a SiPM device works in digital/switching mode, the SiPM is an analog device because all the microcells may be read in parallel, making it possible to generate signals within a dynamic range from a single photon to hundreds and thousands of photons detected by the different SPADs. It is noted that outputs from different types of sensors (e.g., SPAD, APD, SiPM, PIN diode, Photodetector) may be combined together to a single output which may be processed by a processor of the LIDAR system. Additional details on the sensing unit and the at least one sensor are described below with reference to FIGS. 4A-4C.

Consistent with disclosed embodiments, the LIDAR system may include or communicate with at least one processor configured to execute differing functions. The at least one processor may constitute any physical device having an electric circuit that performs a logic operation on input or inputs. For example, the at least one processor may include one or more integrated circuits (IC), including Application-specific integrated circuit (ASIC), microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by at least one processor may, for example, be pre-loaded into a memory integrated with or embedded into the controller or may be stored in a separate memory. The memory may comprise a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the memory is configured to store information representative data about objects in the environment of the LIDAR system. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact. Additional details on the processing unit and the at least one processor are described below with reference to FIGS. 5A-5C.

System Overview

FIG. 1A illustrates a LIDAR system 100 including a projecting unit 102, a scanning unit 104, a sensing unit 106, and a processing unit 108. LIDAR system 100 may be mountable on a vehicle 110. Consistent with embodiments of the present disclosure, projecting unit 102 may include at least one light source 112, scanning unit 104 may include at least one light deflector 114, sensing unit 106 may include at least one sensor 116, and processing unit 108 may include at least one processor 118. In one embodiment, at least one processor 118 may be configured to coordinate operation of the at least one light source 112 with the movement of at least one light deflector 114 in order to scan a field of view 120. During a scanning cycle, each instantaneous position of at least one light deflector 114 may be associated with a particular portion 122 of field of view 120. In addition, LIDAR system 100 may include at least one optional optical window 124 for directing light projected towards field of view 120 and/or receiving light reflected from objects in field of view 120. Optional optical window 124 may serve different purposes, such as collimation of the projected light and focusing of the reflected light. In one embodiment, optional optical window 124 may be an opening, a flat window, a lens, or any other type of optical window.

Consistent with the present disclosure, LIDAR system 100 may be used in autonomous or semi-autonomous road-vehicles (for example, cars, buses, vans, trucks and any other terrestrial vehicle). Autonomous road-vehicles with LIDAR system 100 may scan their environment and drive to a destination vehicle without human input. Similarly, LIDAR system 100 may also be used in autonomous/semi-autonomous aerial-vehicles (for example, UAV, drones, quadcopters, and any other airborne vehicle or device); or in an autonomous or semi-autonomous water vessel (e.g., boat, ship, submarine, or any other watercraft). Autonomous aerial-vehicles and water craft with LIDAR system 100 may scan their environment and navigate to a destination autonomously or using a remote human operator. According to one embodiment, vehicle 110 (either a road-vehicle, aerial-vehicle, or watercraft) may use LIDAR system 100 to aid in detecting and scanning the environment in which vehicle 110 is operating.

It should be noted that LIDAR system 100 or any of its components may be used together with any of the example embodiments and methods disclosed herein. Further, while some aspects of LIDAR system 100 are described relative to an exemplary vehicle-based LIDAR platform, LIDAR system 100, any of its components, or any of the processes described herein may be applicable to LIDAR systems of other platform types.

In some embodiments, LIDAR system 100 may include one or more scanning units 104 to scan the environment around vehicle 110. LIDAR system 100 may be attached or mounted to any part of vehicle 110. Sensing unit 106 may receive reflections from the surroundings of vehicle 110, and transfer reflections signals indicative of light reflected from objects in field of view 120 to processing unit 108. Consistent with the present disclosure, scanning units 104 may be mounted to or incorporated into a bumper, a fender, a side panel, a spoiler, a roof, a headlight assembly, a taillight assembly, a rear-view mirror assembly, a hood, a trunk or any other suitable part of vehicle 110 capable of housing at least a portion of the LIDAR system. In some cases, LIDAR system 100 may capture a complete surround view of the environment of vehicle 110. Thus, LIDAR system 100 may have a 360-degree horizontal field of view. In one example, as shown in FIG. 1A, LIDAR system 100 may include a single scanning unit 104 mounted on a roof vehicle 110. Alternatively, LIDAR system 100 may include multiple scanning units (e.g., two, three, four, or more scanning units 104) each with a field of few such that in the aggregate the horizontal field of view is covered by a 360-degree scan around vehicle 110. One skilled in the art will appreciate that LIDAR system 100 may include any number of scanning units 104 arranged in any manner, each with an 80° to 120° field of view or less, depending on the number of units employed. Moreover, a 360-degree horizontal field of view may be also obtained by mounting a multiple LIDAR systems 100 on vehicle 110, each with a single scanning unit 104. It is nevertheless noted that the one or more LIDAR systems 100 do not have to provide a complete 360° field of view, and that narrower fields of view may be useful in some situations. For example, vehicle 110 may require a first LIDAR system 100 having an field of view of 75° looking ahead of the vehicle, and possibly a second LIDAR system 100 with a similar FOV looking backward (optionally with a lower detection range). It is also noted that different vertical field of view angles may also be implemented.

Figure 1B:
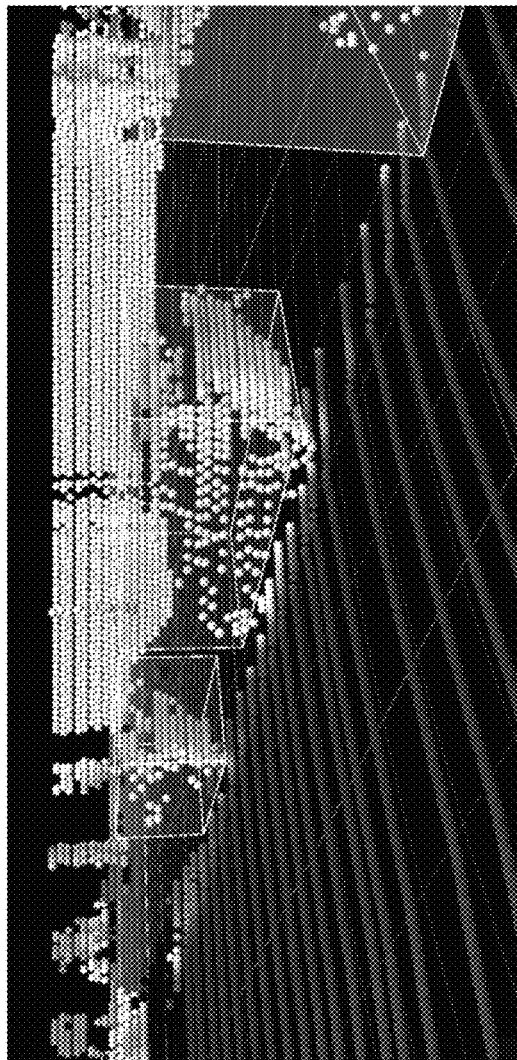
FIG. 1B is an image showing an exemplary output of single scanning cycle of a LIDAR system mounted on a vehicle consistent with disclosed embodiments.

FIG. 1B is an image showing an exemplary output from a single scanning cycle of LIDAR system 100 mounted on vehicle 110 consistent with disclosed embodiments. In this example, scanning unit 104 is incorporated into a right headlight assembly of vehicle 110. Every gray dot in the image corresponds to a location in the environment around vehicle 110 determined from reflections detected by sensing unit 106. In addition to location, each gray dot may also be associated with different types of information, for example, intensity (e.g., how much light returns back from that location), reflectivity, proximity to other dots, and more. In one embodiment, LIDAR system 100 may generate a plurality of point-cloud data entries from detected reflections of multiple scanning cycles of the field of view to enable, for example, determining a point cloud model of the environment around vehicle 110.

Figure 1C:
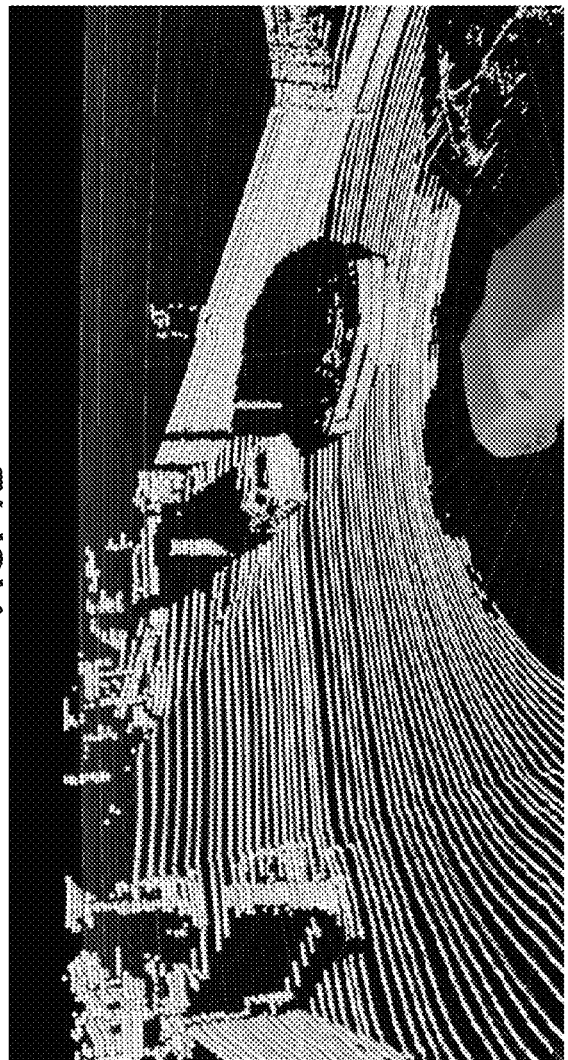
FIG. 1C is another image showing a representation of a point cloud model determined from output of a LIDAR system consistent with disclosed embodiments.

FIG. 1C is an image showing a representation of the point cloud model determined from the output of LIDAR system 100. Consistent with disclosed embodiments, by processing the generated point-cloud data entries of the environment around vehicle 110, a surround-view image may be produced from the point cloud model. In one embodiment, the point cloud model may be provided to a feature extraction module, which processes the point cloud information to identify a plurality of features. Each feature may include data about different aspects of the point cloud and/or of objects in the environment around vehicle 110 (e.g. cars, trees, people, and roads). Features may have the same resolution of the point cloud model (i.e. having the same number of data points, optionally arranged into similar sized 2D arrays), or may have different resolutions. The features may be stored in any kind of data structure (e.g. raster, vector, 2D array, 1D array). In addition, virtual features, such as a representation of vehicle 110, border lines, or bounding boxes separating regions or objects in the image (e.g., as depicted in FIG. 1B), and icons representing one or more identified objects, may be overlaid on the representation of the point cloud model to form the final surround-view image. For example, a symbol of vehicle 110 may be overlaid at a center of the surround-view image.

The Projecting Unit

Figure 2A:
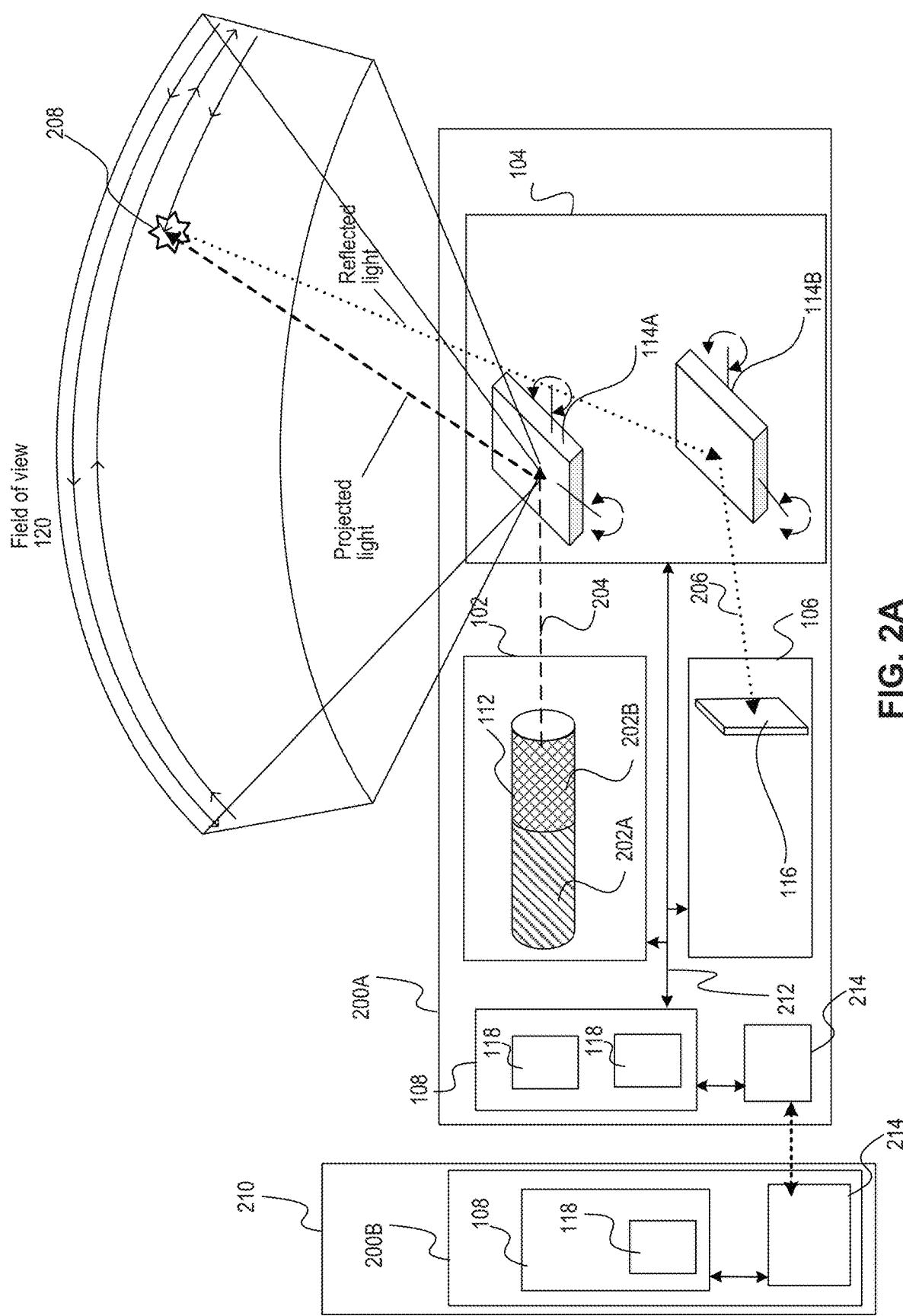
FIGS. 2A, 2B, 2C, 2D, 2E, 2F, and 2G are diagrams illustrating different configurations of projecting units in accordance with some embodiments of the present disclosure.
Figure 2B:
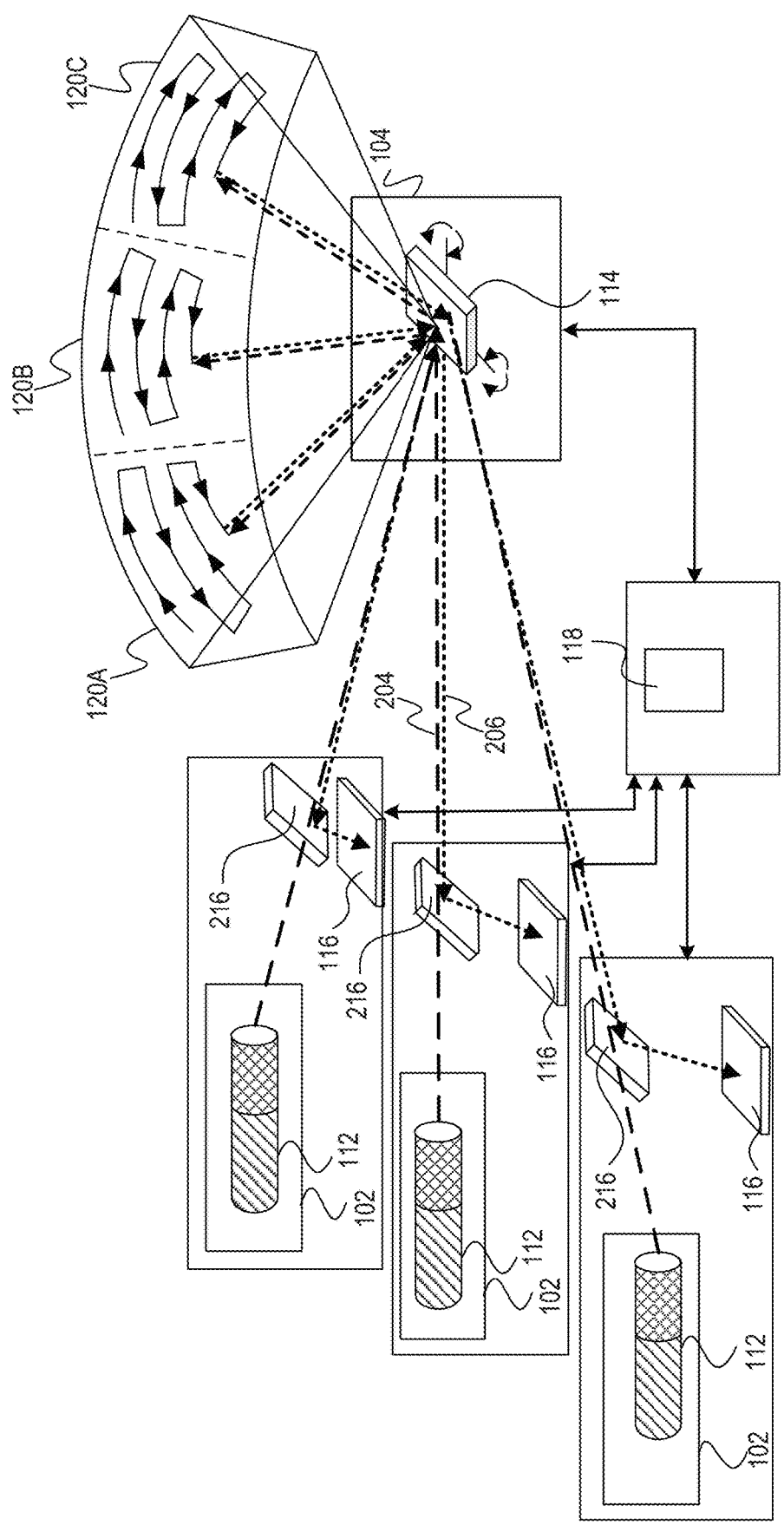
Figure 2C:
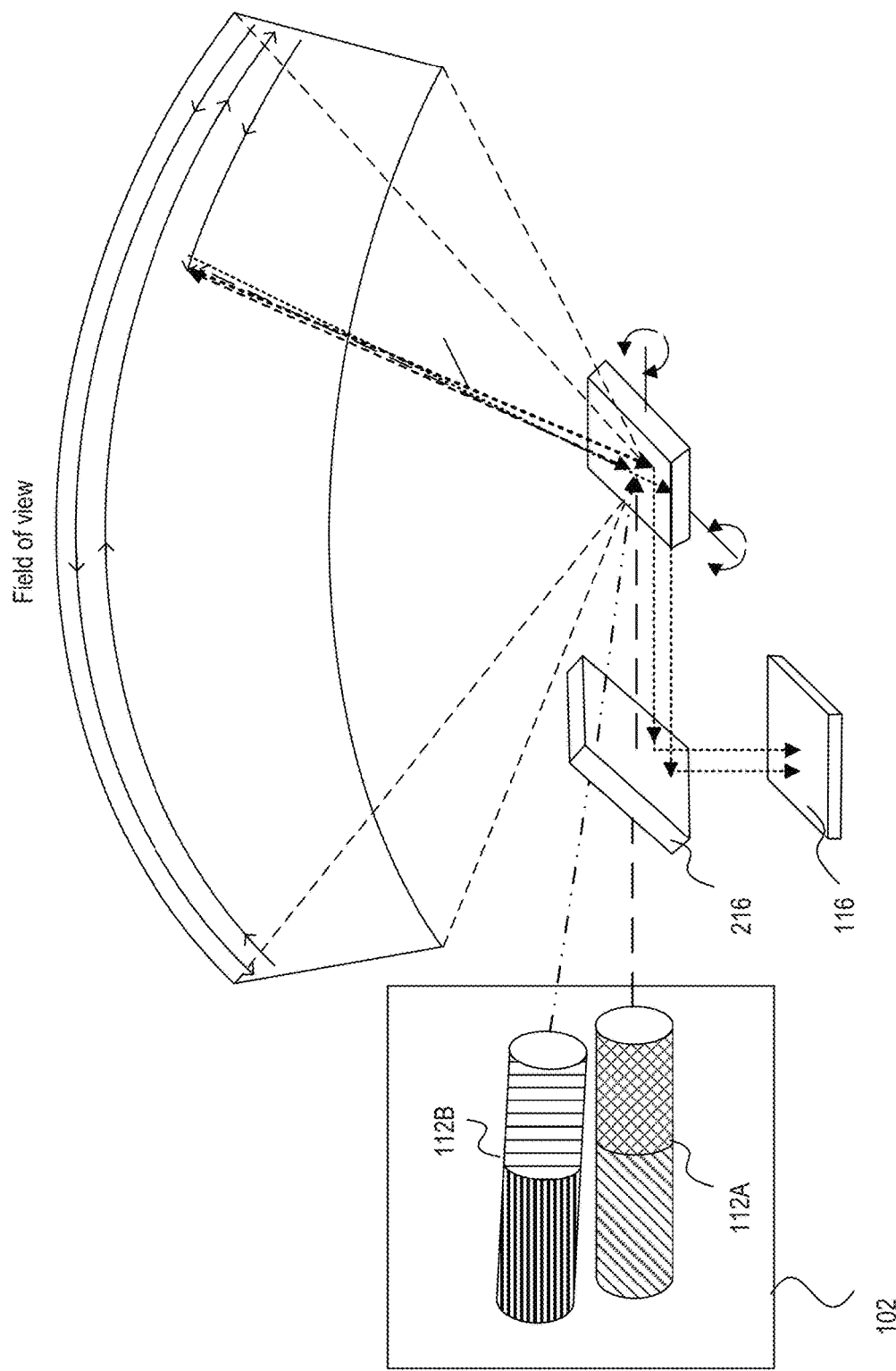
Figure 2D:
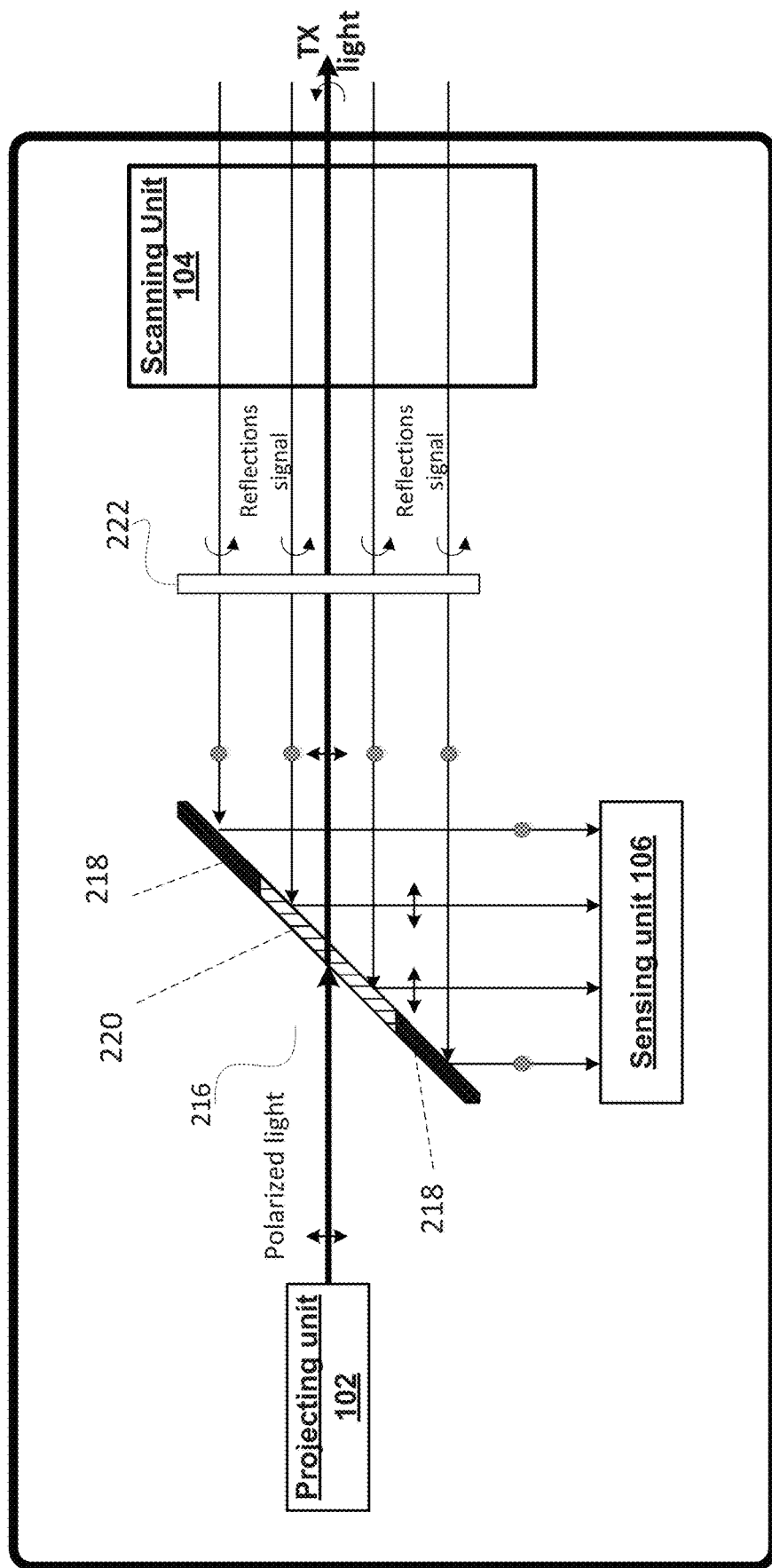
Figure 2E:
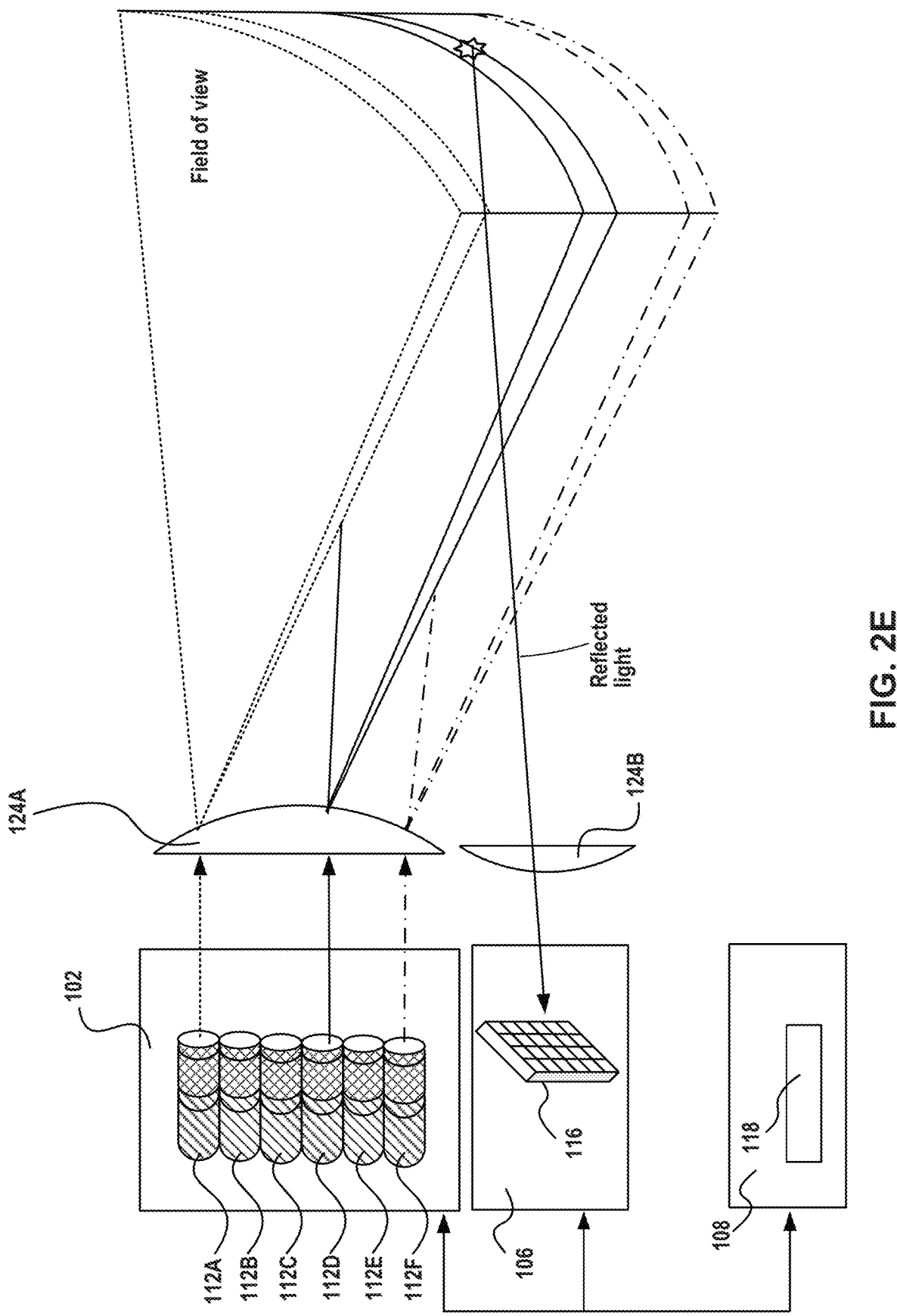
Figure 2F:
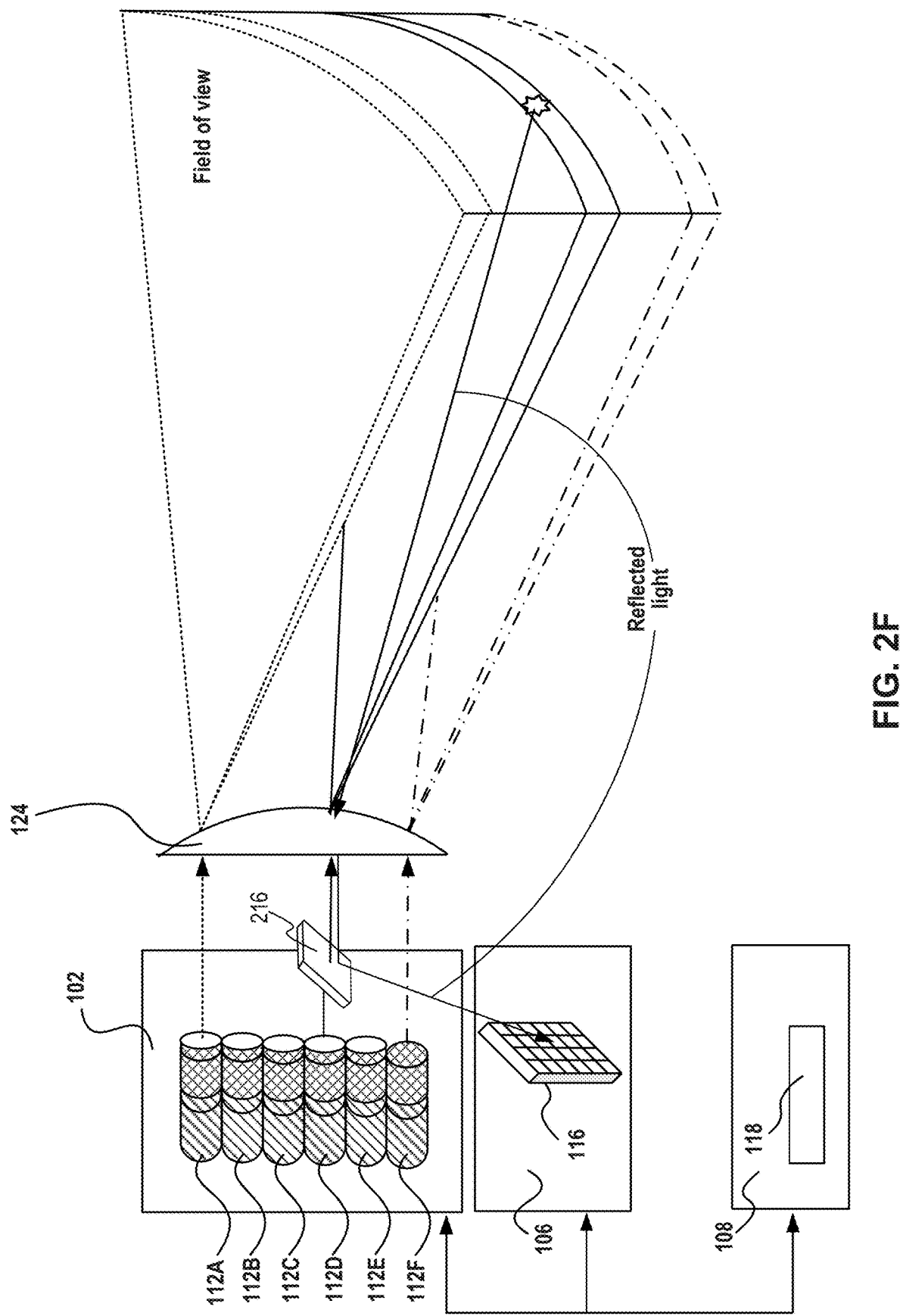
Figure 2G:
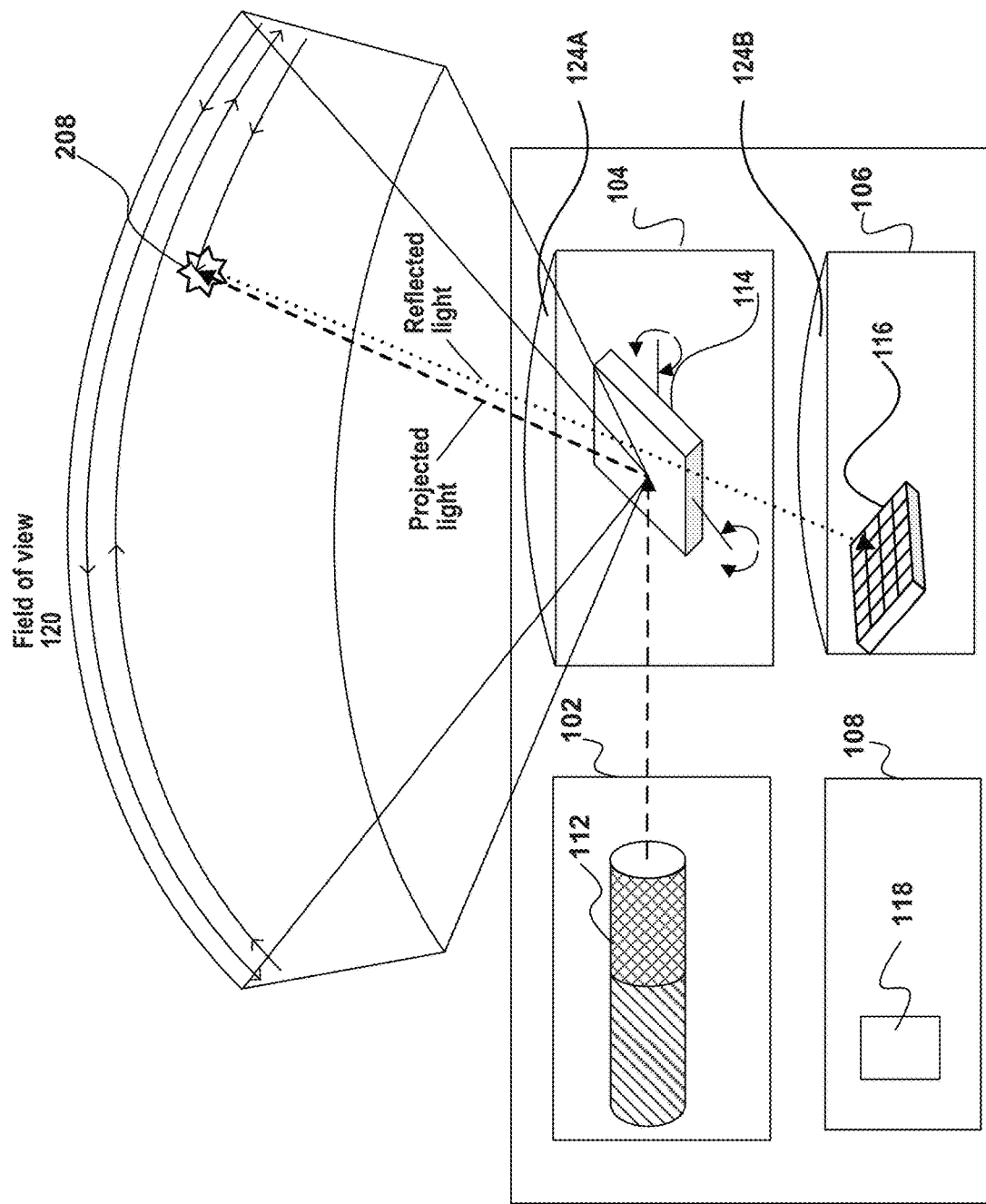

FIGS. 2A-2G depict various configurations of projecting unit 102 and its role in LIDAR system 100. Specifically, FIG. 2A is a diagram illustrating projecting unit 102 with a single light source; FIG. 2B is a diagram illustrating a plurality of projecting units 102 with a plurality of light sources aimed at a common light deflector 114; FIG. 2C is a diagram illustrating projecting unit 102 with a primary and a secondary light sources 112; FIG. 2D is a diagram illustrating an asymmetrical deflector used in some configurations of projecting unit 102; FIG. 2E is a diagram illustrating a first configuration of a non-scanning LIDAR system; FIG. 2F is a diagram illustrating a second configuration of a non-scanning LIDAR system; and FIG. 2G is a diagram illustrating a LIDAR system that scans in the outbound direction and does not scan in the inbound direction. One skilled in the art will appreciate that the depicted configurations of projecting unit 102 may have numerous variations and modifications.

FIG. 2A illustrates an example of a bi-static configuration of LIDAR system 100 in which projecting unit 102 includes a single light source 112. The term "bi-static configuration" broadly refers to LIDAR systems configurations in which the projected light exiting the LIDAR system and the reflected light entering the LIDAR system pass through substantially different optical paths. In some embodiments, a bi-static configuration of LIDAR system 100 may include a separation of the optical paths by using completely different optical components, by using parallel but not fully separated optical components, or by using the same optical components for only part of the of the optical paths (optical components may include, for example, windows, lenses, mirrors, beam splitters, etc.). In the example depicted in FIG. 2A, the bi-static configuration includes a configuration where the outbound light and the inbound light pass through a single optical window 124 but scanning unit 104 includes two light deflectors, a first light deflector 114A for outbound light and a second light deflector 114B for inbound light (the inbound light in LIDAR system includes emitted light reflected from objects in the scene, and may also include ambient light arriving from other sources). In the examples depicted in FIGS. 2E and 2G, the bi-static configuration includes a configuration where the outbound light passes through a first optical window 124A, and the inbound light passes through a second optical window 124B. In all the example configurations above, the inbound and outbound optical paths differ from one another.

In this embodiment, all the components of LIDAR system 100 may be contained within a single housing 200, or may be divided among a plurality of housings. As shown, projecting unit 102 is associated with a single light source 112 that includes a laser diode 202A (or one or more laser diodes coupled together) configured to emit light (projected light 204). In one non-limiting example, the light projected by light source 112 may be at a wavelength between about 800 nm and 950 nm, have an average power between about 50 mW and about 500 mW, have a peak power between about 50 W and about 200 W, and a pulse width of between about 2 ns and about 100 ns. In addition, light source 112 may optionally be associated with optical assembly 202B used for manipulation of the light emitted by laser diode 202A (e.g. for collimation, focusing, etc.). It is noted that other types of light sources 112 may be used, and that the disclosure is not restricted to laser diodes. In addition, light source 112 may emit its light in different formats, such as light pulses, frequency modulated, continuous wave (CW), quasi-CW, or any other form corresponding to the particular light source employed. The projection format and other parameters may be changed by the light source from time to time based on different factors, such as instructions from processing unit 108. The projected light is projected towards an outbound deflector 114A that functions as a steering element for directing the projected light in field of view 120. In this example, scanning unit 104 also include a pivotable return deflector 114B that direct photons (reflected light 206) reflected back from an object 208 within field of view 120 toward sensor 116. The reflected light is detected by sensor 116 and information about the object (e.g., the distance to object 212) is determined by processing unit 108.

In this figure, LIDAR system 100 is connected to a host 210. Consistent with the present disclosure, the term "host" refers to any computing environment that may interface with LIDAR system 100, it may be a vehicle system (e.g., part of vehicle 110), a testing system, a security system, a surveillance system, a traffic control system, an urban modelling system, or any system that monitors its surroundings. Such computing environment may include at least one processor and/or may be connected LIDAR system 100 via the cloud. In some embodiments, host 210 may also include interfaces to external devices such as camera and sensors configured to measure different characteristics of host 210 (e.g., acceleration, steering wheel deflection, reverse drive, etc.). Consistent with the present disclosure, LIDAR system 100 may be fixed to a stationary object associated with host 210 (e.g. a building, a tripod) or to a portable system associated with host 210 (e.g., a portable computer, a movie camera). Consistent with the present disclosure, LIDAR system 100 may be connected to host 210, to provide outputs of LIDAR system 100 (e.g., a 3D model, a reflectivity image) to host 210. Specifically, host 210 may use LIDAR system 100 to aid in detecting and scanning the environment of host 210 or any other environment. In addition, host 210 may integrate, synchronize or otherwise use together the outputs of LIDAR system 100 with outputs of other sensing systems (e.g. cameras, microphones, radar systems). In one example, LIDAR system 100 may be used by a security system. An example of such an embodiment is described below with reference to FIG. 6D.

LIDAR system 100 may also include a bus 212 (or other communication mechanisms) that interconnect subsystems and components for transferring information within LIDAR system 100. Optionally, bus 212 (or another communication mechanism) may be used for interconnecting LIDAR system 100 with host 210. In the example of FIG. 2A, processing unit 108 includes two processors 118 to regulate the operation of projecting unit 102, scanning unit 104, and sensing unit 106 in a coordinated manner based, at least partially, on information received from internal feedback of LIDAR system 100. In other words, processing unit 108 may be configured to dynamically operate LIDAR system 100 in a closed loop. A closed loop system is characterized by having feedback from at least one of the elements and updating one or more parameters based on the received feedback. Moreover, a closed loop system may receive feedback and update its own operation, at least partially, based on that feedback. A dynamic system or element is one that may be updated during operation.

According to some embodiments, scanning the environment around LIDAR system 100 may include illuminating field of view 120 with light pulses. The light pulses may have parameters such as: pulse duration, pulse angular dispersion, wavelength, instantaneous power, photon density at different distances from light source 112, average power, pulse power intensity, pulse width, pulse repetition rate, pulse sequence, pulse duty cycle, wavelength, phase, polarization, and more. Scanning the environment around LIDAR system 100 may also include detecting and characterizing various aspects of the reflected light. Characteristics of the reflected light may include, for example: time-of-flight (i.e., time from emission until detection), instantaneous power (e.g., power signature), average power across entire return pulse, and photon distribution/signal over return pulse period. By comparing characteristics of a light pulse with characteristics of corresponding reflections, a distance and possibly a physical characteristic, such as reflected intensity of object 212 may be estimated. By repeating this process across multiple adjacent portions 122, in a predefined pattern (e.g., raster, Lissajous or other patterns) an entire scan of field of view 120 may be achieved. As discussed below in greater detail, in some situations LIDAR system 100 may direct light to only some of the portions 122 in field of view 120 at every scanning cycle. These portions may be adjacent to each other, but not necessarily so.

In another embodiment, LIDAR system 100 may include network interface 214 for communicating with host 210 (e.g., a vehicle controller). The communication between LIDAR system 100 and host 210 is represented by a dashed arrow. In one embodiment, network interface 214 may include an integrated service digital network (ISDN) card, cable modem, satellite modem, or a modem to provide a data communication connection to a corresponding type of telephone line. As another example, network interface 214 may include a local area network (LAN) card to provide a data communication connection to a compatible LAN. In another embodiment, network interface 214 may include an Ethernet port connected to radio frequency receivers and transmitters and/or optical (e.g., infrared) receivers and transmitters. The specific design and implementation of network interface 214 depends on the communications network(s) over which LIDAR system 100 and host 210 are intended to operate. For example, network interface 214 may be used, for example, to provide outputs of LIDAR system 100 to the external system, such as a 3D model, operational parameters of LIDAR system 100, and so on. In other embodiment, the communication unit may be used, for example, to receive instructions from the external system, to receive information regarding the inspected environment, to receive information from another sensor, etc.

FIG. 2B illustrates an example of a monostatic configuration of LIDAR system 100 including a plurality projecting units 102. The term "monostatic configuration" broadly refers to LIDAR system configurations in which the projected light exiting from the LIDAR system and the reflected light entering the LIDAR system pass through substantially similar optical paths. In one example, the outbound light beam and the inbound light beam may share at least one optical assembly through which both outbound and inbound light beams pass. In another example, the outbound light may pass through an optical window (not shown) and the inbound light radiation may pass through the same optical window. A monostatic configuration may include a configuration where the scanning unit 104 includes a single light deflector 114 that directs the projected light towards field of view 120 and directs the reflected light towards a sensor 116. As shown, both projected light 204 and reflected light 206 hits an asymmetrical deflector 216. The term "asymmetrical deflector" refers to any optical device having two sides capable of deflecting a beam of light hitting it from one side in a different direction than it deflects a beam of light hitting it from the second side. In one example, the asymmetrical deflector does not deflect projected light 204 and deflects reflected light 206 towards sensor 116. One example of an asymmetrical deflector may include a polarization beam splitter. In another example, asymmetrical 216 may include an optical isolator that allows the passage of light in only one direction. A diagrammatic representation of asymmetrical deflector 216 is illustrated in FIG. 2D. Consistent with the present disclosure, a monostatic configuration of LIDAR system 100 may include an asymmetrical deflector to prevent reflected light from hitting light source 112, and to direct all the reflected light toward sensor 116, thereby increasing detection sensitivity.

In the embodiment of FIG. 2B, LIDAR system 100 includes three projecting units 102 each with a single of light source 112 aimed at a common light deflector 114. In one embodiment, the plurality of light sources 112 (including two or more light sources) may project light with substantially the same wavelength and each light source 112 is generally associated with a differing area of the field of view (denoted in the figure as 120A, 120B, and 120C). This enables scanning of a broader field of view than can be achieved with a light source 112. In another embodiment, the plurality of light sources 102 may project light with differing wavelengths, and all the light sources 112 may be directed to the same portion (or overlapping portions) of field of view 120.

FIG. 2C illustrates an example of LIDAR system 100 in which projecting unit 102 includes a primary light source 112A and a secondary light source 112B. Primary light source 112A may project light with a longer wavelength than is sensitive to the human eye in order to optimize SNR and detection range. For example, primary light source 112A may project light with a wavelength between about 750 nm and 1100 nm. In contrast, secondary light source 112B may project light with a wavelength visible to the human eye. For example, secondary light source 112B may project light with a wavelength between about 400 nm and 700 nm. In one embodiment, secondary light source 112B may project light along substantially the same optical path the as light projected by primary light source 112A. Both light sources may be time-synchronized and may project light emission together or in interleaved pattern. An interleave pattern means that the light sources are not active at the same time which may mitigate mutual interference. A person who is of skill in the art would readily see that other combinations of wavelength ranges and activation schedules may also be implemented.

Consistent with some embodiments, secondary light source 112B may cause human eyes to blink when it is too close to the LIDAR optical output port. This may ensure an eye safety mechanism not feasible with typical laser sources that utilize the near-infrared light spectrum. In another embodiment, secondary light source 112B may be used for calibration and reliability at a point of service, in a manner somewhat similar to the calibration of headlights with a special reflector/pattern at a certain height from the ground with respect to vehicle 110. An operator at a point of service could examine the calibration of the LIDAR by simple visual inspection of the scanned pattern over a featured target such a test pattern board at a designated distance from LIDAR system 100. In addition, secondary light source 112B may provide means for operational confidence that the LIDAR is working for the end-user. For example, the system may be configured to permit a human to place a hand in front of light deflector 114 to test its operation.

Secondary light source 112B may also have a non-visible element that can double as a backup system in case primary light source 112A fails. This feature may be useful for fail-safe devices with elevated functional safety ratings. Given that secondary light source 112B may be visible and also due to reasons of cost and complexity, secondary light source 112B may be associated with a smaller power compared to primary light source 112A. Therefore, in case of a failure of primary light source 112A, the system functionality will fall back to secondary light source 112B set of functionalities and capabilities. While the capabilities of secondary light source 112B may be inferior to the capabilities of primary light source 112A, LIDAR system 100 system may be designed in such a fashion to enable vehicle 110 to safely arrive its destination.

FIG. 2D illustrates asymmetrical deflector 216 that may be part of LIDAR system 100. In the illustrated example, asymmetrical deflector 216 includes a reflective surface 218 (such as a mirror) and a one-way deflector 220. While not necessarily so, asymmetrical deflector 216 may optionally be a static deflector. Asymmetrical deflector 216 may be used in a monostatic configuration of LIDAR system 100, in order to allow a common optical path for transmission and for reception of light via the at least one deflector 114, e.g. as illustrated in FIGS. 2B and 2C. However, typical asymmetrical deflectors such as beam splitters are characterized by energy losses, especially in the reception path, which may be more sensitive to power loses than the transmission path.

As depicted in FIG. 2D, LIDAR system 100 may include asymmetrical deflector 216 positioned in the transmission path, which includes one-way deflector 220 for separating between the transmitted and received light signals. Optionally, one-way deflector 220 may be substantially transparent to the transmission light and substantially reflective to the received light. The transmitted light is generated by projecting unit 102 and may travel through one-way deflector 220 to scanning unit 104 which deflects it towards the optical outlet. The received light arrives through the optical inlet, to the at least one deflecting element 114, which deflects the reflections signal into a separate path away from the light source and towards sensing unit 106. Optionally, asymmetrical deflector 216 may be combined with a polarized light source 112 which is linearly polarized with the same polarization axis as one-way deflector 220. Notably, the cross-section of the outbound light beam is much smaller than that of the reflections signals. Accordingly, LIDAR system 100 may include one or more optical components (e.g. lens, collimator) for focusing or otherwise manipulating the emitted polarized light beam to the dimensions of the asymmetrical deflector 216. In one embodiment, one-way deflector 220 may be a polarizing beam splitter that is virtually transparent to the polarized light beam.

Consistent with some embodiments, LIDAR system 100 may further include optics 222 (e.g., a quarter wave plate retarder) for modifying a polarization of the emitted light.

For example, optics 222 may modify a linear polarization of the emitted light beam to circular polarization. Light reflected back to system 100 from the field of view would arrive back through deflector 114 to optics 222, bearing a circular polarization with a reversed handedness with respect to the transmitted light. Optics 222 would then convert the received reversed handedness polarization light to a linear polarization that is not on the same axis as that of the polarized beam splitter 216. As noted above, the received light-patch is larger than the transmitted light-patch, due to optical dispersion of the beam traversing through the distance to the target.

Some of the received light will impinge on one-way deflector 220 that will reflect the light towards sensor 106 with some power loss. However, another part of the received patch of light will fall on a reflective surface 218 which surrounds one-way deflector 220 (e.g., polarizing beam splitter slit). Reflective surface 218 will reflect the light towards sensing unit 106 with substantially zero power loss. One-way deflector 220 would reflect light that is composed of various polarization axes and directions that will eventually arrive at the detector. Optionally, sensing unit 106 may include sensor 116 that is agnostic to the laser polarization, and is primarily sensitive to the amount of impinging photons at a certain wavelength range.

It is noted that the proposed asymmetrical deflector 216 provides far superior performances when compared to a simple mirror with a passage hole in it. In a mirror with a hole, all of the reflected light which reaches the hole is lost to the detector. However, in deflector 216, one-way deflector 220 deflects a significant portion of that light (e.g., about 50%) toward the respective sensor 116. In LIDAR systems, the number photons reaching the LIDAR from remote distances is very limited, and therefore the improvement in photon capture rate is important.

According to some embodiments, a device for beam splitting and steering is described. A polarized beam may be emitted from a light source having a first polarization. The emitted beam may be directed to pass through a polarized beam splitter assembly. The polarized beam splitter assembly includes on a first side a one-directional slit and on an opposing side a mirror. The one-directional slit enables the polarized emitted beam to travel toward a quarter-wave-plate/wave-retarder which changes the emitted signal from a polarized signal to a linear signal (or vice versa) so that subsequently reflected beams cannot travel through the one-directional slit.

FIG. 2E shows an example of a bi-static configuration of LIDAR system 100 without scanning unit 104. In order to illuminate an entire field of view (or substantially the entire field of view) without deflector 114, projecting unit 102 may optionally include an array of light sources (e.g., 112A-112F). In one embodiment, the array of light sources may include a linear array of light sources controlled by processor 118. For example, processor 118 may cause the linear array of light sources to sequentially project collimated laser beams towards first optional optical window 124A. First optional optical window 124A may include a diffuser lens for spreading the projected light and sequentially forming wide horizontal and narrow vertical beams. Optionally, some or all of the at least one light source 112 of system 100 may project light concurrently. For example, processor 118 may cause the array of light sources to simultaneously project light beams from a plurality of non-adjacent light sources 112. In the depicted example, light source 112A, light source 112D, and light source 112F simultaneously project laser beams towards first optional optical window 124A thereby illuminating the field of view with three narrow vertical beams. The light beam from fourth light source 112D may reach an object in the field of view. The light reflected from the object may be captured by second optical window 124B and may be redirected to sensor 116. The configuration depicted in FIG. 2E is considered to be a bi-static configuration because the optical paths of the projected light and the reflected light are substantially different. It is noted that projecting unit 102 may also include a plurality of light sources 112 arranged in non-linear configurations, such as a two dimensional array, in hexagonal tiling, or in any other way.

FIG. 2F illustrates an example of a monostatic configuration of LIDAR system 100 without scanning unit 104. Similar to the example embodiment represented in FIG. 2E, in order to illuminate an entire field of view without deflector 114, projecting unit 102 may include an array of light sources (e.g., 112A-112F). But, in contrast to FIG. 2E, this configuration of LIDAR system 100 may include a single optical window 124 for both the projected light and for the reflected light. Using asymmetrical deflector 216, the reflected light may be redirected to sensor 116. The configuration depicted in FIG. 2E is considered to be a monostatic configuration because the optical paths of the projected light and the reflected light are substantially similar to one another. The term "substantially similar" in the context of the optical paths of the projected light and the reflected light means that the overlap between the two optical paths may be more than 80%, more than 85%, more than 90%, or more than 95%.

FIG. 2G illustrates an example of a bi-static configuration of LIDAR system 100. The configuration of LIDAR system 100 in this figure is similar to the configuration shown in FIG. 2A. For example, both configurations include a scanning unit 104 for directing projected light in the outbound direction toward the field of view. But, in contrast to the embodiment of FIG. 2A, in this configuration, scanning unit 104 does not redirect the reflected light in the inbound direction. Instead the reflected light passes through second optical window 124B and enters sensor 116. The configuration depicted in FIG. 2G is considered to be a bi-static configuration because the optical paths of the projected light and the reflected light are substantially different from one another. The term "substantially different" in the context of the optical paths of the projected light and the reflected light means that the overlap between the two optical paths may be less than 10%, less than 5%, less than 1%, or less than 0.25%.

The Scanning Unit

Figure 3A:
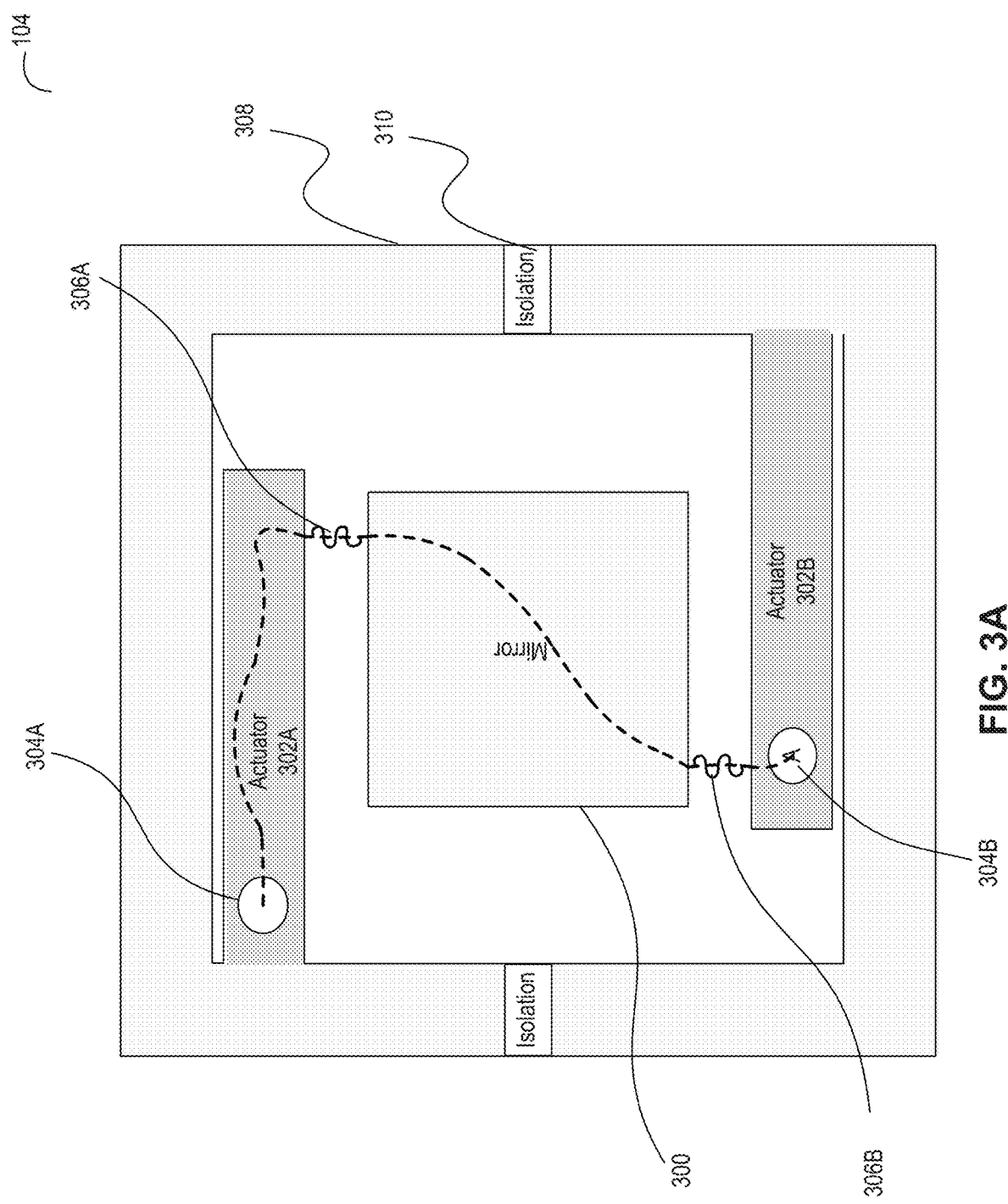
FIGS. 3A, 3B, 3C, and 3D are diagrams illustrating different configurations of scanning units in accordance with some embodiments of the present disclosure.
Figure 3B:
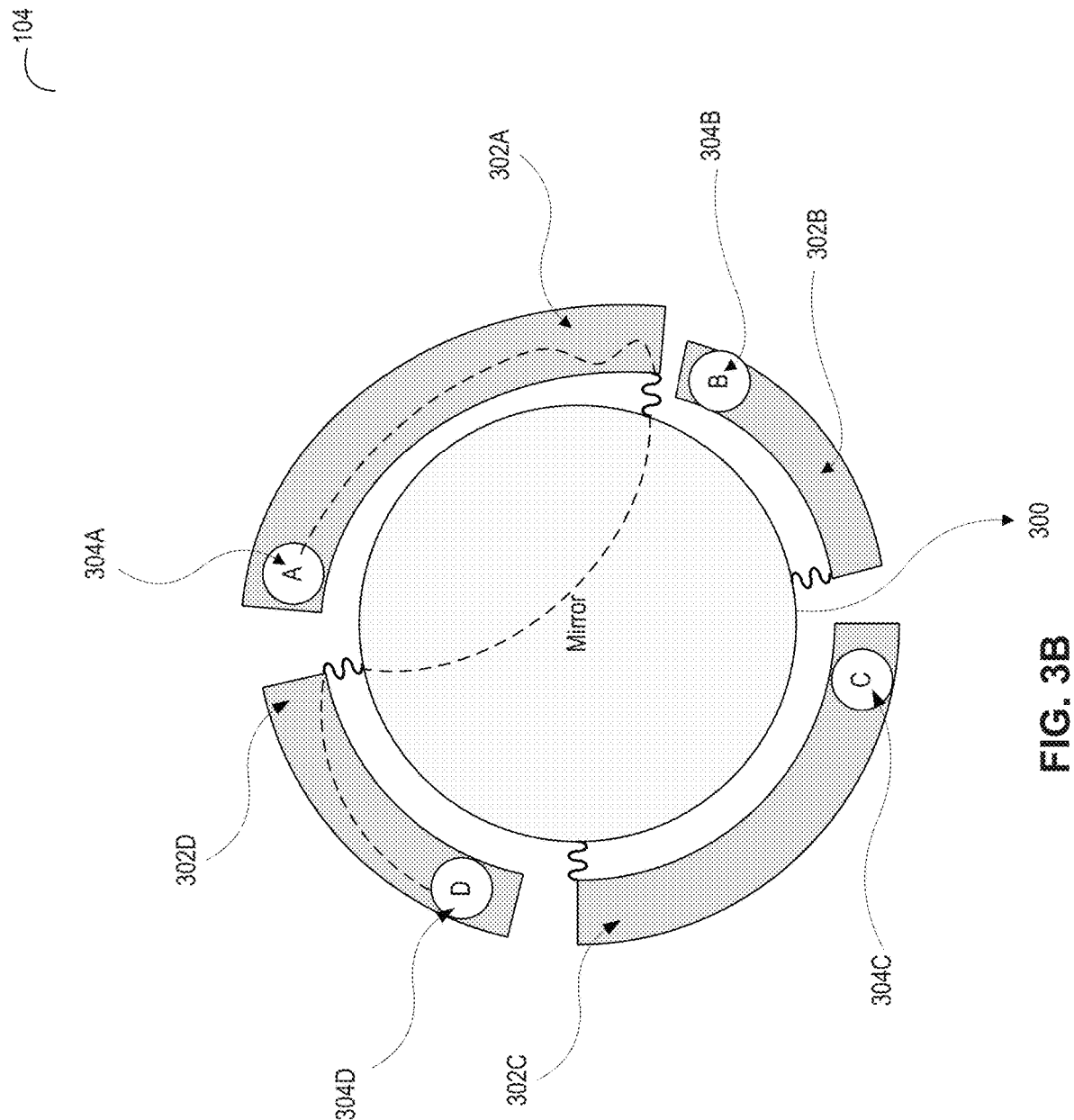
Figure 3C:
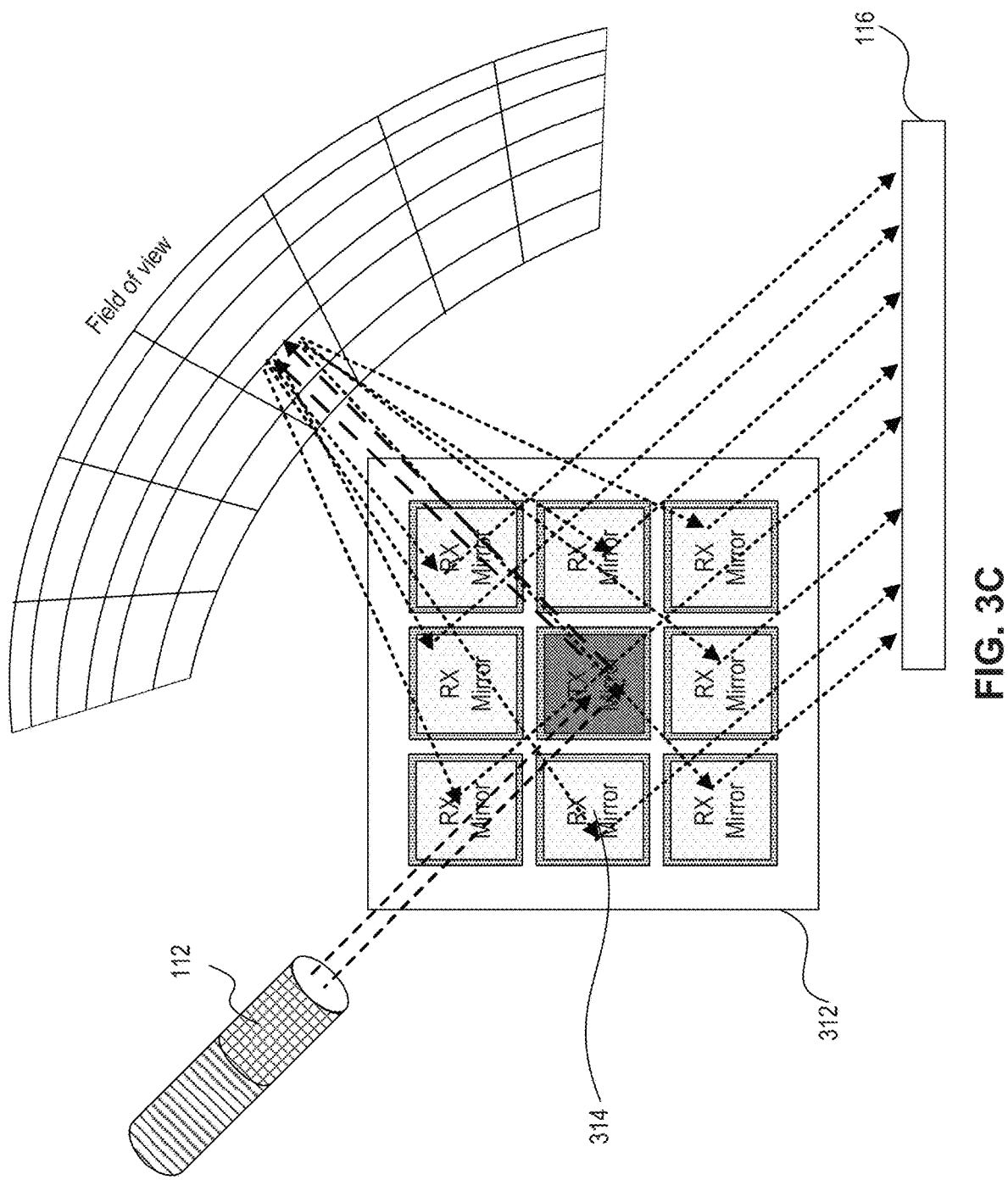
Figure 3D:
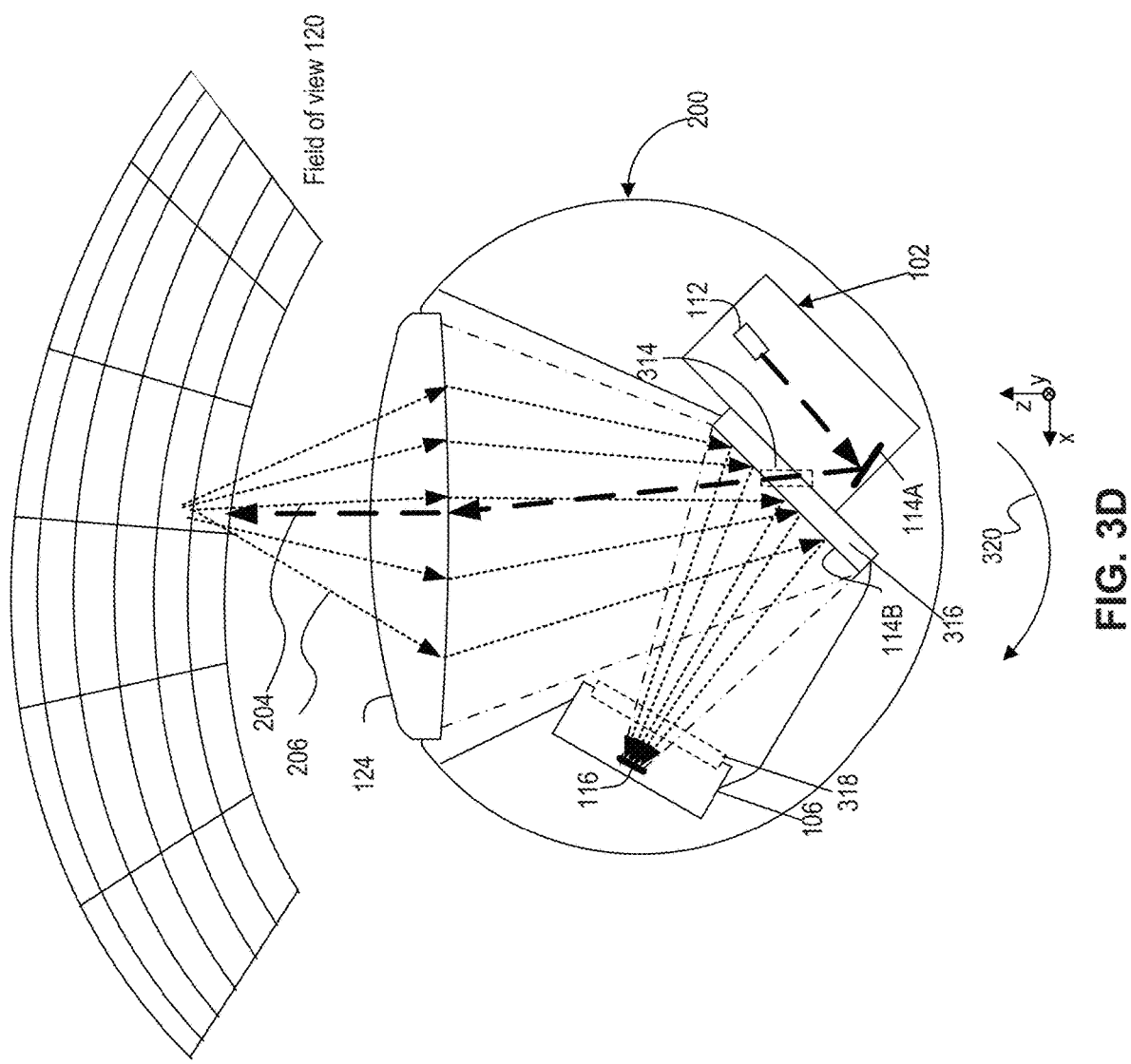

FIGS. 3A-3D depict various configurations of scanning unit 104 and its role in LIDAR system 100. Specifically, FIG. 3A is a diagram illustrating scanning unit 104 with a MEMS mirror (e.g., square shaped), FIG. 3B is a diagram illustrating another scanning unit 104 with a MEMS mirror (e.g., round shaped), FIG. 3C is a diagram illustrating scanning unit 104 with an array of reflectors used for monostatic scanning LIDAR system, and FIG. 3D is a diagram illustrating an example LIDAR system 100 that mechanically scans the environment around LIDAR system 100. One skilled in the art will appreciate that the depicted configurations of scanning unit 104 are exemplary only, and may have numerous variations and modifications within the scope of this disclosure.

FIG. 3A illustrates an example scanning unit 104 with a single axis square MEMS mirror 300. In this example MEMS mirror 300 functions as at least one deflector 114. As shown, scanning unit 104 may include one or more actuators 302 (specifically, 302A and 302B). In one embodiment, actuator 302 may be made of semiconductor (e.g., silicon) and includes a piezoelectric layer (e.g. PZT, Lead zirconate titanate, aluminum nitride), which changes its dimension in response to electric signals applied by an actuation controller, a semi conductive layer, and a base layer. In one embodiment, the physical properties of actuator 302 may determine the mechanical stresses that actuator 302 experiences when electrical current passes through it. When the piezoelectric material is activated it exerts force on actuator 302 and causes it to bend. In one embodiment, the resistivity of one or more actuators 302 may be measured in an active state (Ractive) when mirror 300 is deflected at a certain angular position and compared to the resistivity at a resting state (Rrest). Feedback including Ractive may provide information to determine the actual mirror deflection angle compared to an expected angle, and, if needed, mirror 300 deflection may be corrected. The difference between Rrest and Ractive may be correlated by a mirror drive into an angular deflection value that may serve to close the loop. This embodiment may be used for dynamic tracking of the actual mirror position and may optimize response, amplitude, deflection efficiency, and frequency for both linear mode and resonant mode MEMS mirror schemes.

During scanning, current (represented in the figure as the dashed line) may flow from contact 304A to contact 304B (through actuator 302A, spring 306A, mirror 300, spring 306B, and actuator 302B). Isolation gaps in semiconducting frame 308 such as isolation gap 310 may cause actuator 302A and 302B to be two separate islands connected electrically through springs 306 and frame 308. The current flow, or any associated electrical parameter (voltage, current frequency, capacitance, relative dielectric constant, etc.), may be monitored by an associated position feedback. In case of a mechanical failure—where one of the components is damaged—the current flow through the structure would alter and change from its functional calibrated values. At an extreme situation (for example, when a spring is broken), the current would stop completely due to a circuit break in the electrical chain by means of a faulty element.

FIG. 3B illustrates another example scanning unit 104 with a dual axis round MEMS mirror 300. In this example MEMS mirror 300 functions as at least one deflector 114. In one embodiment, MEMS mirror 300 may have a diameter of between about 1 mm to about 5 mm. As shown, scanning unit 104 may include four actuators 302 (302A, 302B, 302C, and 302D) each may be at a differing length. In the illustrated example, the current (represented in the figure as the dashed line) flows from contact 304A to contact 304D, but in other cases current may flow from contact 304A to contact 304B, from contact 304A to contact 304C, from contact 304B to contact 304C, from contact 304B to contact 304D, or from contact 304C to contact 304D. Consistent with some embodiments, a dual axis MEMS mirror may be configured to deflect light in a horizontal direction and in a vertical direction. For example, the angles of deflection of a dual axis MEMS mirror may be between about 0° to 30° in the vertical direction and between about 0° to 50° in the horizontal direction. One skilled in the art will appreciate that the depicted configuration of mirror 300 may have numerous variations and modifications. In one example, at least of deflector 114 may have a dual axis square-shaped mirror or single axis round-shaped mirror. Examples of round and square mirror are depicted in FIGS. 3A and 3B as examples only. Any shape may be employed depending on system specifications. In one embodiment, actuators 302 may be incorporated as an integral part of at least of deflector 114, such that power to move MEMS mirror 300 is applied directly towards it. In addition, MEMS mirror 300 may be connected to frame 308 by one or more rigid supporting elements. In another embodiment, at least of deflector 114 may include an electrostatic or electromagnetic MEMS mirror.

As described above, a monostatic scanning LIDAR system utilizes at least a portion of the same optical path for emitting projected light 204 and for receiving reflected light 206. The light beam in the outbound path may be collimated and focused into a narrow beam while the reflections in the return path spread into a larger patch of light, due to dispersion. In one embodiment, scanning unit 104 may have a large reflection area in the return path and asymmetrical deflector 216 that redirects the reflections (i.e., reflected light 206) to sensor 116. In one embodiment, scanning unit 104 may include a MEMS mirror with a large reflection area and negligible impact on the field of view and the frame rate performance. Additional details about the asymmetrical deflector 216 are provided below with reference to FIG. 2D.

In some embodiments (e.g. as exemplified in FIG. 3C), scanning unit 104 may include a deflector array (e.g. a reflector array) with small light deflectors (e.g. mirrors). In one embodiment, implementing light deflector 114 as a group of smaller individual light deflectors working in synchronization may allow light deflector 114 to perform at a high scan rate with larger angles of deflection. The deflector array may essentially act as a large light deflector (e.g. a large mirror) in terms of effective area. The deflector array may be operated using a shared steering assembly configuration that allows sensor 116 to collect reflected photons from substantially the same portion of field of view 120 being concurrently illuminated by light source 112. The term "concurrently" means that the two selected functions occur during coincident or overlapping time periods, either where one begins and ends during the duration of the other, or where a later one starts before the completion of the other.

FIG. 3C illustrates an example of scanning unit 104 with a reflector array 312 having small mirrors. In this embodiment, reflector array 312 functions as at least one deflector 114. Reflector array 312 may include a plurality of reflector units 314 configured to pivot (individually or together) and steer light pulses toward field of view 120. For example, reflector array 312 may be a part of an outbound path of light projected from light source 112. Specifically, reflector array 312 may direct projected light 204 towards a portion of field of view 120. Reflector array 312 may also be part of a return path for light reflected from a surface of an object located within an illumined portion of field of view 120. Specifically, reflector array 312 may direct reflected light 206 towards sensor 116 or towards asymmetrical deflector 216. In one example, the area of reflector array 312 may be between about 75 to about 150 $mm^2$, where each reflector units 314 may have a width of about 10 μm and the supporting structure may be lower than 100 μm.

According to some embodiments, reflector array 312 may include one or more sub-groups of steerable deflectors. Each sub-group of electrically steerable deflectors may include one or more deflector units, such as reflector unit 314. For example, each steerable deflector unit 314 may include at least one of a MEMS mirror, a reflective surface assembly, and an electromechanical actuator. In one embodiment, each reflector unit 314 may be individually controlled by an individual processor (not shown), such that it may tilt towards a specific angle along each of one or two separate axes. Alternatively, reflector array 312 may be associated with a common controller (e.g., processor 118) configured to synchronously manage the movement of reflector units 314 such that at least part of them will pivot concurrently and point in approximately the same direction.

In addition, at least one processor 118 may select at least one reflector unit 314 for the outbound path (referred to hereinafter as "TX Mirror") and a group of reflector units 314 for the return path (referred to hereinafter as "RX Mirror"). Consistent with the present disclosure, increasing the number of TX Mirrors may increase a reflected photons beam spread. Additionally, decreasing the number of RX Mirrors may narrow the reception field and compensate for ambient light conditions (such as clouds, rain, fog, extreme heat, and other environmental conditions) and improve the signal to noise ratio. Also, as indicated above, the emitted light beam is typically narrower than the patch of reflected light, and therefore can be fully deflected by a small portion of the deflection array. Moreover, it is possible to block light reflected from the portion of the deflection array used for transmission (e.g. the TX mirror) from reaching sensor 116, thereby reducing an effect of internal reflections of the LIDAR system 100 on system operation. In addition, at least one processor 118 may pivot one or more reflector units 314 to overcome mechanical impairments and drifts due, for example, to thermal and gain effects. In an example, one or more reflector units 314 may move differently than intended (frequency, rate, speed etc.) and their movement may be compensated for by electrically controlling the deflectors appropriately.

FIG. 3D illustrates an exemplary LIDAR system 100 that mechanically scans the environment of LIDAR system 100. In this example, LIDAR system 100 may include a motor or other mechanisms for rotating housing 200 about the axis of the LIDAR system 100. Alternatively, the motor (or other mechanism) may mechanically rotate a rigid structure of LIDAR system 100 on which one or more light sources 112 and one or more sensors 116 are installed, thereby scanning the environment. As described above, projecting unit 102 may include at least one light source 112 configured to project light emission. The projected light emission may travel along an outbound path towards field of view 120. Specifically, the projected light emission may be reflected by deflector 114A through an exit aperture 314 when projected light 204 travel towards optional optical window 124. The reflected light emission may travel along a return path from object 208 towards sensing unit 106. For example, the reflected light 206 may be reflected by deflector 114B when reflected light 206 travels towards sensing unit 106. A person skilled in the art would appreciate that a LIDAR system with a rotation mechanism for synchronically rotating one or more light sources or one or more sensors, may use this synchronized rotation instead of (or in addition to) steering an internal light deflector.

In embodiments in which the scanning of field of view 120 is mechanical, the projected light emission may be directed to exit aperture 314 that is part of a wall 316 separating projecting unit 102 from other parts of LIDAR system 100. In some examples, wall 316 can be formed from a transparent material (e.g., glass) coated with a reflective material to form deflector 114B. In this example, exit aperture 314 may correspond to the portion of wall 316 that is not coated by the reflective material. Additionally or alternatively, exit aperture 314 may include a hole or cut-away in the wall 316. Reflected light 206 may be reflected by deflector 114B and directed towards an entrance aperture 318 of sensing unit 106. In some examples, an entrance aperture 318 may include a filtering window configured to allow wavelengths in a certain wavelength range to enter sensing unit 106 and attenuate other wavelengths. The reflections of object 208 from field of view 120 may be reflected by deflector 114B and hit sensor 116. By comparing several properties of reflected light 206 with projected light 204, at least one aspect of object 208 may be determined. For example, by comparing a time when projected light 204 was emitted by light source 112 and a time when sensor 116 received reflected light 206, a distance between object 208 and LIDAR system 100 may be determined. In some examples, other aspects of object 208, such as shape, color, material, etc. may also be determined.

In some examples, the LIDAR system 100 (or part thereof, including at least one light source 112 and at least one sensor 116) may be rotated about at least one axis to determine a three-dimensional map of the surroundings of the LIDAR system 100. For example, the LIDAR system 100 may be rotated about a substantially vertical axis as illustrated by arrow 320 in order to scan field of 120. Although FIG. 3D illustrates that the LIDAR system 100 is rotated clock-wise about the axis as illustrated by the arrow 320, additionally or alternatively, the LIDAR system 100 may be rotated in a counter clockwise direction. In some examples, the LIDAR system 100 may be rotated 360 degrees about the vertical axis. In other examples, the LIDAR system 100 may be rotated back and forth along a sector smaller than 360-degree of the LIDAR system 100. For example, the LIDAR system 100 may be mounted on a platform that wobbles back and forth about the axis without making a complete rotation.

The Sensing Unit

Figure 4A:
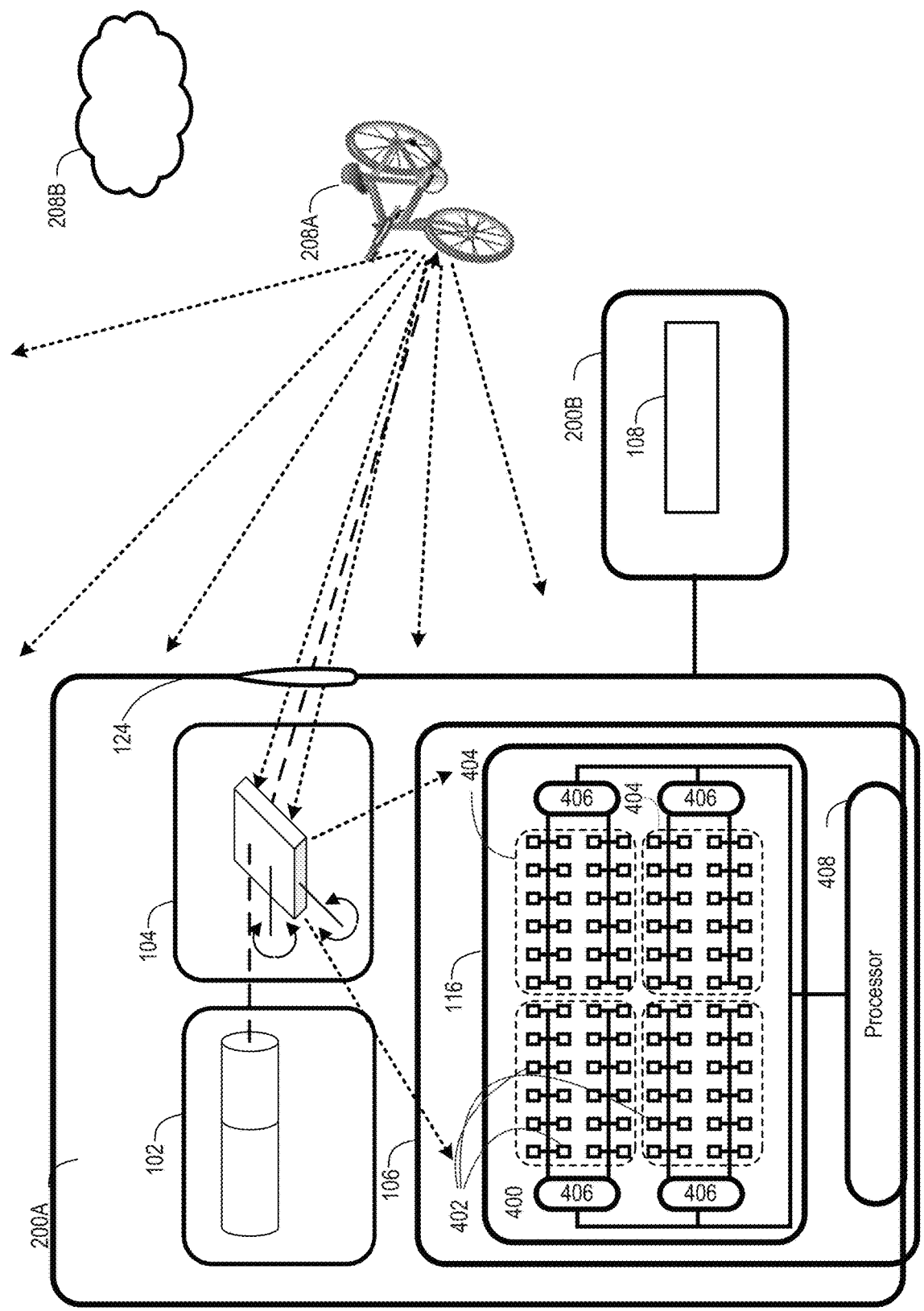
Figure 4B:
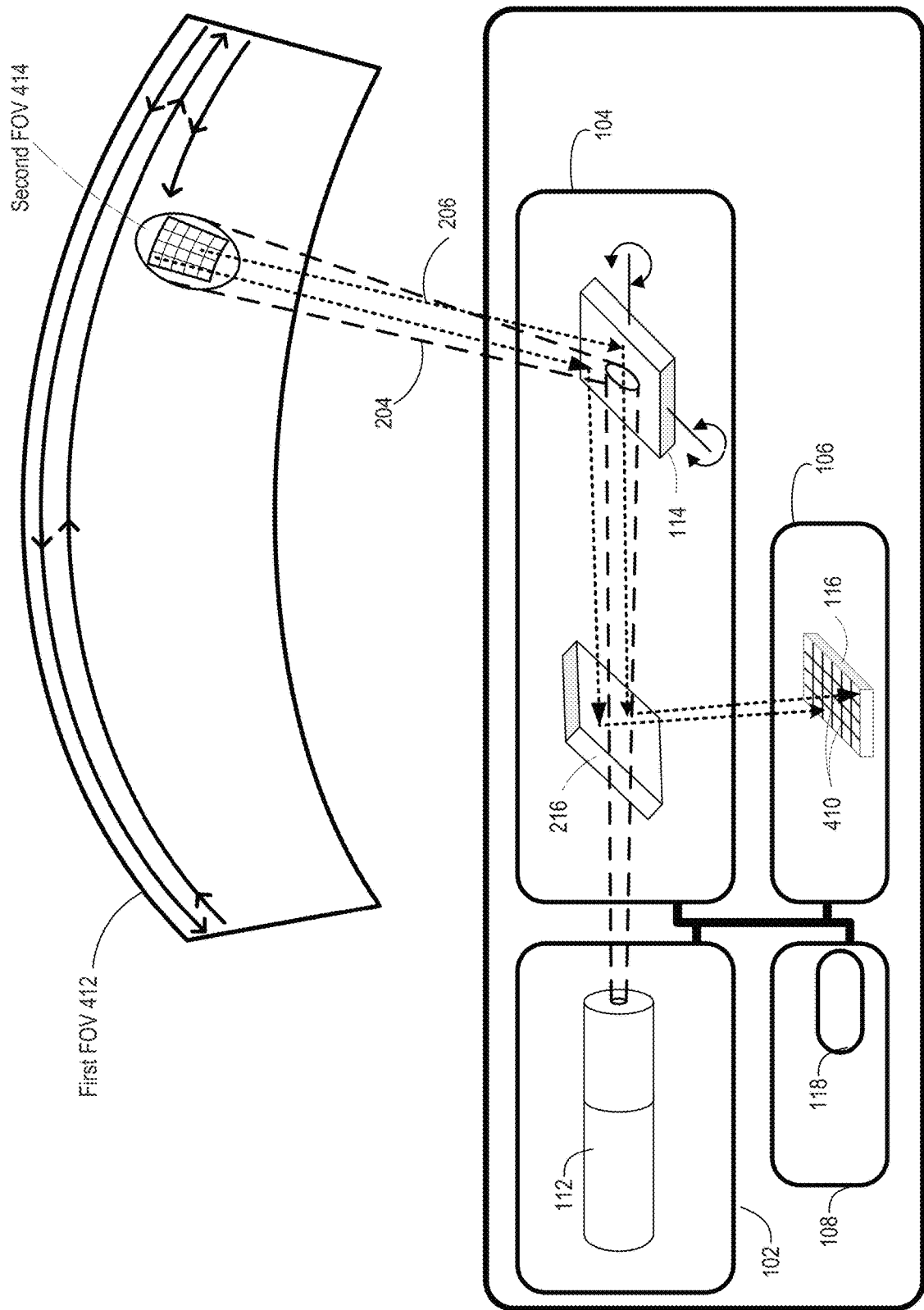
Figure 4D:
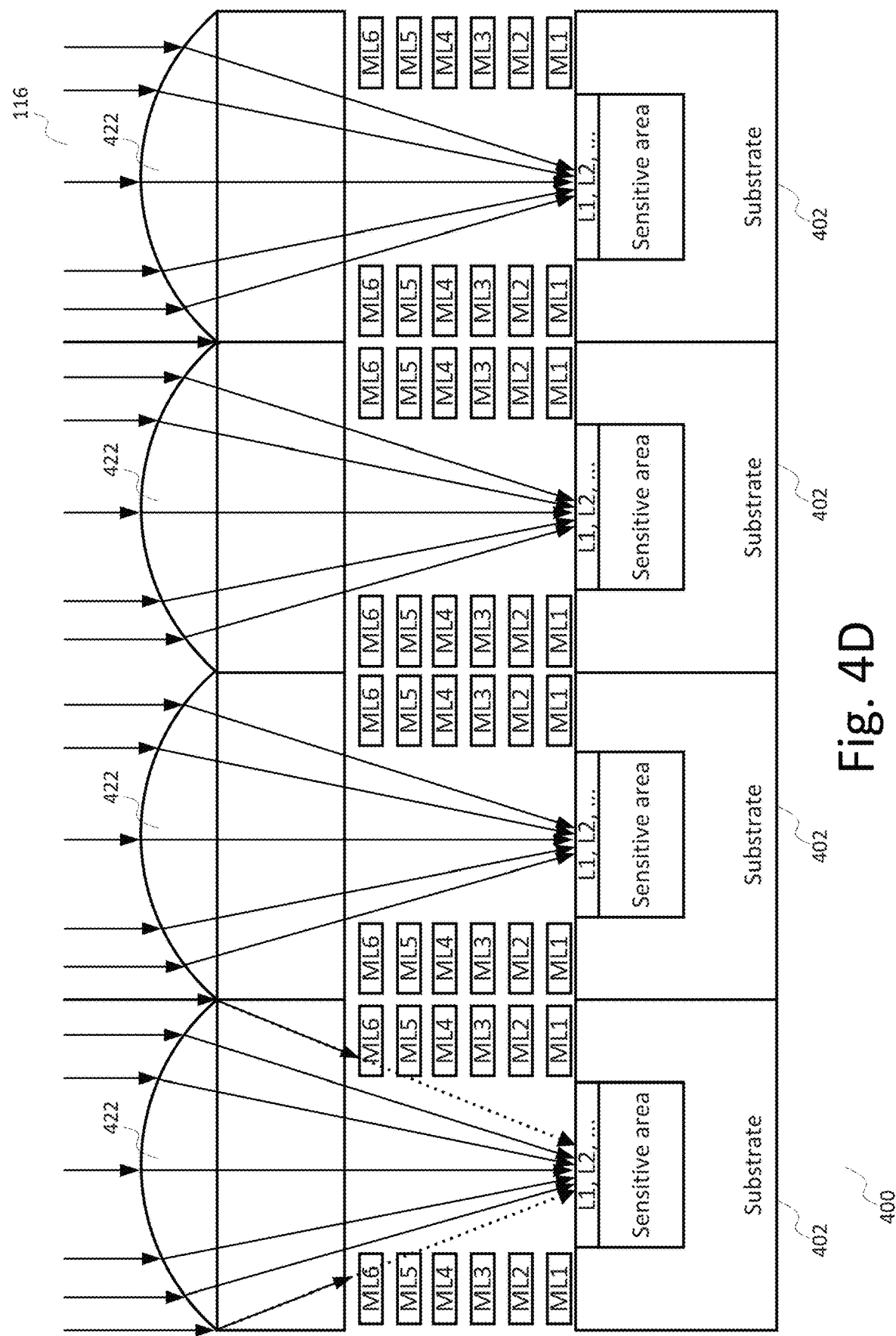

FIGS. 4A-4E depict various configurations of sensing unit 106 and its role in LIDAR system 100. Specifically, FIG. 4A is a diagram illustrating an example sensing unit 106 with a detector array, FIG. 4B is a diagram illustrating monostatic scanning using a two-dimensional sensor, FIG. 4C is a diagram illustrating an example of a two-dimensional sensor 116, FIG. 4D is a diagram illustrating a lens array associated with sensor 116, and FIG. 4E includes three diagram illustrating the lens structure. One skilled in the art will appreciate that the depicted configurations of sensing unit 106 are exemplary only and may have numerous alternative variations and modifications consistent with the principles of this disclosure.

FIG. 4A illustrates an example of sensing unit 106 with detector array 400. In this example, at least one sensor 116 includes detector array 400. LIDAR system 100 is configured to detect objects (e.g., bicycle 208A and cloud 208B) in field of view 120 located at different distances from LIDAR system 100 (could be meters or more). Objects 208 may be a solid object (e.g. a road, a tree, a car, a person), fluid object (e.g. fog, water, atmosphere particles), or object of another type (e.g. dust or a powdery illuminated object). When the photons emitted from light source 112 hit object 208 they either reflect, refract, or get absorbed. Typically, as shown in the figure, only a portion of the photons reflected from object 208A enters optional optical window 124. As each ~15 cm change in distance results in a travel time difference of 1 ns (since the photons travel at the speed of light to and from object 208), the time differences between the travel times of different photons hitting the different objects may be detectable by a time-of-flight sensor with sufficiently quick response.

Sensor 116 includes a plurality of detection elements 402 for detecting photons of a photonic pulse reflected back from field of view 120. The detection elements may all be included in detector array 400, which may have a rectangular arrangement (e.g. as shown) or any other arrangement.

Detection elements 402 may operate concurrently or partially concurrently with each other. Specifically, each detection element 402 may issue detection information for every sampling duration (e.g. every 1 nanosecond). In one example, detector array 400 may be a SiPM (Silicon photomultipliers) which is a solid-state single-photon-sensitive device built from an array of single photon avalanche diodes (SPADs, serving as detection elements 402) on a common silicon substrate. Similar photomultipliers from other, non-silicon materials may also be used. Although a SiPM device works in digital/switching mode, the SiPM is an analog device because all the microcells are read in parallel, making it possible to generate signals within a dynamic range from a single photon to hundreds and thousands of photons detected by the different SPADs. As mentioned above, more than one type of sensor may be implemented (e.g. SiPM and APD). Possibly, sensing unit 106 may include at least one APD integrated into an SiPM array and/or at least one APD detector located next to a SiPM on a separate or common silicon substrate.

In one embodiment, detection elements 402 may be grouped into a plurality of regions 404. The regions are geometrical locations or environments within sensor 116 (e.g. within detector array 400)—and may be shaped in different shapes (e.g. rectangular as shown, squares, rings, and so on, or in any other shape). While not all of the individual detectors, which are included within the geometrical area of a region 404, necessarily belong to that region, in most cases they will not belong to other regions 404 covering other areas of the sensor 310—unless some overlap is desired in the seams between regions. As illustrated in FIG. 4A, the regions may be non-overlapping regions 404, but alternatively, they may overlap. Every region may be associated with a regional output circuitry 406 associated with that region. The regional output circuitry 406 may provide a region output signal of a corresponding group of detection elements 402. For example, the region of output circuitry 406 may be a summing circuit, but other forms of combined output of the individual detector into a unitary output (whether scalar, vector, or any other format) may be employed. Optionally, each region 404 is a single SiPM, but this is not necessarily so, and a region may be a sub-portion of a single SiPM, a group of several SiPMs, or even a combination of different types of detectors.

In the illustrated example, processing unit 108 is located at a separated housing 200B (within or outside) host 210 (e.g. within vehicle 110), and sensing unit 106 may include a dedicated processor 408 for analyzing the reflected light. Alternatively, processing unit 108 may be used for analyzing reflected light 206. It is noted that LIDAR system 100 may be implemented multiple housings in other ways than the illustrated example. For example, light deflector 114 may be located in a different housing than projecting unit 102 and/or sensing module 106. In one embodiment, LIDAR system 100 may include multiple housings connected to each other in different ways, such as: electric wire connection, wireless connection (e.g., RF connection), fiber optics cable, and any combination of the above.

In one embodiment, analyzing reflected light 206 may include determining a time of flight for reflected light 206, based on outputs of individual detectors of different regions. Optionally, processor 408 may be configured to determine the time of flight for reflected light 206 based on the plurality of regions of output signals. In addition to the time of flight, processing unit 108 may analyze reflected light 206 to determine the average power across an entire return pulse, and the photon distribution/signal may be determined over the return pulse period ("pulse shape"). In the illustrated example, the outputs of any detection elements 402 may not be transmitted directly to processor 408, but rather combined (e g summed) with signals of other detectors of the region 404 before being passed to processor 408. However, this is only an example and the circuitry of sensor 116 may transmit information from a detection element 402 to processor 408 via other routes (not via a region output circuitry 406).

FIG. 4B is a diagram illustrating LIDAR system 100 configured to scan the environment of LIDAR system 100 using a two-dimensional sensor 116. In the example of FIG. 4B, sensor 116 is a matrix of 4×6 detectors 410 (also referred to as "pixels"). In one embodiment, a pixel size may be about 1×1 mm. Sensor 116 is two-dimensional in the sense that it has more than one set (e.g. row, column) of detectors 410 in two non-parallel axes (e.g. orthogonal axes, as exemplified in the illustrated examples). The number of detectors 410 in sensor 116 may vary between differing implementations, e.g. depending on the desired resolution, signal to noise ratio (SNR), desired detection distance, and so on. For example, sensor 116 may have anywhere between 5 and 5,000 pixels. In another example (not shown in the figure) Also, sensor 116 may be a one-dimensional matrix (e.g. 1×8 pixels).

It is noted that each detector 410 may include a plurality of detection elements 402, such as Avalanche Photo Diodes (APD), Single Photon Avalanche Diodes (SPADs), combination of Avalanche Photo Diodes (APD) and Single Photon Avalanche Diodes (SPADs) or detecting elements that measure both the time of flight from a laser pulse transmission event to the reception event and the intensity of the received photons. For example, each detector 410 may include anywhere between 20 and 5,000 SPADs. The outputs of detection elements 402 in each detector 410 may be summed, averaged, or otherwise combined to provide a unified pixel output.

In the illustrated example, sensing unit 106 may include a two-dimensional sensor 116 (or a plurality of two-dimensional sensors 116), whose field of view is smaller than field of view 120 of LIDAR system 100. In this discussion, field of view 120 (the overall field of view which can be scanned by LIDAR system 100 without moving, rotating or rolling in any direction) is denoted "first FOV 412", and the smaller FOV of sensor 116 is denoted "second FOV 412" (interchangeably "instantaneous FOV"). The coverage area of second FOV 414 relative to the first FOV 412 may differ, depending on the specific use of LIDAR system 100, and may be, for example, between 0.5% and 50%. In one example, second FOV 412 may be between about 0.05° and 1° elongated in the vertical dimension. Even if LIDAR system 100 includes more than one two-dimensional sensor 116, the combined field of view of the sensors array may still be smaller than the first FOV 412, e.g. by a factor of at least 5, by a factor of at least 10, by a factor of at least 20, or by a factor of at least 50, for example.

In order to cover first FOV 412, scanning unit 106 may direct photons arriving from different parts of the environment to sensor 116 at different times. In the illustrated monostatic configuration, together with directing projected light 204 towards field of view 120 and when least one light deflector 114 is located in an instantaneous position, scanning unit 106 may also direct reflected light 206 to sensor 116. Typically, at every moment during the scanning of first FOV 412, the light beam emitted by LIDAR system 100 covers part of the environment which is larger than the second FOV 414 (in angular opening) and includes the part of the environment from which light is collected by scanning unit 104 and sensor 116.

FIG. 4C is a diagram illustrating an example of a two-dimensional sensor 116. In this embodiment, sensor 116 is a matrix of 8×5 detectors 410 and each detector 410 includes a plurality of detection elements 402. In one example, detector 410A is located in the second row (denoted "R2") and third column (denoted "C3") of sensor 116, which includes a matrix of 4×3 detection elements 402. In another example, detector 410B located in the fourth row (denoted "R4") and sixth column (denoted "C6") of sensor 116 includes a matrix of 3×3 detection elements 402. Accordingly, the number of detection elements 402 in each detector 410 may be constant, or may vary, and differing detectors 410 in a common array may have a different number of detection elements 402. The outputs of all detection elements 402 in each detector 410 may be summed, averaged, or otherwise combined to provide a single pixel-output value. It is noted that while detectors 410 in the example of FIG. 4C are arranged in a rectangular matrix (straight rows and straight columns), other arrangements may also be used, e.g. a circular arrangement or a honeycomb arrangement.

According to some embodiments, measurements from each detector 410 may enable determination of the time of flight from a light pulse emission event to the reception event and the intensity of the received photons. The reception event may be the result of the light pulse being reflected from object 208. The time of flight may be a timestamp value that represents the distance of the reflecting object to optional optical window 124. Time of flight values may be realized by photon detection and counting methods, such as Time Correlated Single Photon Counters (TCSPC), analog methods for photon detection such as signal integration and qualification (via analog to digital converters or plain comparators) or otherwise.

In some embodiments and with reference to FIG. 4B, during a scanning cycle, each instantaneous position of at least one light deflector 114 may be associated with a particular portion 122 of field of view 120. The design of sensor 116 enables an association between the reflected light from a single portion of field of view 120 and multiple detectors 410. Therefore, the scanning resolution of LIDAR system may be represented by the number of instantaneous positions (per scanning cycle) times the number of detectors 410 in sensor 116. The information from each detector 410 (i.e., each pixel) represents the basic data element that from which the captured field of view in the three-dimensional space is built. This may include, for example, the basic element of a point cloud representation, with a spatial position and an associated reflected intensity value. In one embodiment, the reflections from a single portion of field of view 120 that are detected by multiple detectors 410 may be returning from different objects located in the single portion of field of view 120. For example, the single portion of field of view 120 may be greater than 50×50 cm at the far field, which can easily include two, three, or more objects partly covered by each other.

FIG. 4D is a cross cut diagram of a part of sensor 116, in accordance with examples of the presently disclosed subject matter. The illustrated part of sensor 116 includes a part of a detector array 400 which includes four detection elements 402 (e.g., four SPADs, four APDs). Detector array 400 may be a photodetector sensor realized in complementary metal-oxide-semiconductor (CMOS). Each of the detection elements 402 has a sensitive area, which is positioned within a substrate surrounding. While not necessarily so, sensor 116 may be used in a monostatic LiDAR system having a narrow field of view (e.g., because scanning unit 104 scans different parts of the field of view at different times). The narrow field of view for the incoming light beam—if implemented—eliminates the problem of out-of-focus imaging. As exemplified in FIG. 4D, sensor 116 may include a plurality of lenses 422 (e.g., microlenses), each lens 422 may direct incident light toward a different detection element 402 (e.g., toward an active area of detection element 402), which may be usable when out-of-focus imaging is not an issue. Lenses 422 may be used for increasing an optical fill factor and sensitivity of detector array 400, because most of the light that reaches sensor 116 may be deflected toward the active areas of detection elements 402

Detector array 400, as exemplified in FIG. 4D, may include several layers built into the silicon substrate by various methods (e.g., implant) resulting in a sensitive area, contact elements to the metal layers and isolation elements (e.g., shallow trench implant STI, guard rings, optical trenches, etc.). The sensitive area may be a volumetric element in the CMOS detector that enables the optical conversion of incoming photons into a current flow given an adequate voltage bias is applied to the device. In the case of a APD/SPAD, the sensitive area would be a combination of an electrical field that pulls electrons created by photon absorption towards a multiplication area where a photon induced electron is amplified creating a breakdown avalanche of multiplied electrons.

A front side illuminated detector (e.g., as illustrated in FIG. 4D) has the input optical port at the same side as the metal layers residing on top of the semiconductor (Silicon). The metal layers are required to realize the electrical connections of each individual photodetector element (e.g., anode and cathode) with various elements such as: bias voltage, quenching/ballast elements, and other photodetectors in a common array. The optical port through which the photons impinge upon the detector sensitive area is comprised of a passage through the metal layer. It is noted that passage of light from some directions through this passage may be blocked by one or more metal layers (e.g., metal layer ML6, as illustrated for the leftmost detector elements 402 in FIG. 4D). Such blockage reduces the total optical light absorbing efficiency of the detector.

Figure 4E:
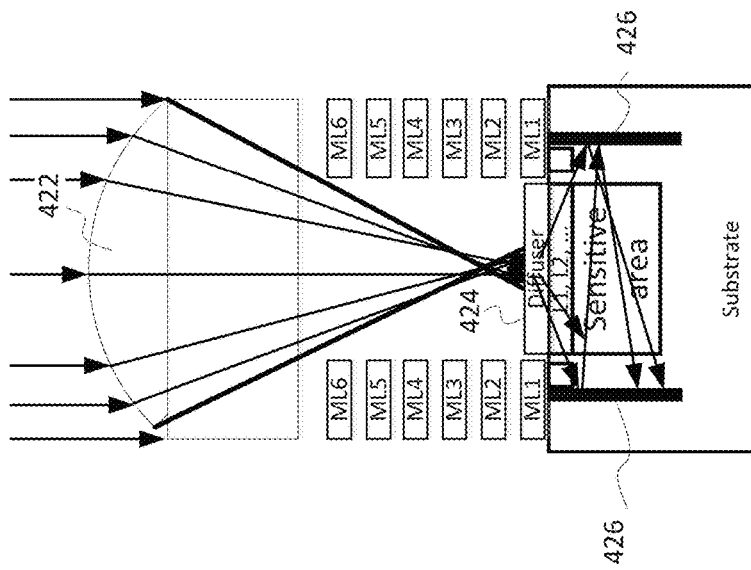
Figure 4E:
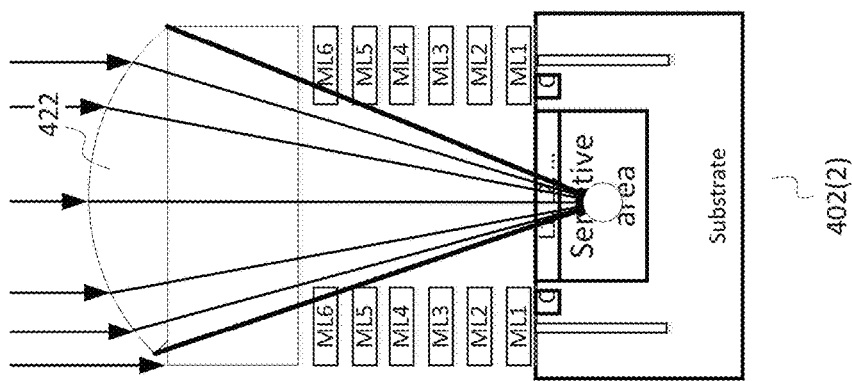
Figure 4E:
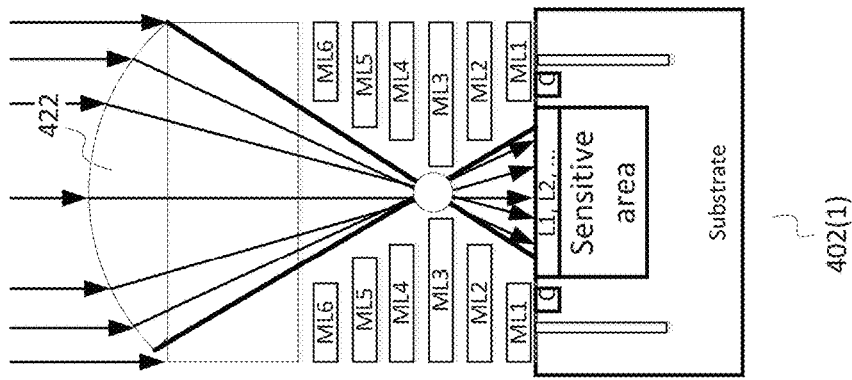

FIG. 4E illustrates three detection elements 402, each with an associated lens 422, in accordance with examples of the presenting disclosed subject matter. Each of the three detection elements of FIG. 4E, denoted 402(1), 402(2), and 402(3), illustrates a lens configuration which may be implemented in associated with one or more of the detecting elements 402 of sensor 116. It is noted that combinations of these lens configurations may also be implemented.

In the lens configuration illustrated with regards to detection element 402(1), a focal point of the associated lens 422 may be located above the semiconductor surface. Optionally, openings in different metal layers of the detection element may have different sizes aligned with the cone of focusing light generated by the associated lens 422. Such a structure may improve the signal-to-noise and resolution of the array 400 as a whole device. Large metal layers may be important for delivery of power and ground shielding. This approach may be useful, e.g., with a monostatic LiDAR design with a narrow field of view where the incoming light beam is comprised of parallel rays and the imaging focus does not have any consequence to the detected signal.

In the lens configuration illustrated with regards to detection element 402(2), an efficiency of photon detection by the detection elements 402 may be improved by identifying a sweet spot. Specifically, a photodetector implemented in CMOS may have a sweet spot in the sensitive volume area where the probability of a photon creating an avalanche effect is the highest. Therefore, a focal point of lens 422 may be positioned inside the sensitive volume area at the sweet spot location, as demonstrated by detection elements 402(2). The lens shape and distance from the focal point may take into account the refractive indices of all the elements the laser beam is passing along the way from the lens to the sensitive sweet spot location buried in the semiconductor material.

In the lens configuration illustrated with regards to the detection element on the right of FIG. 4E, an efficiency of photon absorption in the semiconductor material may be improved using a diffuser and reflective elements. Specifically, a near IR wavelength requires a significantly long path of silicon material in order to achieve a high probability of absorbing a photon that travels through. In a typical lens configuration, a photon may traverse the sensitive area and may not be absorbed into a detectable electron. A long absorption path that improves the probability for a photon to create an electron renders the size of the sensitive area towards less practical dimensions (tens of um for example) for a CMOS device fabricated with typical foundry processes. The rightmost detector element in FIG. 4E demonstrates a technique for processing incoming photons. The associated lens 422 focuses the incoming light onto a diffuser element 424. In one embodiment, light sensor 116 may further include a diffuser located in the gap distant from the outer surface of at least some of the detectors. For example, diffuser 424 may steer the light beam sideways (e.g., as perpendicular as possible) towards the sensitive area and the reflective optical trenches 426. The diffuser is located at the focal point, above the focal point, or below the focal point. In this embodiment, the incoming light may be focused on a specific location where a diffuser element is located. Optionally, detector element 422 is designed to optically avoid the inactive areas where a photon induced electron may get lost and reduce the effective detection efficiency. Reflective optical trenches 426 (or other forms of optically reflective structures) cause the photons to bounce back and forth across the sensitive area, thus increasing the likelihood of detection. Ideally, the photons will get trapped in a cavity consisting of the sensitive area and the reflective trenches indefinitely until the photon is absorbed and creates an electron/hole pair.

Consistent with the present disclosure, a long path is created for the impinging photons to be absorbed and contribute to a higher probability of detection. Optical trenches may also be implemented in detecting element 422 for reducing cross talk effects of parasitic photons created during an avalanche that may leak to other detectors and cause false detection events. According to some embodiments, a photo detector array may be optimized so that a higher yield of the received signal is utilized, meaning, that as much of the received signal is received and less of the signal is lost to internal degradation of the signal. The photo detector array may be improved by: (a) moving the focal point at a location above the semiconductor surface, optionally by designing the metal layers above the substrate appropriately; (b) by steering the focal point to the most responsive/sensitive area (or "sweet spot") of the substrate and (c) adding a diffuser above the substrate to steer the signal toward the "sweet spot" and/or adding reflective material to the trenches so that deflected signals are reflected back to the "sweet spot."

While in some lens configurations, lens 422 may be positioned so that its focal point is above a center of the corresponding detection element 402, it is noted that this is not necessarily so. In other lens configuration, a position of the focal point of the lens 422 with respect to a center of the corresponding detection element 402 is shifted based on a distance of the respective detection element 402 from a center of the detection array 400. This may be useful in relatively larger detection arrays 400, in which detector elements further from the center receive light in angles which are increasingly off-axis. Shifting the location of the focal points (e.g., toward the center of detection array 400) allows correcting for the incidence angles. Specifically, shifting the location of the focal points (e.g., toward the center of detection array 400) allows correcting for the incidence angles while using substantially identical lenses 422 for all detection elements, which are positioned at the same angle with respect to a surface of the detector.

Adding an array of lenses 422 to an array of detection elements 402 may be useful when using a relatively small sensor 116 which covers only a small part of the field of view because in such a case, the reflection signals from the scene reach the detectors array 400 from substantially the same angle, and it is, therefore, easy to focus all the light onto individual detectors. It is also noted, that in one embodiment, lenses 422 may be used in LIDAR system 100 for favoring about increasing the overall probability of detection of the entire array 400 (preventing photons from being "wasted" in the dead area between detectors/sub-detectors) at the expense of spatial distinctiveness. This embodiment is in contrast to prior art implementations such as CMOS RGB camera, which prioritize spatial distinctiveness (i.e., light that propagates in the direction of detection element A is not allowed to be directed by the lens toward detection element B, that is, to "bleed" to another detection element of the array). Optionally, sensor 116 includes an array of lens 422, each being correlated to a corresponding detection element 402, while at least one of the lenses 422 deflects light which propagates to a first detection element 402 toward a second detection element 402 (thereby it may increase the overall probability of detection of the entire array).

Specifically, consistent with some embodiments of the present disclosure, light sensor 116 may include an array of light detectors (e.g., detector array 400), each light detector (e.g., detector 410) being configured to cause an electric current to flow when light passes through an outer surface of a respective detector. In addition, light sensor 116 may include at least one micro-lens configured to direct light toward the array of light detectors, the at least one micro-lens having a focal point. Light sensor 116 may further include at least one layer of conductive material interposed between the at least one micro-lens and the array of light detectors and having a gap therein to permit light to pass from the at least one micro-lens to the array, the at least one layer being sized to maintain a space between the at least one micro-lens and the array to cause the focal point (e.g., the focal point may be a plane) to be located in the gap, at a location spaced from the detecting surfaces of the array of light detectors.

In related embodiments, each detector may include a plurality of Single Photon Avalanche Diodes (SPADs) or a plurality of Avalanche Photo Diodes (APD). The conductive material may be a multi-layer metal constriction, and the at least one layer of conductive material may be electrically connected to detectors in the array. In one example, the at least one layer of conductive material includes a plurality of layers. In addition, the gap may be shaped to converge from the at least one micro-lens toward the focal point, and to diverge from a region of the focal point toward the array. In other embodiments, light sensor 116 may further include at least one reflector adjacent each photo detector. In one embodiment, a plurality of micro-lenses may be arranged in a lens array and the plurality of detectors may be arranged in a detector array. In another embodiment, the plurality of micro-lenses may include a single lens configured to project light to a plurality of detectors in the array.

Referring by way of a nonlimiting example to FIGS. 2E, 2F and 2G, it is noted that the one or more sensors 116 of system 100 may receive light from a scanning deflector 114 or directly from the FOV without scanning Even if light from the entire FOV arrives to the at least one sensor 116 at the same time, in some implementations the one or more sensors 116 may sample only parts of the FOV for detection output at any given time. For example, if the illumination of projection unit 102 illuminates different parts of the FOV at different times (whether using a deflector 114 and/or by activating different light sources 112 at different times), light may arrive at all of the pixels or sensors 116 of sensing unit 106, and only pixels/sensors which are expected to detect the LIDAR illumination may be actively collecting data for detection outputs. This way, the rest of the pixels/sensors do not unnecessarily collect ambient noise. Referring to the scanning—in the outbound or in the inbound directions—it is noted that substantially different scales of scanning may be implemented. For example, in some implementations the scanned area may cover 1% or 0.1% of the FOV, while in other implementations the scanned area may cover 10% or 25% of the FOV. All other relative portions of the FOV values may also be implemented, of course.

The Processing Unit

Figure 5A:
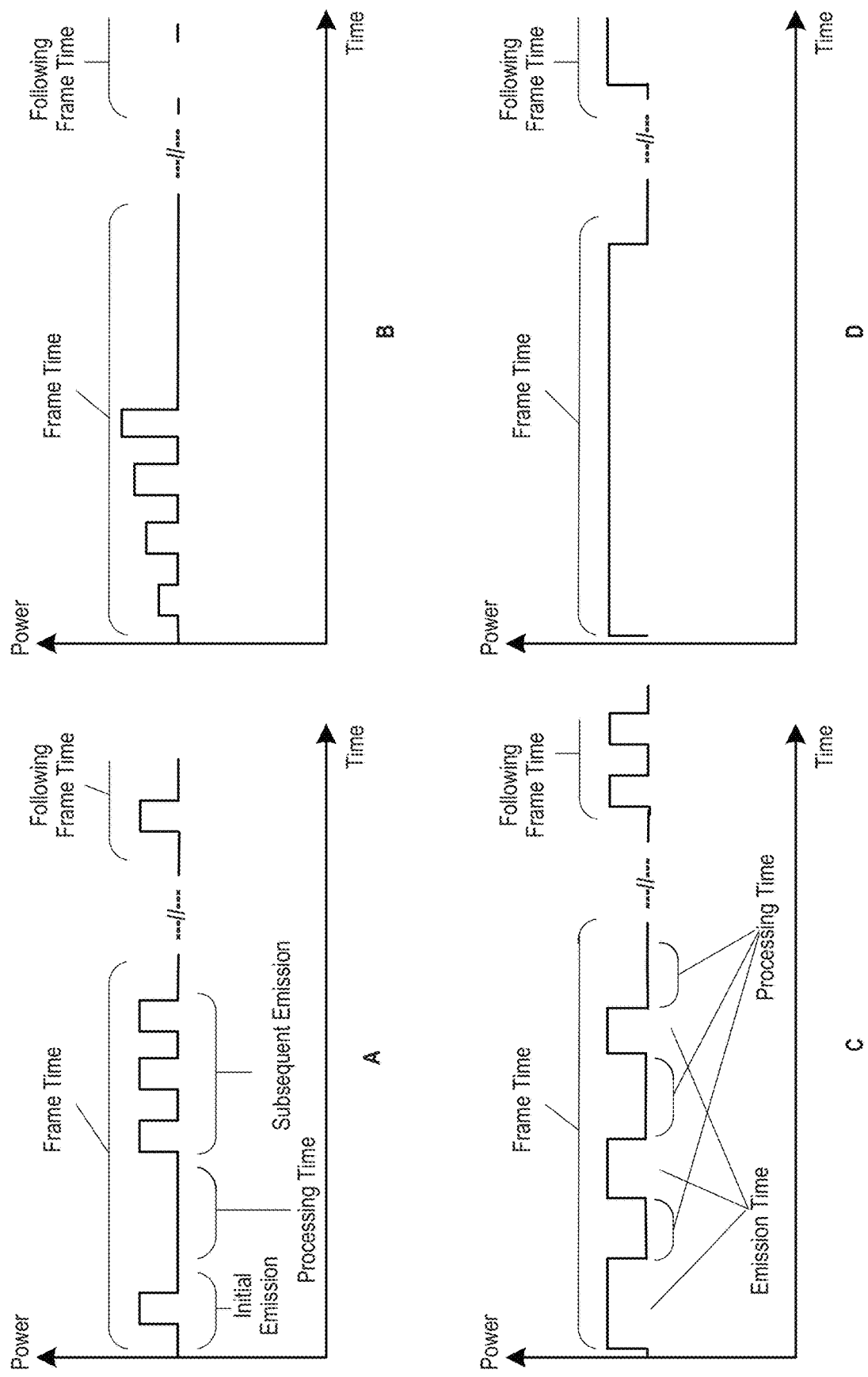
FIG. 5A includes four example diagrams illustrating emission patterns in a single frame-time for a single portion of the field of view.
Figure 5B:
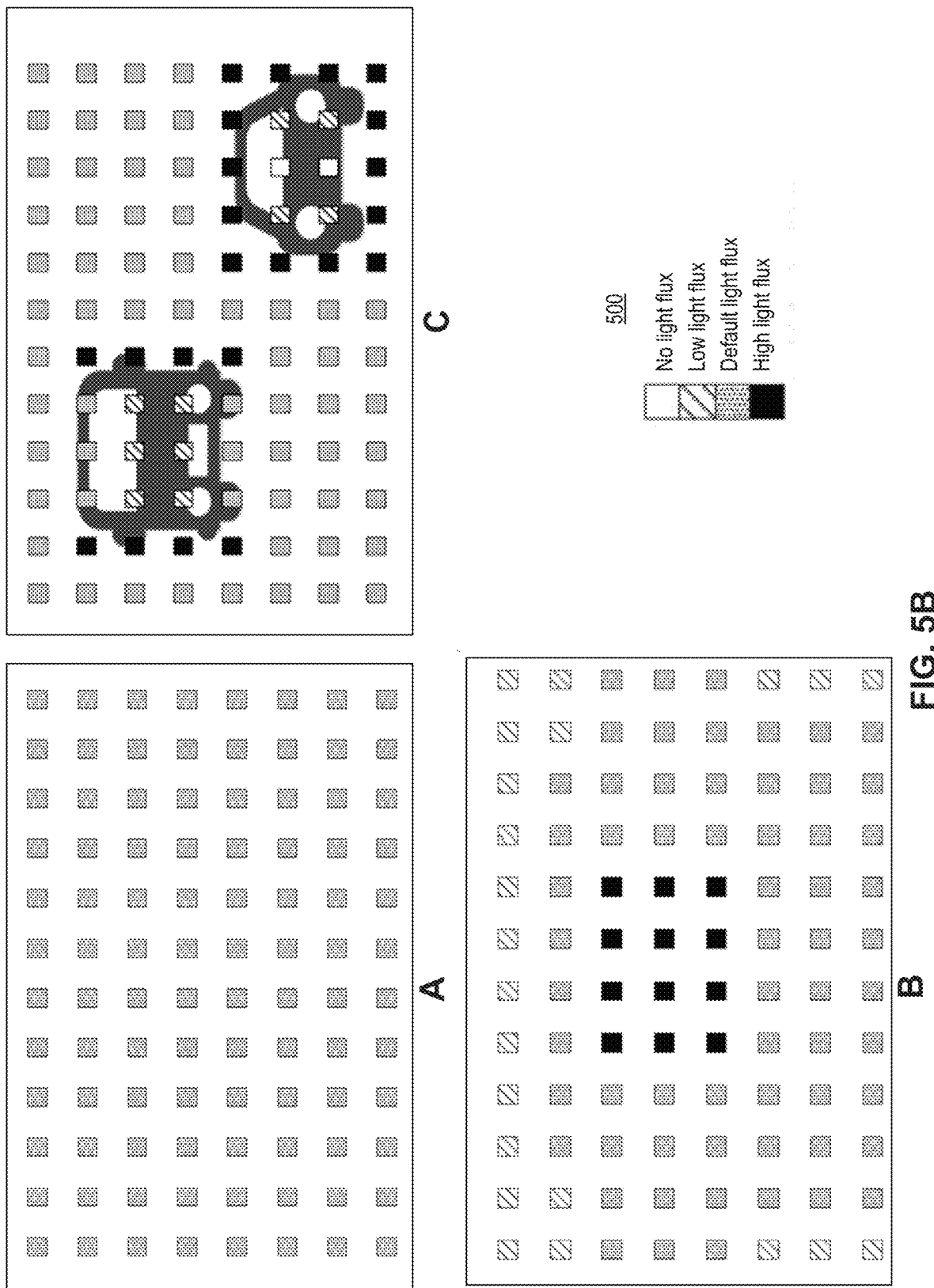
FIG. 5B includes three example diagrams illustrating emission scheme in a single frame-time for the whole field of view.
Figure 5C:
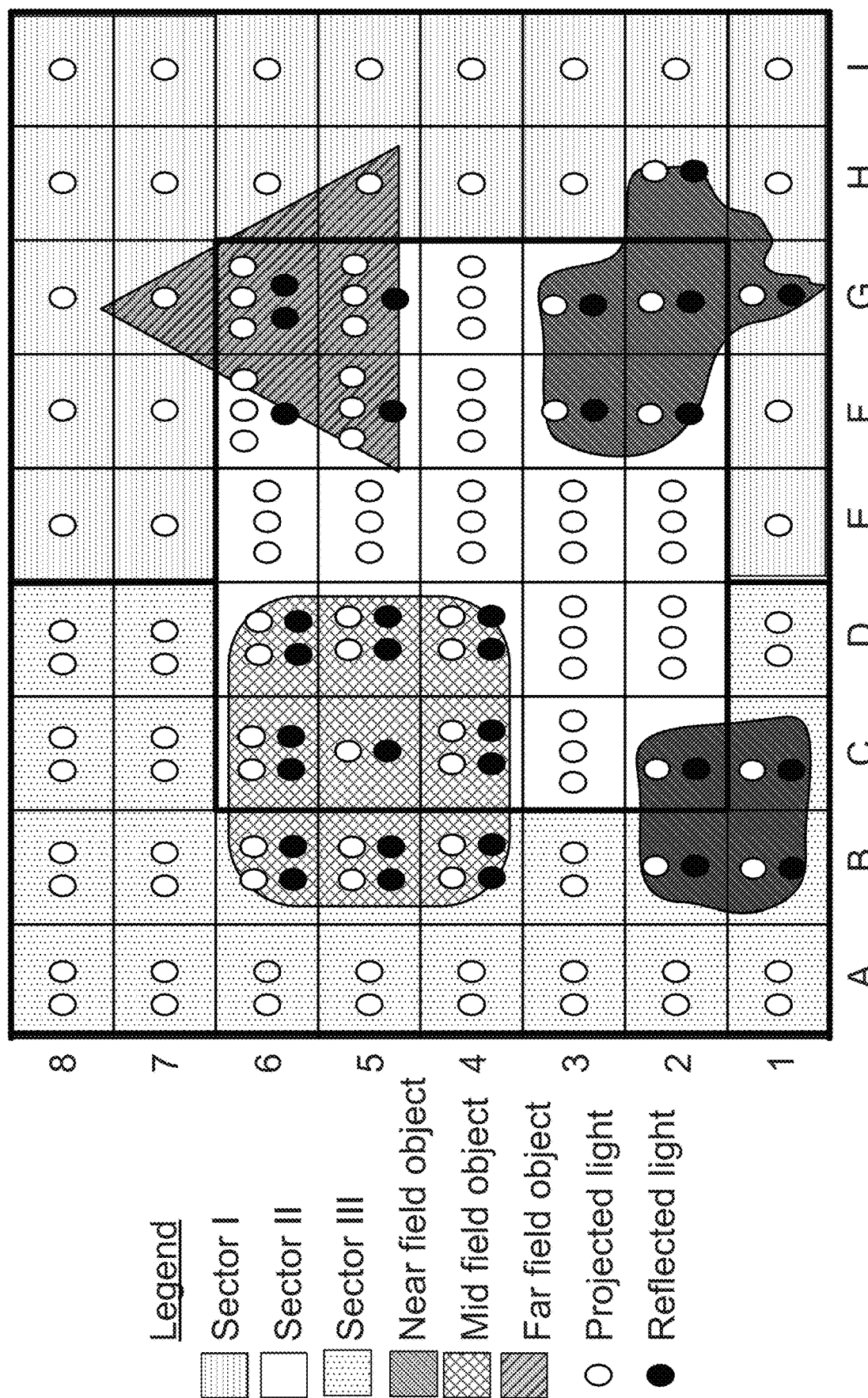
FIG. 5C is a diagram illustrating the actual light emission projected towards and reflections received during a single frame-time for the whole field of view.

FIGS. 5A-5C depict different functionalities of processing units 108 in accordance with some embodiments of the present disclosure. Specifically, FIG. 5A is a diagram illustrating emission patterns in a single frame-time for a single portion of the field of view, FIG. 5B is a diagram illustrating emission scheme in a single frame-time for the whole field of view, and FIG. 5C is a diagram illustrating the actual light emission projected towards field of view during a single scanning cycle.

FIG. 5A illustrates four examples of emission patterns in a single frame-time for a single portion 122 of field of view 120 associated with an instantaneous position of at least one light deflector 114. Consistent with embodiments of the present disclosure, processing unit 108 may control at least one light source 112 and light deflector 114 (or coordinate the operation of at least one light source 112 and at least one light deflector 114) in a manner enabling light flux to vary over a scan of field of view 120. Consistent with other embodiments, processing unit 108 may control only at least one light source 112 and light deflector 114 may be moved or pivoted in a fixed predefined pattern.

Diagrams A-D in FIG. 5A depict the power of light emitted towards a single portion 122 of field of view 120 over time. In Diagram A, processor 118 may control the operation of light source 112 in a manner such that during scanning of field of view 120 an initial light emission is projected toward portion 122 of field of view 120. When projecting unit 102 includes a pulsed-light light source, the initial light emission may include one or more initial pulses (also referred to as "pilot pulses"). Processing unit 108 may receive from sensor 116 pilot information about reflections associated with the initial light emission. In one embodiment, the pilot information may be represented as a single signal based on the outputs of one or more detectors (e.g. one or more SPADs, one or more APDs, one or more SiPMs, etc.) or as a plurality of signals based on the outputs of multiple detectors. In one example, the pilot information may include analog and/or digital information. In another example, the pilot information may include a single value and/or a plurality of values (e.g. for different times and/or parts of the segment).

Based on information about reflections associated with the initial light emission, processing unit 108 may be configured to determine the type of subsequent light emission to be projected towards portion 122 of field of view 120. The determined subsequent light emission for the particular portion of field of view 120 may be made during the same scanning cycle (i.e., in the same frame) or in a subsequent scanning cycle (i.e., in a subsequent frame).

In Diagram B, processor 118 may control the operation of light source 112 in a manner such that during scanning of field of view 120 light pulses in different intensities are projected towards a single portion 122 of field of view 120. In one embodiment, LIDAR system 100 may be operable to generate depth maps of one or more different types, such as any one or more of the following types: point cloud model, polygon mesh, depth image (holding depth information for each pixel of an image or of a 2D array), or any other type of 3D model of a scene. The sequence of depth maps may be a temporal sequence, in which different depth maps are generated at a different time. Each depth map of the sequence associated with a scanning cycle (interchangeably "frame") may be generated within the duration of a corresponding subsequent frame-time. In one example, a typical frame-time may last less than a second. In some embodiments, LIDAR system 100 may have a fixed frame rate (e.g. 10 frames per second, 25 frames per second, 50 frames per second) or the frame rate may be dynamic. In other embodiments, the frame-times of different frames may not be identical across the sequence. For example, LIDAR system 100 may implement a 10 frames-per-second rate that includes generating a first depth map in 100 milliseconds (the average), a second frame in 92 milliseconds, a third frame at 142 milliseconds, and so on.

In Diagram C, processor 118 may control the operation of light source 112 in a manner such that during scanning of field of view 120 light pulses associated with different durations are projected towards a single portion 122 of field of view 120. In one embodiment, LIDAR system 100 may be operable to generate a different number of pulses in each frame. The number of pulses may vary between 0 to 32 pulses (e.g., 1, 5, 12, 28, or more pulses) and may be based on information derived from previous emissions. The time between light pulses may depend on desired detection range and can be between 500 ns and 5000 ns. In one example, processing unit 108 may receive from sensor 116 information about reflections associated with each light-pulse. Based on the information (or the lack of information), processing unit 108 may determine if additional light pulses are needed. It is noted that the durations of the processing times and the emission times in diagrams A-D are not in-scale. Specifically, the processing time may be substantially longer than the emission time. In diagram D, projecting unit 102 may include a continuous-wave light source. In one embodiment, the initial light emission may include a period of time where light is emitted and the subsequent emission may be a continuation of the initial emission, or there may be a discontinuity. In one embodiment, the intensity of the continuous emission may change over time.

Consistent with some embodiments of the present disclosure, the emission pattern may be determined per each portion of field of view 120. In other words, processor 118 may control the emission of light to allow differentiation in the illumination of different portions of field of view 120. In one example, processor 118 may determine the emission pattern for a single portion 122 of field of view 120, based on detection of reflected light from the same scanning cycle (e.g., the initial emission), which makes LIDAR system 100 extremely dynamic. In another example, processor 118 may determine the emission pattern for a single portion 122 of field of view 120, based on detection of reflected light from a previous scanning cycle. The differences in the patterns of the subsequent emissions may result from determining different values for light-source parameters for the subsequent emission, such as any one of the following:

a. Overall energy of the subsequent emission.
   b. Energy profile of the subsequent emission.
   c. A number of light-pulse-repetition per frame.
   d. Light modulation characteristics such as duration, rate, peak, average power, and pulse shape.
   e. Wave properties of the subsequent emission, such as polarization, wavelength, etc.

Consistent with the present disclosure, the differentiation in the subsequent emissions may be put to different uses. In one example, it is possible to limit emitted power levels in one portion of field of view 120 where safety is a consideration, while emitting higher power levels (thus improving signal-to-noise ratio and detection range) for other portions of field of view 120. This is relevant for eye safety, but may also be relevant for skin safety, safety of optical systems, safety of sensitive materials, and more. In another example, it is possible to direct more energy towards portions of field of view 120 where it will be of greater use (e.g. regions of interest, further distanced targets, low reflection targets, etc.) while limiting the lighting energy to other portions of field of view 120 based on detection results from the same frame or previous frame. It is noted that processing unit 108 may process detected signals from a single instantaneous field of view several times within a single scanning frame time; for example, subsequent emission may be determined upon after every pulse emitted, or after a number of pulses emitted.

FIG. 5B illustrates three examples of emission schemes in a single frame-time for field of view 120. Consistent with embodiments of the present disclosure, at least on processing unit 108 may use obtained information to dynamically adjust the operational mode of LIDAR system 100 and/or determine values of parameters of specific components of LIDAR system 100. The obtained information may be determined from processing data captured in field of view 120, or received (directly or indirectly) from host 210. Processing unit 108 may use the obtained information to determine a scanning scheme for scanning the different portions of field of view 120. The obtained information may include a current light condition, a current weather condition, a current driving environment of the host vehicle, a current location of the host vehicle, a current trajectory of the host vehicle, a current topography of road surrounding the host vehicle, or any other condition or object detectable through light reflection. In some embodiments, the determined scanning scheme may include at least one of the following: (a) a designation of portions within field of view 120 to be actively scanned as part of a scanning cycle, (b) a projecting plan for projecting unit 102 that defines the light emission profile at different portions of field of view 120; (c) a deflecting plan for scanning unit 104 that defines, for example, a deflection direction, frequency, and designating idle elements within a reflector array; and (d) a detection plan for sensing unit 106 that defines the detectors sensitivity or responsivity pattern.

In addition, processing unit 108 may determine the scanning scheme at least partially by obtaining an identification of at least one region of interest within the field of view 120 and at least one region of non-interest within the field of view 120. In some embodiments, processing unit 108 may determine the scanning scheme at least partially by obtaining an identification of at least one region of high interest within the field of view 120 and at least one region of lower-interest within the field of view 120. The identification of the at least one region of interest within the field of view 120 may be determined, for example, from processing data captured in field of view 120, based on data of another sensor (e.g. camera, GP S), received (directly or indirectly) from host 210, or any combination of the above. In some embodiments, the identification of at least one region of interest may include identification of portions, areas, sections, pixels, or objects within field of view 120 that are important to monitor. Examples of areas that may be identified as regions of interest may include, crosswalks, moving objects, people, nearby vehicles or any other environmental condition or object that may be helpful in vehicle navigation. Examples of areas that may be identified as regions of non-interest (or lower-interest) may be static (non-moving) far-away buildings, a skyline, an area above the horizon and objects in the field of view. Upon obtaining the identification of at least one region of interest within the field of view 120, processing unit 108 may determine the scanning scheme or change an existing scanning scheme. Further to determining or changing the light-source parameters (as described above), processing unit 108 may allocate detector resources based on the identification of the at least one region of interest. In one example, to reduce noise, processing unit 108 may activate detectors 410 where a region of interest is expected and disable detectors 410 where regions of non-interest are expected. In another example, processing unit 108 may change the detector sensitivity, e.g., increasing sensor sensitivity for long range detection where the reflected power is low.

Diagrams A-C in FIG. 5B depict examples of different scanning schemes for scanning field of view 120. Each square in field of view 120 represents a different portion 122 associated with an instantaneous position of at least one light deflector 114. Legend 500 details the level of light flux represented by the filling pattern of the squares. Diagram A depicts a first scanning scheme in which all of the portions have the same importance/priority and a default light flux is allocated to them. The first scanning scheme may be utilized in a start-up phase or periodically interleaved with another scanning scheme to monitor the whole field of view for unexpected/new objects. In one example, the light source parameters in the first scanning scheme may be configured to generate light pulses at constant amplitudes. Diagram B depicts a second scanning scheme in which a portion of field of view 120 is allocated with high light flux while the rest of field of view 120 is allocated with default light flux and low light flux. The portions of field of view 120 that are the least interesting may be allocated with low light flux. Diagram C depicts a third scanning scheme in which a compact vehicle and a bus (see silhouettes) are identified in field of view 120. In this scanning scheme, the edges of the vehicle and bus may be tracked with high power and the central mass of the vehicle and bus may be allocated with less light flux (or no light flux). Such light flux allocation enables concentration of more of the optical budget on the edges of the identified objects and less on their center which have less importance.

FIG. 5C illustrating the emission of light towards field of view 120 during a single scanning cycle. In the depicted example, field of view 120 is represented by an 8×9 matrix, where each of the 72 cells corresponds to a separate portion 122 associated with a different instantaneous position of at least one light deflector 114. In this exemplary scanning cycle, each portion includes one or more white dots that represent the number of light pulses projected toward that portion, and some portions include black dots that represent reflected light from that portion detected by sensor 116. As shown, field of view 120 is divided into three sectors: sector I on the right side of field of view 120, sector II in the middle of field of view 120, and sector III on the left side of field of view 120. In this exemplary scanning cycle, sector I was initially allocated with a single light pulse per portion; sector II, previously identified as a region of interest, was initially allocated with three light pulses per portion; and sector III was initially allocated with two light pulses per portion. Also as shown, scanning of field of view 120 reveals four objects 208: two free-form objects in the near field (e.g., between 5 and 50 meters), a rounded-square object in the mid field (e.g., between 50 and 150 meters), and a triangle object in the far field (e.g., between 150 and 500 meters). While the discussion of FIG. 5C uses number of pulses as an example of light flux allocation, it is noted that light flux allocation to different parts of the field of view may also be implemented in other ways such as: pulse duration, pulse angular dispersion, wavelength, instantaneous power, photon density at different distances from light source 112, average power, pulse power intensity, pulse width, pulse repetition rate, pulse sequence, pulse duty cycle, wavelength, phase, polarization, and more. The illustration of the light emission as a single scanning cycle in FIG. 5C demonstrates different capabilities of LIDAR system 100. In a first embodiment, processor 118 is configured to use two light pulses to detect a first object (e.g., the rounded-square object) at a first distance, and to use three light pulses to detect a second object (e.g., the triangle object) at a second distance greater than the first distance. In a second embodiment, processor 118 is configured to allocate more light to portions of the field of view where a region of interest is identified. Specifically, in the present example, sector II was identified as a region of interest and accordingly it was allocated with three light pulses while the rest of field of view 120 was allocated with two or less light pulses. In a third embodiment, processor 118 is configured to control light source 112 in a manner such that only a single light pulse is projected toward to portions B1, B2, and C1 in FIG. 5C, although they are part of sector III that was initially allocated with two light pulses per portion. This occurs because the processing unit 108 detected an object in the near field based on the first light pulse. Allocation of less than maximal amount of pulses may also be a result of other considerations. For examples, in at least some regions, detection of object at a first distance (e.g. a near field object) may result in reducing an overall amount of light emitted to this portion of field of view 120.

Additional details and examples on different components of LIDAR system 100 and their associated functionalities are included in Applicant's U.S. patent application Ser. No. 15/391,916 filed Dec. 28, 2016; Applicant's U.S. patent application Ser. No. 15/393,749 filed Dec. 29, 2016; Applicant's U.S. patent application Ser. No. 15/393,285 filed Dec. 29, 2016; and Applicant's U.S. patent application Ser. No. 15/393,593 filed Dec. 29, 2016, which are incorporated herein by reference in their entirety.

Example Implementation: Vehicle

Figure 6C:
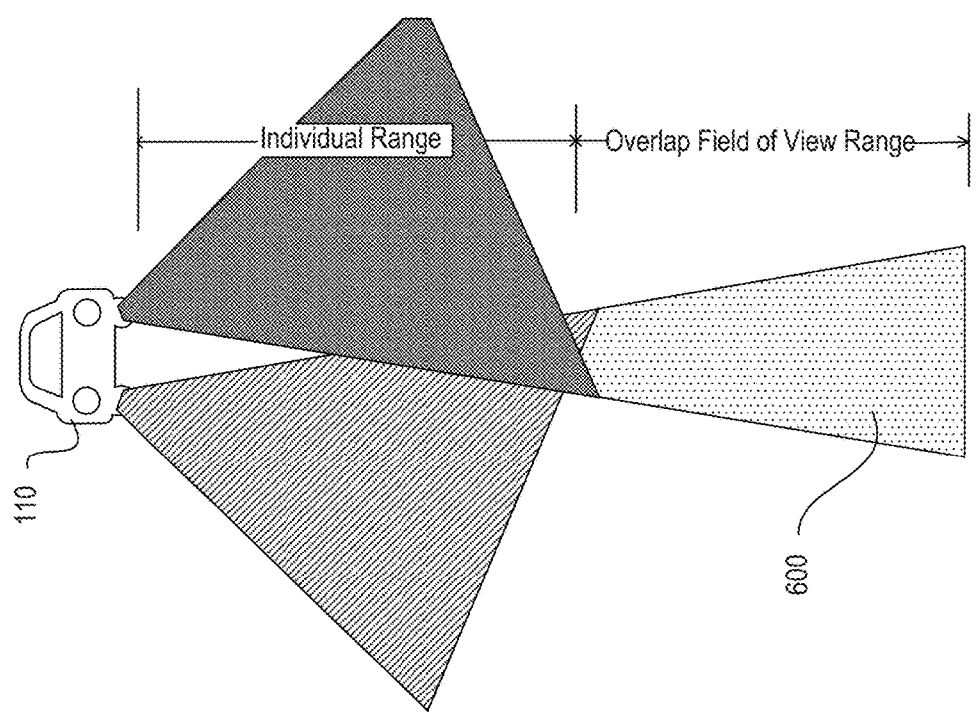
FIGS. 6A, 6B, and 6C are diagrams illustrating a first example implementation consistent with some embodiments of the present disclosure.
Figure 6A:
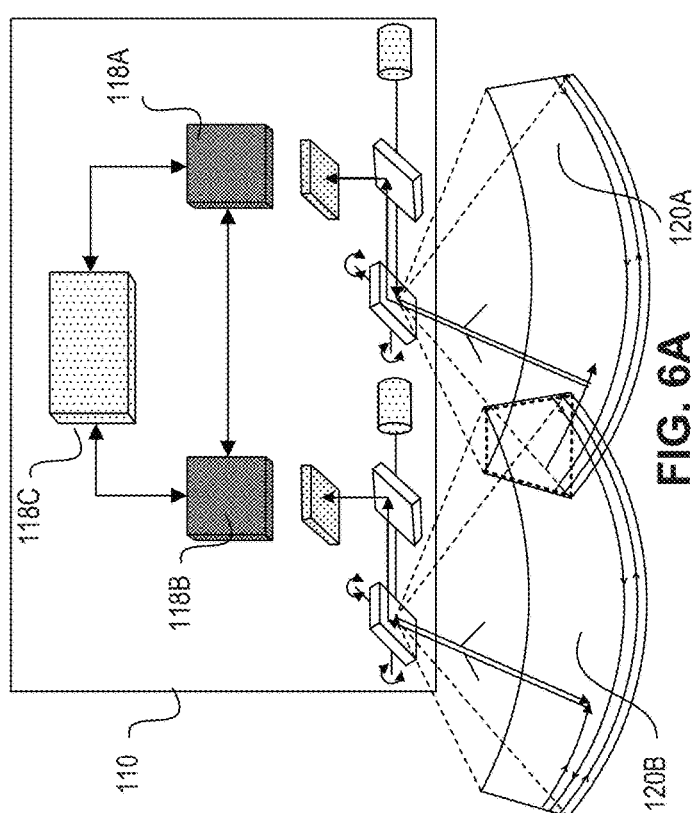
Figure 6B:
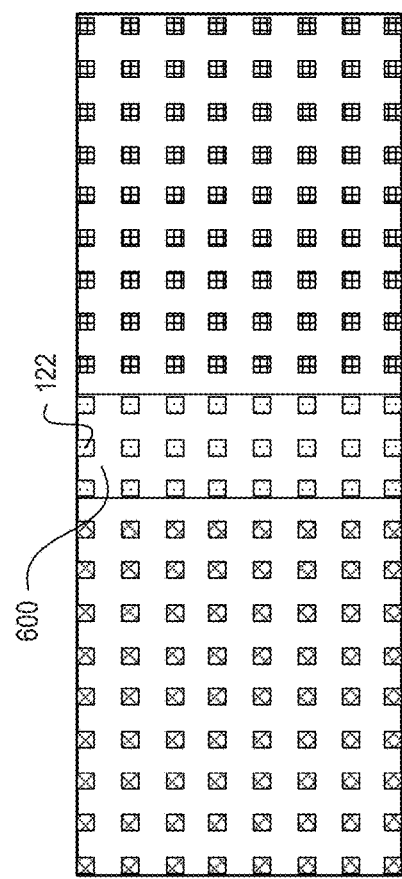

FIGS. 6A-6C illustrate the implementation of LIDAR system 100 in a vehicle (e.g., vehicle 110). Any of the aspects of LIDAR system 100 described above or below may be incorporated into vehicle 110 to provide a range-sensing vehicle. Specifically, in this example, LIDAR system 100 integrates multiple scanning units 104 and potentially multiple projecting units 102 in a single vehicle. In one embodiment, a vehicle may take advantage of such a LIDAR system to improve power, range, and accuracy in the overlap zone and beyond it, as well as redundancy in sensitive parts of the FOV (e.g. the forward movement direction of the vehicle). As shown in FIG. 6A, vehicle 110 may include a first processor 118A for controlling the scanning of field of view 120A, a second processor 118B for controlling the scanning of field of view 120B, and a third processor 118C for controlling synchronization of scanning the two fields of view. In one example, processor 118C may be the vehicle controller and may have a shared interface between first processor 118A and second processor 118B. The shared interface may enable an exchanging of data at intermediate processing levels and a synchronization of scanning of the combined field of view in order to form an overlap in the temporal and/or spatial space. In one embodiment, the data exchanged using the shared interface may be: (a) time of flight of received signals associated with pixels in the overlapped field of view and/or in its vicinity; (b) laser steering position status; (c) detection status of objects in the field of view.

FIG. 6B illustrates overlap region 600 between field of view 120A and field of view 120B. In the depicted example, the overlap region is associated with 24 portions 122 from field of view 120A and 24 portions 122 from field of view 120B. Given that the overlap region is defined and known by processors 118A and 118B, each processor may be designed to limit the amount of light emitted in overlap region 600 in order to conform with an eye safety limit that spans multiple source lights, or for other reasons such as maintaining an optical budget. In addition, processors 118A and 118B may avoid interferences between the light emitted by the two light sources by loose synchronization between the scanning unit 104A and scanning unit 104B, and/or by control of the laser transmission timing, and/or the detection circuit enabling timing.

FIG. 6C illustrates how overlap region 600 between field of view 120A and field of view 120B may be used to increase the detection distance of vehicle 110. Consistent with the present disclosure, two or more light sources 112 projecting their nominal light emission into the overlap zone may be leveraged to increase the effective detection range. The term "detection range" may include an approximate distance from vehicle 110 at which LIDAR system 100 can clearly detect an object. In one embodiment, the maximum detection range of LIDAR system 100 is about 300 meters, about 400 meters, or about 500 meters. For example, for a detection range of 200 meters, LIDAR system 100 may detect an object located 200 meters (or less) from vehicle 110 at more than 95%, more than 99%, more than 99.5% of the times. Even when the object's reflectivity may be less than 50% (e.g., less than 20%, less than 10%, or less than 5%). In addition, LIDAR system 100 may have less than 1% false alarm rate. In one embodiment, light from projected from two light sources that are collocated in the temporal and spatial space can be utilized to improve SNR and therefore increase the range and/or quality of service for an object located in the overlap region. Processor 118C may extract high-level information from the reflected light in field of view 120A and 120B. The term "extracting information" may include any process by which information associated with objects, individuals, locations, events, etc., is identified in the captured image data by any means known to those of ordinary skill in the art. In addition, processors 118A and 118B may share the high-level information, such as objects (road delimiters, background, pedestrians, vehicles, etc.), and motion vectors, to enable each processor to become alert to the peripheral regions about to become regions of interest. For example, a moving object in field of view 120A may be determined to soon be entering field of view 120B.

Example Implementation: Surveillance System

Figure 6D:
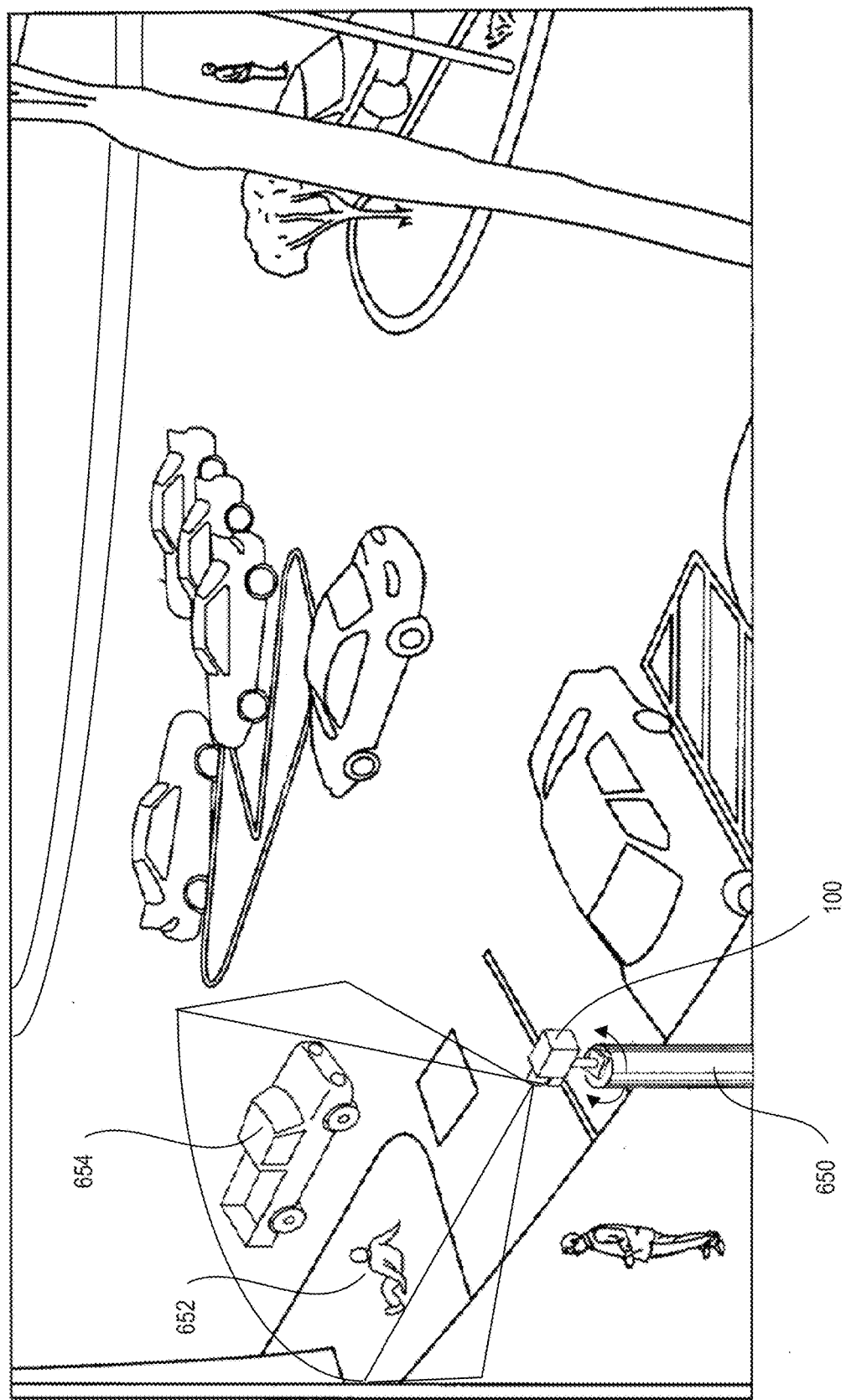
FIG. 6D is a diagram illustrating a second example implementation consistent with some embodiments of the present disclosure.

FIG. 6D illustrates the implementation of LIDAR system 100 in a surveillance system. As mentioned above, LIDAR system 100 may be fixed to a stationary object 650 that may include a motor or other mechanism for rotating the housing of the LIDAR system 100 to obtain a wider field of view. Alternatively, the surveillance system may include a plurality of LIDAR units. In the example depicted in FIG. 6D, the surveillance system may use a single rotatable LIDAR system 100 to obtain 3D data representing field of view 120 and to process the 3D data to detect people 652, vehicles 654, changes in the environment, or any other form of security-significant data.

Consistent with some embodiment of the present disclosure, the 3D data may be analyzed to monitor retail business processes. In one embodiment, the 3D data may be used in retail business processes involving physical security (e.g., detection of: an intrusion within a retail facility, an act of vandalism within or around a retail facility, unauthorized access to a secure area, and suspicious behavior around cars in a parking lot). In another embodiment, the 3D data may be used in public safety (e.g., detection of: people slipping and falling on store property, a dangerous liquid spill or obstruction on a store floor, an assault or abduction in a store parking lot, an obstruction of a fire exit, and crowding in a store area or outside of the store). In another embodiment, the 3D data may be used for business intelligence data gathering (e.g., tracking of people through store areas to determine, for example, how many people go through, where they dwell, how long they dwell, how their shopping habits compare to their purchasing habits).

Consistent with other embodiments of the present disclosure, the 3D data may be analyzed and used for traffic enforcement. Specifically, the 3D data may be used to identify vehicles traveling over the legal speed limit or some other road legal requirement. In one example, LIDAR system 100 may be used to detect vehicles that cross a stop line or designated stopping place while a red traffic light is showing. In another example, LIDAR system 100 may be used to identify vehicles traveling in lanes reserved for public transportation. In yet another example, LIDAR system 100 may be used to identify vehicles turning in intersections where specific turns are prohibited on red.

It should be noted that while examples of various disclosed embodiments have been described above and below with respect to a control unit that controls scanning of a deflector, the various features of the disclosed embodiments are not limited to such systems. Rather, the techniques for allocating light to various portions of a LIDAR FOV may be applicable to type of light-based sensing system (LIDAR or otherwise) in which there may be a desire or need to direct different amounts of light to different portions of field of view. In some cases, such light allocation techniques may positively impact detection capabilities, as described herein, but other advantages may also result.

It should also be noted that various sections of the disclosure and the claims may refer to various components or portions of components (e.g., light sources, sensors, sensor pixels, field of view portions, field of view pixels, etc.) using such terms as "first," "second," "third," etc. These terms are used only to facilitate the description of the various disclosed embodiments and are not intended to be limiting or to indicate any necessary correlation with similarly named elements or components in other embodiments. For example, characteristics described as associated with a "first sensor" in one described embodiment in one section of the disclosure may or may not be associated with a "first sensor" of a different embodiment described in a different section of the disclosure.

It is noted that LIDAR system 100, or any of its components, may be used together with any of the particular embodiments and methods disclosed below. Nevertheless, the particular embodiments and methods disclosed below are not necessarily limited to LIDAR system 100, and may possibly be implemented in or by other systems (such as but not limited to other LIDAR systems, other electrooptical systems, other optical systems, etc.—whichever is applicable). Also, while system 100 is described relative to an exemplary vehicle-based LIDAR platform, system 100, any of its components, and any of the processes described herein may be applicable to LID AR systems disposed on other platform types. Likewise, the embodiments and processes disclosed below may be implemented on or by LID AR systems (or other systems such as other electro-optical systems etc.) which are installed on systems disposed on platforms other than vehicles, or even regardless of any specific platform.

Example Implementation: Multiple Simultaneous Laser Beam Emission and Illumination while Ensuring Eye Safety In LIDAR systems and other optical systems employing one or more laser light sources, eye safety is a primary concern. Exposure to laser light of sufficiently high-power levels or intensity can damage human eyes. Higher power laser beams may increase detection sensitivity in LIDAR and other systems, especially where distant objects and/or objects of low reflectivity are involved. However, simply increasing the power levels of a laser light source to enhance sensitivity can negatively impact eye safety. Thus, there is a need in LIDAR systems and other optical systems for solutions that offer desired levels of detection sensitivity while, at the same time, ensure compliance with eye safety guidelines. The presently disclosed embodiments are aimed at addressing this need.

Various types of LIDAR systems may be used in conjunction with the presently disclosed embodiments. Details relating to at least some such LIDAR systems are provided in other sections of this disclosure. In one embodiment, a LIDAR system may include one light source and multiple (e.g., 4) mirrors configured to scan in a synchronized fashion. The operation of the LIDAR may be such that the four mirrors are arranged so one of the mirrors is associated with a laser transmission path to the FOV, while the other mirrors may be dedicated to receiving returned laser reflections (e.g., (1Tx (transmitting), 3Rx (reflecting)). In such a system, like in other single-light source LIDAR systems (or in multi-light source LIDAR systems where each of the light sources is dedicated to scanning a different portion of a field of view (FOV), to increase sensitivity, detection range, SNR, etc.), the intensity of the light source(s) can be increased. As noted above, however, such increases in light source intensity, especially without other mitigation strategies, can result in an increased risk of exposing eyes to higher intensity light. As a result, such increases in light intensity may adversely impact the eye safe characteristics of the system. It should be noted that in the disclosed embodiments, any number of light sources and deflectors may be used. In some cases, each light source may be associated with a dedicated deflector. In other cases, multiple light sources may project light towards a common detector. Further, in some cases, the same deflectors used for Tx channels can be used for Rx channels.

In one example embodiment for maintaining or increasing desired levels of sensitivity, detection range, SNR, etc., but without increasing risks to eye safety, two or more light sources may be included in a LIDAR system. Rather than being arranged to illuminate different regions of a FOV, the two or more light sources may be arranged such that at least portions of the light beams emitted from the two or more light sources are made incident on the same region of the LIDAR's FOV. In this way, overall light intensity supplied to a particular region of a FOV can be increased. At the same time, the optical geometry of the system can be arranged such that the system complies with eye-safety guidelines.

In one embodiment, two or more laser light sources may be positioned at least 7 mm apart such that chief rays associated with the two or more laser sources project toward the FOV as parallel rays spaced apart by at least 7 mm. This may result in a geometry that can prevent more than one laser beam entering an eye at any one time (e.g., at close ranges) or can prevent a total energy contribution from more than one beam that enters the eye from exceeding eye safe levels (e.g., in regions where the beams approach one another or overlap due to beam divergence). The 7 mm initial spacing may render the beams eye safe in all locations in the FOV despite beam divergence. The beam divergence, however, may provide a significant benefit. For example, assuming a divergence of 0.1 degree and a beam spacing of 7 mm, two beams will start to overlap at 4 m from the laser sources. The two beams may start to overlap at a distance less than 20 m from the laser sources. The degree of overlap increases with increasing distance from the sources, and this overlap can enhance the detection capability of the LIDAR system as more light is available for reflection/detection in the region where the light beams overlap.

In another embodiment, multiple laser beams are made incident on a common location of a single deflector such that they are projected toward the FOV with angular separation between adjacent beams of at least 5 mrad (mrad refers to milli-radians, which are equal to $\frac{1}{1000}$ the of an angle of 1 radian). While more than one of these beams may enter an eye (depending on the focal point of the eye and the distance from the source), because the beams are diverging, they will each illuminate different areas of the retina. Eye safety standards indicate that laser spots incident on the retina are summed and contribute to the total amount of energy absorbed by the retina only if they fall within common, 5 mrad rectangular regions, assuming the most restrictive emission duration (grouped emission of pulses over a time) is between 5-625 microseconds. Therefore, if the most restrictive state of the eye is accommodation to infinity, and if incident laser beams are spaced apart by at least 5 mrad, they necessarily will be incident upon the retina in different 5 mrad regions, ensuring that the total amount of energy absorbed by the retina in any of the 5 mrad regions is reduced, and reduces the effective AE (accessible emission) as defined in eye safety standards.

In some embodiments, a LIDAR system is disclosed. By way of example, FIGS. 7A-7C, 8A, 8B, 8E, 9A-9C illustrate exemplary LIDAR systems consistent with this disclosure. As discussed above one or more of the LIDAR systems may include one or more light sources, one or more optical systems configured to direct the like towards a field of view and/or receive light reflected from the field of view, and/or one or more detectors configured to receive the reflected light.

Figure 7A:
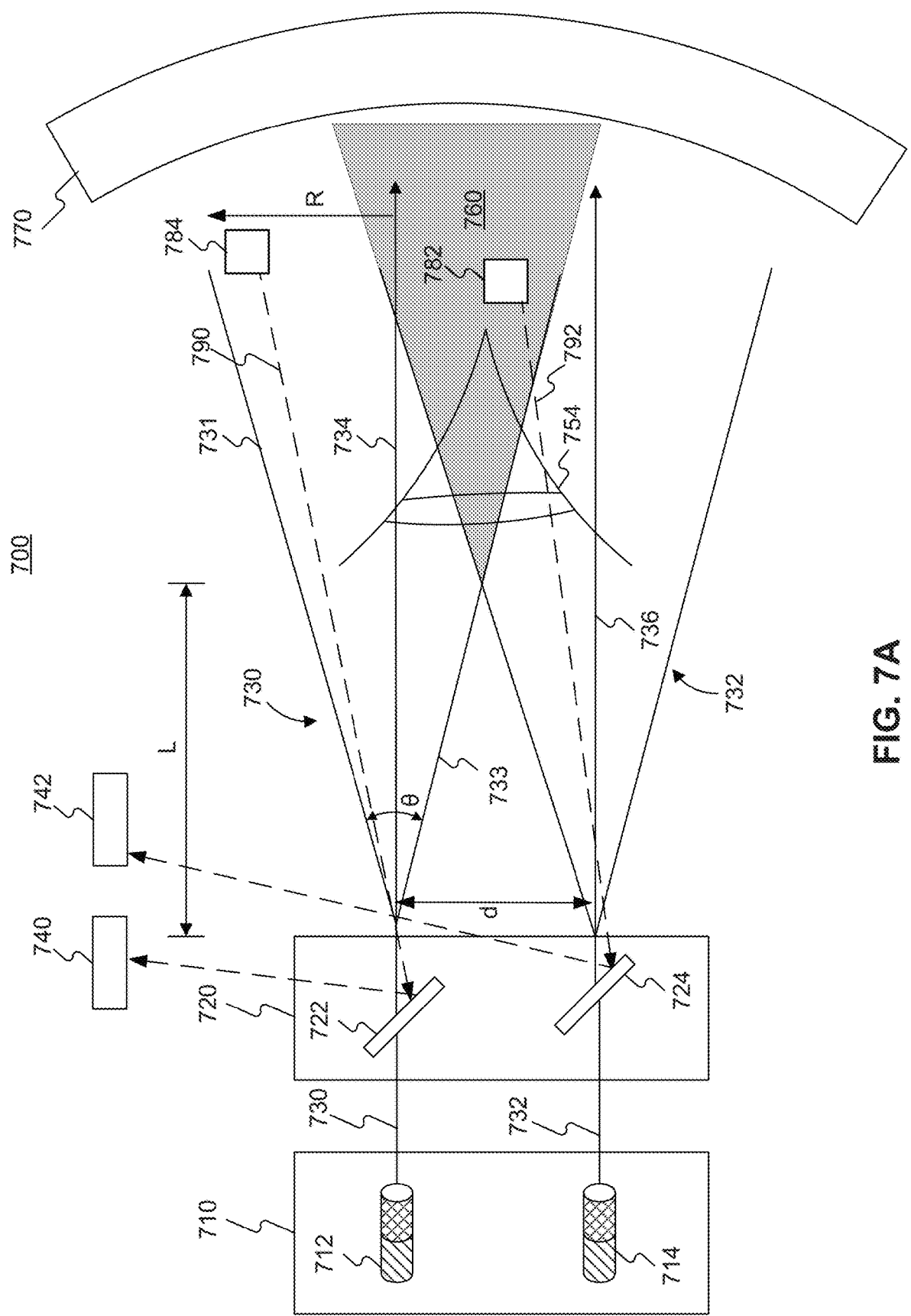
FIGS. 7A, 7B, and 7C, are diagrams illustrating exemplary LIDAR systems in accordance with some embodiments of the present disclosure.

In some embodiments, the LIDAR system may include a laser light projection system configured to simultaneously project at least two laser light beams. By way of example, FIG. 7A discloses an exemplary LIDAR system 700 that may include laser light projection system 710, including one or more sources of light. For example, as illustrated in FIG. 7A, laser light projection system 710 may include sources 712 and 714 of laser light. Thus, exemplary LIDAR system 700 may include one or more light sources configured to simultaneously provide at least two laser light beams 730 and 732.

In some embodiments, the LIDAR system may include an optical system, including one or more deflectors configured to project the at least two laser light beams toward a field of view of the LIDAR system. In some embodiments, the LIDAR system may include a deflector configured to project the at least two laser light beams toward a field of view of the LIDAR system. By way of example, exemplary LIDAR system 700 may include optical system 720 that may include one or more deflectors 722, 724 configured to receive laser light from laser light sources 712 and/or 714, and deflect (or direct) light beams 730 and 732, respectively, towards FOV 770. Deflectors 722, 724 may have similar structural and/or functional characteristics as those of other deflectors described elsewhere in this disclosure (e.g., deflector 114, MEMS mirror 300, etc.).

In some embodiments, each of the at least two laser light beams may be incident upon a different deflector of the one or more deflectors. For example, as illustrated in FIG. 7A, light beams 730 and 732 emitted by light sources 712 and 714, respectively, may be incident on different deflectors 722 and 724, respectively. As will be described later in this disclosure, it is contemplated that in some exemplary embodiments, light beams 730 and 732 emitted by light sources 712 and 714, respectively, may impinge on a same deflector (e.g., deflector 726 of FIG. 7B).

In some embodiments, each of the at least two laser light beams may have an energy density below an eye safe level but a total combined energy density of the at least two laser light beams may be above an eye safe level. As is well known in the art, laser light beams such as 730 and 732 may originate from optical system 720 and may diverge as they travel towards FOV 770. For example, each of the light beams 730 and 732 may be represented by a plurality of rays of laser light that may diverge from each other in the shape of a generally expanding conical structure as illustrated in FIG. 7A. The amount of energy per-unit area or volume (e.g. energy density) may be the highest near a center of beams 730 and 732, but may decrease in a radially outward direction (e.g., along radius R in FIG. 7A). It is contemplated that laser sources, for example, 712 and 714 may be selected such that an energy density of each of light beams 730 and 732 may be less than an eye safe level of energy density. An eye safe level of energy density may represent an energy density level, exposure to which does not cause injury or damage to the eye or which does not otherwise exceed eye safety regulations. Thus, light beams 730, 732 have an eye safe level of energy density. In other words, even if all rays representative of beam 730 (or beam 732) enter an eye, the amount of energy absorbed by the eye/retina may not cause injury or damage to the eye or may not exceed eye safe energy levels prescribed by applicable eye safety regulations.

It is further contemplated that a total energy density obtained by combining the energy in laser beams 730 and 732 may, however, be greater than the eye safe level of energy density at a particular distance from optical system 720. That is, in some embodiments, if both beams 730 and 732 enter an eye at the particular distance from optical system 720, the two beams together may deliver an amount of energy that may be capable of causing injury or damage to the eye. Here the total combined energy density of the at least two laser light beams refers to the total energy density of each of the at least two laser light beams summed together (e.g., at a particular distance from the respective source(s)), regardless of whether the laser light beams are overlapping.

In the disclosed embodiments, the at least two laser light beams may be projected toward the field of view such that chief rays associated with the at least two laser light beams are spaced apart from one another by at least 7 mm. As discussed above, each of laser light beams 730 and 732 may emerge from optical system 720 and may diverge as the beams progress towards FOV 770. Each of beams 730 and 732 may be represented by a plurality of rays of laser light. A chief of ray of light (e.g., 734, 732) may be defined for each of the laser light beams 730 and 732. Each chief ray (e.g. 734, 732) may represent a ray at a center of the diverging laser light beams 730 or 732, for example, corresponding to a primary direction of travel of laser light beams 730 or 732. It is also contemplated that in some embodiments, chief ray 734 or 736 may be defined as a ray corresponding to portions of light beam 730 or 732 respectively having an energy density, and/or intensity greater than a predetermined threshold energy density or intensity. As also illustrated in FIG. 7A, in one exemplary LIDAR system 700, laser light projection system 710 and optical system 720 may be configured to emit, for example, beams 730 and 732 such that chief rays 734 and 736, respectively may be spaced apart from each other at a predetermined distance "d." In one exemplary embodiment, distance d may be 7 mm. It is contemplated that distance d may represent a distance between the centers of the transmission apertures in optical system 720.

In some embodiments, beam divergence may cause the at least two laser light beams to at least partially overlap with one another in an overlap zone within the field of view. By way of example, as illustrated in FIG. 7A, beams 730 and 732 may diverge after emerging from optical system 720. As also illustrated in FIG. 7A, because of the divergence of beams 730 and 732 from the directions of chief rays 734 and 736, respectively, at least portions of beams 730 may overlap with portions of beam 732, creating an overlap zone 760. For example as illustrated in FIG. 7A, beam 730 may begin overlapping with beam 732 at a distance "L" from optical system 720 in a direction towards FOV 770. It will be understood that beams 730 and 732 may completely overlap with each other at very large distances from optical system 720 in the direction towards FOV 770. Because portions of more than on laser light beam 730, 732 is incident on objects in overlap zone 760, the overlap of laser light beams 730, 732 contributes to improved detection of the objects in overlap zone 760. Furthermore, as explained below, because only a portion of each of laser beams 730 and 732 may enter an eye in overlap zone 760, the total energy density to which the eye may be exposed also remains below an eye safe level of energy density, thereby keeping the eye safe.

In some embodiments, each of the at least two laser light beams may be associated with a divergence of at least 0.03 degrees, and the overlap zone begins at about 4 meters from an origin of the at least two laser light beams. By way of example, as illustrated in FIG. 7A, divergence of laser light beams 730 and 732 may be defined by an angle "q" between, for example, outermost rays of light (e.g., 731 and 733) representing beam 730. It is contemplated that in some exemplary embodiments angle q may have a value of 0.03 degrees, or 0.1 degrees. Each beam divergence is lower than 5 mrad, typically 0.5-2 mrad. It is further contemplated that when chief rays 734 and 736 of beams 730 and 732, respectively, are spaced apart from each other by 7 mm, and a divergence of each of beams 730 and 732 is 0.03 degree, the distance L at which beam 730 may overlap with beam 732 would be about 4 meters from optical system 720 and less than about 20 meters. Although a divergence angle q of 0.03 degree has been discussed above, it is contemplated that other divergence angles greater than or less than 0.03 degree are also possible.

In some embodiments, within the overlap zone, combined light associated with at least a portion of each of the at least two laser light beams may be available for object detection. By way of example, FIG. 7A illustrates objects 782 and 784 that may be located in front of optical system 720. As illustrated in FIG. 7A, only a small portion of light from laser light beam 730 may impinge on object 784. As a result an intensity of light reflected by object 784 may be relatively small, which may make it difficult for detector 740 associated with LIDAR system 700 to detect the reflected light. In contrast, portions of laser light beams 730 and 732 may both impinge on object 782 located in overlap zone 760. Thus, even though an amount of light impinging on object 782 from laser light beams 730 and 732 individually may be relatively small, the combined amount of light from the portions of laser light beam 730 and 732 impinging on object 782 may be available for object detection. More specifically, object 782 may reflect portions of light received from both laser light beams 730 and 732 towards detector 740 of LIDAR system 700 making it easier for LIDAR system 700 to detect object 782.

In some embodiments, the at least two laser light beams may be projected toward the field of view such that chief rays associated with the at least two laser light beams are spaced apart from one another by between 7 mm and 10 mm. In some embodiments, the at least two laser light beams are projected toward the field of view such that chief rays associated with the at least two laser light beams are spaced apart from one another by between 7 mm and 20 mm. As discussed above, in overlap zone 760, portions of light from both laser light beams 730 and 732 may be incident on objects (e.g., 782). It is contemplated, however, that as a distance d between chief rays 734 and 736 of beam 730 and 732, respectively, is increased, an amount of overlap between beams 730 and 732 in overlap zone 760 may be reduced. Alternatively, as distance d is increased, a distance L at which laser light beams 730 and 732 may overlap may also increase. As a result, increasing distance d too much may result in a very small portion of light from one or both of beam 730 and 732 to be incident on any objects of interest (e.g., 782) in overlap zone 760. Alternatively, increasing distance d too much may cause distance L at which laser light beams 730 and 732 overlap to be too far from optical system 720. It is therefore contemplated that there may be optimum values of distance d that may allow for a combination of light beam 730 and 732 to impinge on objects 782 in overlap zone 762, making object 782 more detectable by LIDAR system 700. In some exemplary embodiments, the preferred values of distance d may range between 7 mm and 20 mm. In other exemplary embodiments, the preferred values of distance d may range between 7 mm and 10 mm.

In the disclosed embodiments, the combined light in the overlap zone may be eye safe. As discussed above, because of beam divergence, portions of laser light beams 730 and 732 may overlap with each other, for example, in overlap zone 760. Thus, an amount of energy being received by any object (e.g., 782) present in overlap zone 760 may be a combination of the energy in the portions of beam 730 and 732 that are incident on the object (e.g., 782). As also discussed above, an energy density of each of laser light beams 730 and 732 may be less than an eye safe level of energy density. The energy contained in a portion of laser light beam 730 that overlaps with laser light beam 732 will be less than the energy contained in a whole of light beam 730. Similarly, the energy contained in a portions of laser light beam 732 that overlaps with laser light beam 730 will be less than the energy contained in a whole of light beam 732. Laser light beams 730 and 732 may be arranged such that an amount of energy in the overlapping portions of laser light beams 730, 732 may also be less than the energy contained in a whole of light beam 730 or 732. Accordingly, an energy density in overlapping region 760 may be lower than an energy density of each of laser light beams 730, 732, and therefore below an eye safe level of energy density. By way of example, consider that an eye safe level of energy density may equal ED, and each of laser light beams 730, 732 have an energy density equal to ED. As an example, laser light beams 730 and 732 may be arranged such that 30% of each of beams 730 and 732 may overlap with each other in overlap zone 760. Thus, the energy density in portions of beam 730 and 732 that are in overlap zone 760 would be equal to 0.3×ED, and the total energy density of the combination of the overlapped portions of beams 730 and 732 would equal 0.6×ED, which would still be less than the eye safe level of energy density ED.

Although only two laser light sources 710 and 712, two deflectors 722 and 724, and two laser light beams 730 and 732 have been discussed above with respect to LIDAR system 700, it should be understood that LIDAR system 700 may include any number of laser light sources, deflectors, and/or laser light beams. Thus, for example, light projection system 710 may include more than or less than two laser light sources 712 and 714, optical system 720 may include more than or less than two deflectors 722 and 724, and optical system 720 may be configured to emit more than or less than two laser light beams 730 and 732. It is also contemplated that in the disclosed embodiments, when there are more than two laser light beams 730 and 732, each pair of adjacent laser light beams may be spaced apart at a distance d that may be 7 mm, 7 mm to 10 mm, 7 mm to 15 mm, etc.

In some embodiments, the at least two laser light beams may be provided by discrete lasers. The lasers may be packaged, or unpackaged. Packaged lasers may refer to lasers that include the laser emitter and accompanying optical and electronic components all packaged or enclosed in a common housing. Unpackaged lasers on the other hand may refer to the laser emitting device without the accompanying optical and electronic components. As discussed in other portions of this disclosure, laser light projection system 710 may include many different types of laser sources. For example, as illustrated in FIG. 7A, laser light projection system 710 may include one or more discrete packaged laser sources 712, 714. Each laser source 712, 714 may include one or more laser diodes (e.g., 202A) that may be configured to emit laser light. It is also contemplated that each laser source 712, 714 may include other optical elements such as lenses, collimators, etc., that may allow discrete packaged/unpackaged laser source 712, 714 to emit a laser beam (e.g., 730, 732, etc.).

In some embodiments, the at least two laser light beams may be provided by a laser array. It is contemplated that in some exemplary embodiments of LIDAR system 700, laser sources 712, 714 may not be discrete packaged lasers. Instead, one or more of laser sources 712, 714 may be part of an array of laser sources. For example, as discussed above with respect to FIG. 2E, laser light projection system 710 may include an array of laser light sources (e.g., 112A-112F) that may be configured to simultaneously emit laser light beams in, for example, LIDAR system 700. As also discussed with respect to FIG. 2E, the laser array in laser light projection system 710 may include a plurality of light sources 112 arranged in non-linear configurations, such as a two dimensional array, in hexagonal tiling, or in any other way.

Figure 7B:
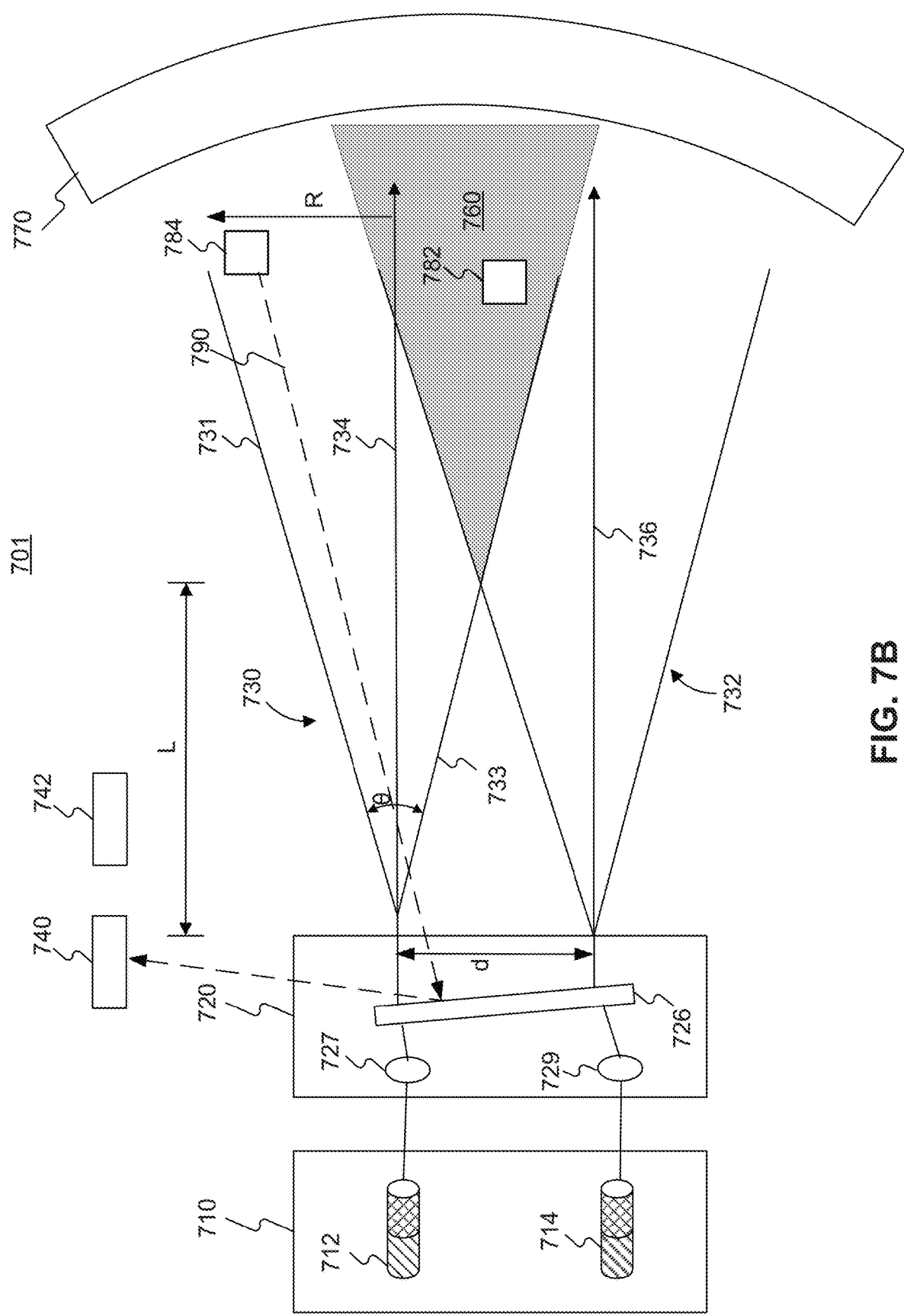

In some embodiments, the one or more deflectors may include a common deflector configured to receive the at least two laser light beams. For example, as discussed above, optical system 720 may include more than or less than two deflectors 722 and 724. By way of example, FIG. 7B illustrates an exemplary LIDAR system 701 that includes only one deflector 726. Many of the components of LIDAR system 701 of FIG. 7B are similar to those of LIDAR system 700 of FIG. 7A, and therefore a description of these components with respect to FIG. 7B is omitted. LIDAR system 701 of FIG. 7B may include optical system 720 that may include deflector 726. Deflector 726 may have structural and functional characteristics similar to those of other deflectors (e.g., 114, MEMS mirror 300, mechanically actuated mirror etc.) disclosed elsewhere in this disclosure. As illustrated in FIG. 7B, laser light projection system 710 of LIDAR system 701 may include two or more laser sources 712, 714. Laser light emitted by sources 712, 714 may be directed towards (e.g., collimators or other beam shaping optics for example diffractive optical elements, lenses, etc.) 727, 729, which in turn may direct the laser light toward deflector 726 in optical system 720. Deflector 726 may be configured to direct the laser light receive from sources 712, 714 via apertures in optical system 720 as laser light beams 730 and 732 having chief rays 734 and 736, respectively, similar to that described above with respect to LIDAR system 700 of FIG. 7A.

In some embodiments, each of the one or more deflectors includes a first one-dimensional light deflector configured to rotate in a first direction and a second one-dimensional light deflector configured to rotate in a second direction different from the first direction. In some embodiments the axes of rotation corresponding to the first and second directions may be orthogonal to each other. By way of example, one or more of deflectors 722, 724 of LIDAR system 700 and/or deflector 726 of LIDAR system 701 may be configured to rotate about a single rotational axis. For example as discussed above, one or more of deflectors 722, 724, 726 may have structural and functional characteristics similar to a MEMS mirror 300 as illustrated in FIG. 3A. Thus, for example one or more of deflectors 722, 724, 726 may be single axis square MEMS mirrors that may include actuators (e.g., 302A, 302B) that may allow one or more of deflectors 722, 724, 726 to rotate about a single axis of rotation. For example, the one or more deflectors may include mirrors with mechanical actuation, or mechanically rotating polygons. It is contemplated that optical system 720 may include a plurality of deflectors 722, each being configured to rotate about a single axis of rotation. It is also contemplated that some of the plurality of deflectors 722 may be configured to rotate in a first direction about a first axis of rotation, whereas other deflectors 722 may be configured to rotate in a second direction about a second active rotation. It is further contemplated that light emitted from one or more of laser sources 712, 714 may be directed by one set of deflectors 722 to a second set of deflectors 722 before exiting optical system 720. Thus, by allowing one set of deflectors 722 to rotate in a first direction and another set of deflectors 722 to rotate in a second direction, deflectors 722 may constitute scanning mirrors that may allow scanning of FOV 770 using the laser light beams 730, 732. Although this description refers to a plurality of deflectors 722 it is contemplated that exemplary embodiments of LIDAR system 700 or 701 may similarly include a plurality of deflectors 724 or 726. In some embodiments, deflectors 722, 724, and/or 726 may include rotating mirrors, liquid crystals, optical phased arrays, rotating prisms, and/or wavelength based deflection devices.

In some embodiments, each of the one or more deflectors may include a two-dimensional light deflector. By way of example, one or more of deflectors 722, 724 of LIDAR system 700 and/or deflector 726 of LIDAR system 701 may be configured to rotate about at least a pair of rotational axes. For example as discussed above, in some embodiments, one or more of deflectors 722, 724, 726 may have structural and functional characteristics similar to a MEMS mirror 300 as illustrated in FIG. 3B, or a mechanical mirror or mechanically rotating polygon. Thus, one or more of deflectors 722, 724, 726 may be a dual axis MEMS mirror that may include a plurality of actuators (e.g., 302A, 302B, 302C, and 302D) that may allow deflectors 722, 724, and/or 726 to rotate about at least two axes of rotation. Accordingly, one or more of deflectors 722, 724, and/or 726 may constitute a two-dimensional scanning mirror configured to deflect light in a horizontal direction and in a vertical direction, thereby allowing for two-dimensional scanning of FOV 790.

In some embodiments, no more than one chief ray associated with the at least two laser light beams can enter a human eye simultaneously. For example, the width of each aperture from which light beams exit from optical system 720 may typically be of the order of 7 mm. Thus even if two light sources 712 and 714 are arranged close to each other, the centers of the corresponding apertures will be spaced apart by 7 mm. Thus, an amount of laser light entering an eye positioned in between the two apertures would still at most be equivalent to a single laser beam. And since each of the light beams in the disclosed LIDAR system has an energy density less than an eye safe level of energy density, the maximum energy density that will reach the eye will also be less than the eye safe level of energy density. FIG. 7A illustrates an exemplary situation where eye 754 is positioned between chief rays 734 and 736. However, because of beam divergence, only a portion (about 50%) of each of laser light beams 730 and 732 may enter eye 754 because of the 7 mm spacing between chief rays 734 and 736. Thus, eye 754 may at most receive an amount of energy equal to the amount of energy in one of the laser light beams 730 and 732. And because each of light beams 730 and 732 has an energy density less than an eye safe level of energy density, the maximum energy density that will reach eye 754 will also be less than the eye safe level of energy density making the disclosed LIDAR system 700 safe for an eye.

It is contemplated that if the size of each aperture "W" exceeds 7 mm, then the spacing between chief rays 734 and 736 would also need to increase to at least W. Thus, in LIDAR system 700, the spacing d between chief rays 734 and 736 may be the greater of 7 mm or W, the width of the apertures from which laser light beams 730 and 732 exit optical system 720.

In some embodiments, the one or more deflectors may be also configured to receive light reflections from the field of view of the LIDAR system. As discussed elsewhere in the disclosure in detail, a LIDAR system, such as, LIDAR system 700 or 701 is configured to detect one or more objects located in front of optical system 720 by detecting at least a portion of light reflected by the object. Thus, for example, as illustrated in FIG. 7A, one or more objects (e.g., 782, 784) in FOV 770 may reflect portions of one or more of light beams 730 and 732. These reflected light beams, illustrated in FIG. 7A, by reflected light beams 790, 792 (shown as dashed lines) may be received by one or more of deflectors 722 and/or 724. Deflectors 722 and/or 724 may be configured to direct reflected light beams 790, 792 to one or more detectors 740, 742, etc.

Figure 7C:
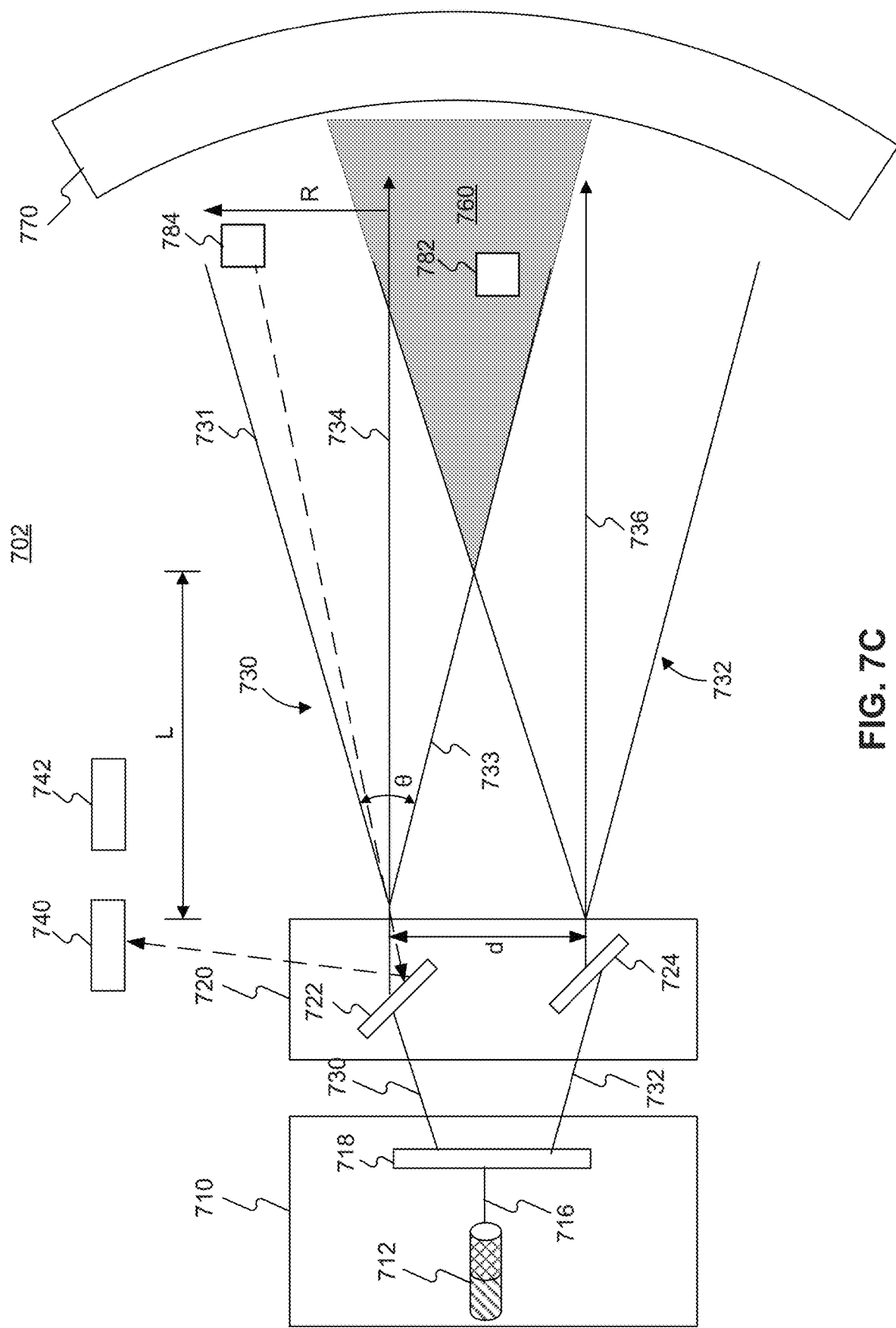

In some embodiments, the at least two laser light beams may be generated by splitting at least one primary laser beam into two or more sub-beams. For example, it may be possible to divide a single laser light beam into two or more separate light beams. In some embodiments, the LIDAR system may further include a beam splitter configured to split the at least one primary laser beam into the two or more sub-beams. FIG. 7C illustrates one such exemplary LIDAR system 702. As illustrated in FIG. 7C, laser light projection system 710 may include, for example, laser light source 712 that may be configured to emit a laser light beam 716 that may be incident on beam splitter 718. Beam splitter 718 may be a polarized beam splitter or an asymmetrical deflector as discussed elsewhere in this disclosure. It is also contemplated that beam splitter 718 may include one or more prisms, partially silvered mirror, deflector with a dichroic optical coating, etc. Beam splitter 718 may be configured to split light beam 716 into two or more sub-beams. By way of example, as illustrated in FIG. 7C, beam splitter 718 may split laser light beam 716 into two laser light beams 730 and 732. And as discussed above with respect to LIDAR system 700 of FIG. 7A, deflectors 722 and 724 in optical system 720 may direct laser light beams 730 and 732 towards FOV 770. Although only one light source 712 as been illustrated in FIG. 7C, it is contemplated that laser light projection system 710 of LIDAR system 702 may include more than one light source 712. It is also contemplated that laser light projection system 710 of LIDAR system 702 may include more than one beam splitter 718, or a multi-stage beam splitter. Accordingly, it will be understood that a number of light beams emitted by optical system 720 of LIDAR system 702 may be greater than a number of light beams emitted by light sources 712 in laser light projection system 710 of LIDAR system 702.

In some embodiments, the LIDAR system may further include at least one processor programmed to control positioning of the one or more deflectors to scan the field of view of the LIDAR system with the at least two laser light beams. For example, as discussed elsewhere in this disclosure, each deflector 722, 724, and/or 726 may be individually controlled by a processor (e.g., 118), such that deflector 722, 724, and/or 726 may tilt towards a specific angle along each of one or two separate axes. By controlling each of deflectors 722, 724 and/or 726, processor 118 may be able to direct one or more of laser light beams 730 and or 732 toward different portions of FOV 770, thereby allowing LIDAR system 700, 701, and/or 702 to scan FOV 770 using one or more of laser light beams 730 and/or 732.

Figure 8A:
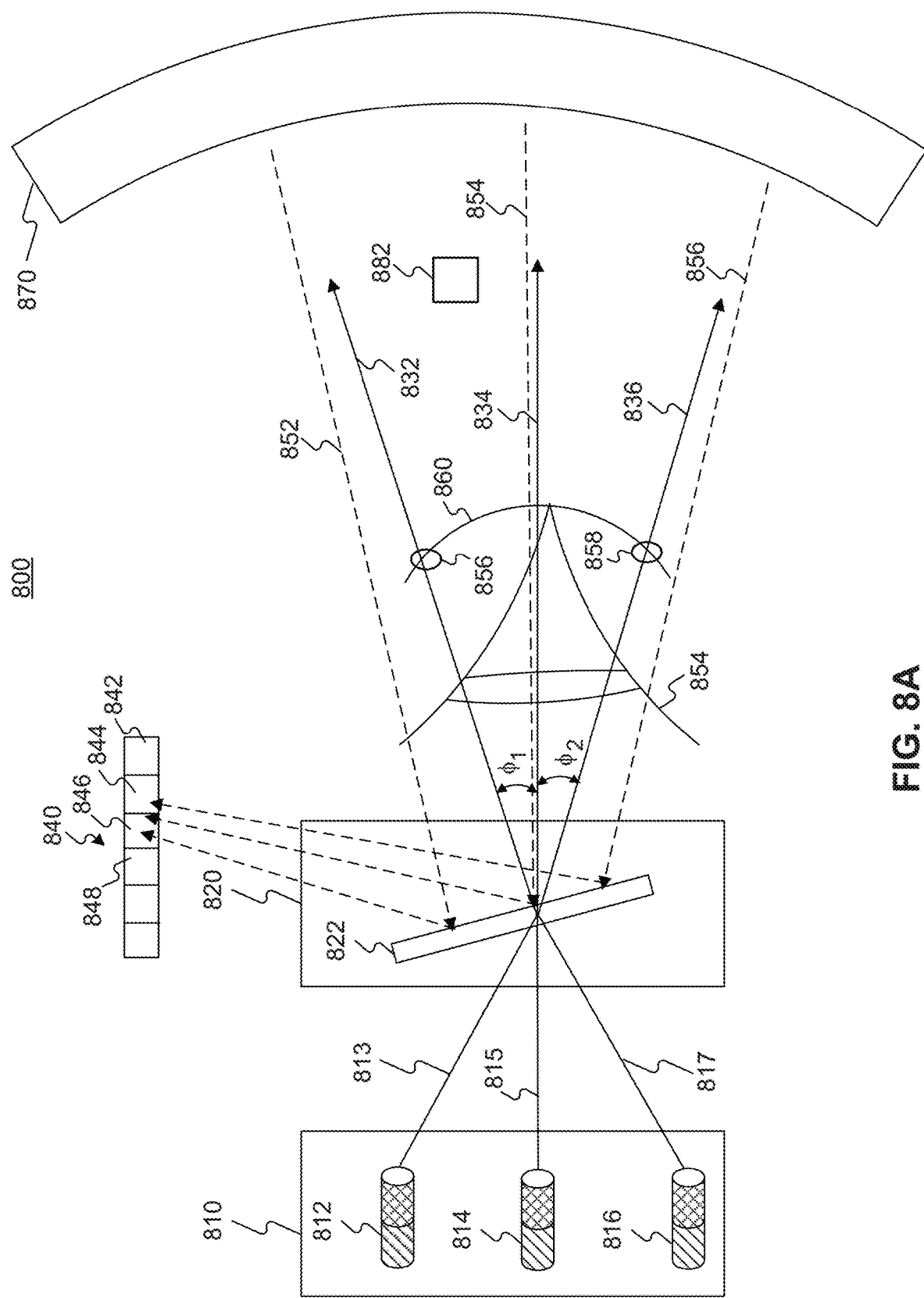
FIGS. 8A, 8B, and 8E are diagrams illustrating exemplary LIDAR systems in accordance with some embodiments of the present disclosure.

In some embodiments, the at least two laser light beams projected from the deflector may be separated from one another by an angular spacing ranging from 2.5 mrad to 6 mrad. By way of example, FIG. 8A illustrates an exemplary LIDAR system 800 that may include laser light projection system 810, optical system 820, detector system 840. Laser light projection system 810 may include one or more light sources 812, 814, 816 configured to emit laser light. For example, as illustrated in FIG. 8A, laser light sources 812, 814, 816 may be configured to emit laser light beams 813, 815, 817, respectively. Light beams 813, 815, 817 may be incident on deflector 822 of optical system 820. It is contemplated that light projection system may include one or more optical element such as lenses, collimators, etc., to ensure that light beams 813, 815, 817 emitted by light sources 812, 814, 816, respectively, may be directed towards deflector 822. Deflector 822 may be configured to direct light beams 813, 815, and 817 towards FOV 870. Although the laser light beams emanating from optical system 820 are expected to be subject to beam divergence similar to laser light beams 730 and 732 discussed above with respect to FIG. 7A, in FIG. 8A, light beams emanating from optical system 820 are represented by their chief rays 832, 834, 836 for simplicity. It is also contemplated that in some embodiments, the one or more laser sources 812, 814, 816 may be configured to emit bundles of laser light beams. Thus, chief rays 832, 834, 836 may each represent a bundle of light beams. As also illustrated in FIG. 8A, chief rays 832 and 834 may be separated by an angle "$f_1$," and chief rays 834 and 836 may be separated by an angle "$f_2$." It is contemplated that angles $f_1$ and $f_2$ may be equal or unequal. It is also contemplated that in some exemplary embodiments, each of angles $f_1$ and $f_2$ may have a value ranging from 2.5 mrad to 6 mrad. It is also contemplated that in some exemplary embodiments, when one or more laser light sources 812, 814, 816 are configured to emit bundles of light beams, adjacent bundles of light beams may be angularly spaced apart by about 5 mrad, whereas adjacent pairs of laser light beams within each bundle may be angularly spaced apart by an angle of about 2.5 mrad. The angular spacing of 2.5 mrad to 6 mrad allows the disclosed LIDAR system to be eye safe based on an amount of energy absorbed by the eye. In one exemplary embodiment, the amount of energy absorbed by the eye is determined by integrating the energy density over a predetermined time period (effective emission duration), which may be defined by a laser eye safety standard. In one exemplary embodiment, the predetermined time period may be about 625 microseconds. In the disclosed LIDAR system (e.g., LIDAR system 800), spacing adjacent beams by 2.5 mrad and adjacent bundles of beams by 5 mrad may help ensure that an amount of energy that may be absorbed by a human eye looking at optical system 820 may be less than that deemed to be safe for the eye over the predetermined time period (e.g., 625 microseconds).

As discussed above, eye safety standards require that the total energy density in a rectangular area spanning about 5 mrad should be less than an eye safe level of energy density. Thus, it will be understood that by ensuring that adjacent chief rays (e.g. 832 and 834, or 834 and 836) are angularly spaced apart by at least 5 mrad, different laser beams, for example, corresponding to chief rays 832, 834, and/or 836 will illuminate different rectangular regions spanning 5 mrad in the eye. For example, as illustrated in FIG. 8A, chief rays 832, 834, and/or 836 may enter eye 854. However, chief ray 832 may be incident upon region 856 of retina 860 of eye 854, whereas chief ray 836 may be incident upon region 858 of retina 860 of eye 854. Moreover, only a portion of the laser light beams corresponding to chief rays 832 and 836 would be incident on regions 856 and 858, respectively. Accordingly, because only a portion of the laser light beams is incident on regions 856 and 858, these regions are exposed to an energy density significantly lower than a total energy density of each of the laser light beams corresponding to chief rays 832, 834, 836. Moreover, because each of the laser light beams corresponding to chief rays 832, 834, 836 has an energy density lower than an eye safe level of energy density, regions 856 and 858 are exposed to energy densities lower than the eye safe level of energy density, ensuring that light beams corresponding to chief rays 832, 834, and/or 836 will not cause injury or damage to eye 854.

The amount of total energy within a region on the retina of the eye may also depend on where the eye focuses. For example, if eye 854 focuses at a location at relatively small distance from the eye, an entire laser beam associated with one of chief rays 832, 834, 836 may enter eye 854. However, for short distances, because the eye is accommodated to a location relatively close to the eye, the beam will spread over a larger area of the retina. Thus, the amount of energy absorbed in a region spanned by 5 mrad would still be lower than an amount of energy corresponding to an entire laser beam. Further, because each of the laser beams corresponding to chief rays 832, 834, and 836 has an energy density less than an eye safe level of energy density, the energy density in the portion of laser beams in the region spanning 5 mrad will also be lower than the eye safe level of energy density. On the other hand, if eye 854 focuses on a distant object (e.g. eye is unaccommodated or focused on a distance of >20 m or to infinity), conceivably all of the laser beams corresponding to chief rays 832, 834, and 836 may enter eye 854. But, because chief rays 832, 834, and 836 are spaced apart by at least 5 mrad from each other, different 5 mrad portions of eye 854 (e.g., region 856, 858, etc.) will receive the entirety of each of the laser beams corresponding to chief rays 832, 834, and 836. Furthermore, because each of the laser beams corresponding to chief rays 832, 834, and 836 has an energy density less than the eye safe level of energy density, each of the regions 856, 858, etc., will also receive an energy density less than the eye safe level of energy density. Thus, by separating the chief rays by 5 mrad, the disclosed LIDAR system may help ensure that no injury or damage is caused to a human eye regardless of whether the eye is focused at a location relatively close to the eye or at a location very far (e.g., greater than 20 m or infinity) (e.g., the disclosed LIDAR system safely accommodates the eye to infinity).

In some embodiments, the at least two laser light beams projected from the deflector are separated from one another by an angular spacing of between 5 mrad and 6 mrad. In some embodiments, the at least two laser light beams deflected by the deflector are separated from one another by an angular spacing of between 5 mrad and 10 mrad, or 2.5-10 mrad. It is therefore contemplated that there may be optimum values of angles $f_1$ and $f_2$ that may allow object 882 to be detectable by LIDAR system 800 while at the same time ensuring that LIDAR system 800 is safe for an eye. In some exemplary embodiments, the optimum values of angles $f_1$ and $f_2$ may range between 5 mrad and 5.5 mrad. In other exemplary embodiments, the optimum values of angles $f_1$ and $f_2$ may range between 5 mrad and 6 mrad.

Although three laser sources 812, 814, and 816, one deflector 822, and three laser beams corresponding to chief rays 832, 834, and 836 have been discussed above with respect to LIDAR system 800, it should be understood that LIDAR system 800 may include any number of laser sources, deflectors, and/or laser beams. Thus, for example, light projection system 810 may include more than or less than three laser light sources 812, 814, 816, optical system 820 may include more than one deflector 822, and optical system 820 may be configured to emit more than or less than three laser light beams (e.g., corresponding to chief rays 832, 834, 836).

In some embodiments, the laser light projection system includes a monolithic laser array and wherein each of the at least two laser light beams is generated by a different active region of the monolithic laser array. Although light projection system 810 in LIDAR system 800 has been illustrated as including discrete package laser light sources 812, 814, and 816, it may be advantageous to instead generate the laser light beams using a monolithic laser array. In particular, the discrete package light sources 812, 814, and/or 816 are relatively large, will likely have a larger overall footprint, and require separate electronic components. Because of the relatively large size of the discrete package laser light sources 812, 814, and 816, a size of laser light projection system 810 may also be large. Additionally, assembly of such discrete packaged lasers is complex and may add significant effort for aligning the laser light beams emitted by discrete package laser 812, 814, 816, etc. Furthermore, each of the discrete packaged laser light sources 812, 814, and/or 816 typically requires its own associated optical elements (e.g., lenses, collimators, etc.), and/or its own associated electrical control circuitry. Use of separate optical elements for each discrete packaged laser light source may increase a size and/or cost of manufacture of light projection system 810.

A monolithic laser array may overcome some of the disadvantages of discrete package laser light systems. A monolithic laser array refers to an array of laser light sources fabricated on a single (e.g., monolithic) silicon wafer. Because the laser light sources are fabricated on a single silicon wafer, the laser light sources on the monolithic laser array are well aligned with each other. Furthermore, because of the use of semiconductor fabrication techniques, a size of the laser light array may be significantly reduced, making light projection system 810 compact in size. As will be described later in this disclosure, monolithic laser arrays may be one-dimensional or two-dimensional.

Figure 8B:
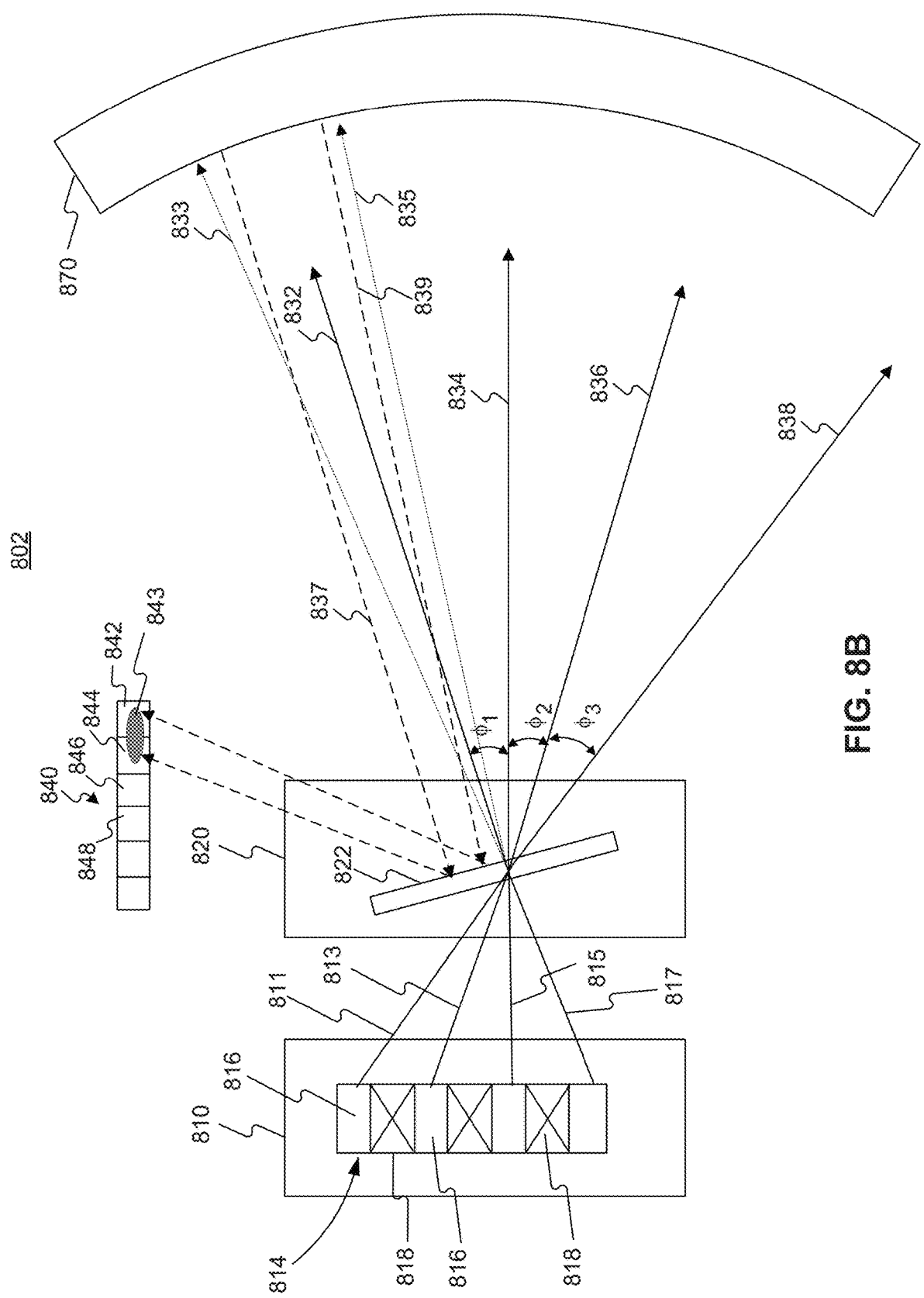

FIG. 8B illustrates LIDAR system 802 that includes light projection system 810 having a monolithic laser array 814. As illustrated in FIG. 8B, and as discussed above, monolithic laser array 814 may be fabricated on a single silicon wafer and may include active laser light emitting portions 816 that may be configured to emit laser light and inactive non-laser light emitting portions 818 that are not configured to laser light. As also illustrated in FIG. 8B, laser light beams 811, 813, 815, and/or 817 are emitted by different active regions 816 of monolithic laser array 814. It is contemplated that monolithic laser arrays similar to 814 may be used to provide the laser light beams in any of the LIDAR systems disclosed in this disclosure.

Similar to the configuration disclosed for LIDAR system 800 of FIG. 8A, laser light beams 811, 813, 815, and/or 817 may be directed towards deflector 822 using various optical elements (e.g., lenses, collimators, etc.) of light projection system 810. Deflector 822 may direct the laser beams towards FOV 870. In FIG. 8B, laser light beams directed towards FOV 870 may be represented by their corresponding chief rays 832, 834, 836, and/or 838. As also illustrated in FIG. 8B, chief rays 832 and 834 may be angularly spaced apart by an angle $f_1$, chief rays 834 and 836 may be angularly spaced apart by an angle $f_2$, and chief rays 836 and 838 may be angularly spaced apart by an angle $f_3$. It is contemplated that angles $f_1$, $f_2$, and $f_3$ may be equal or unequal and may be at least 5 mrad.

Figures 8C, 8D:
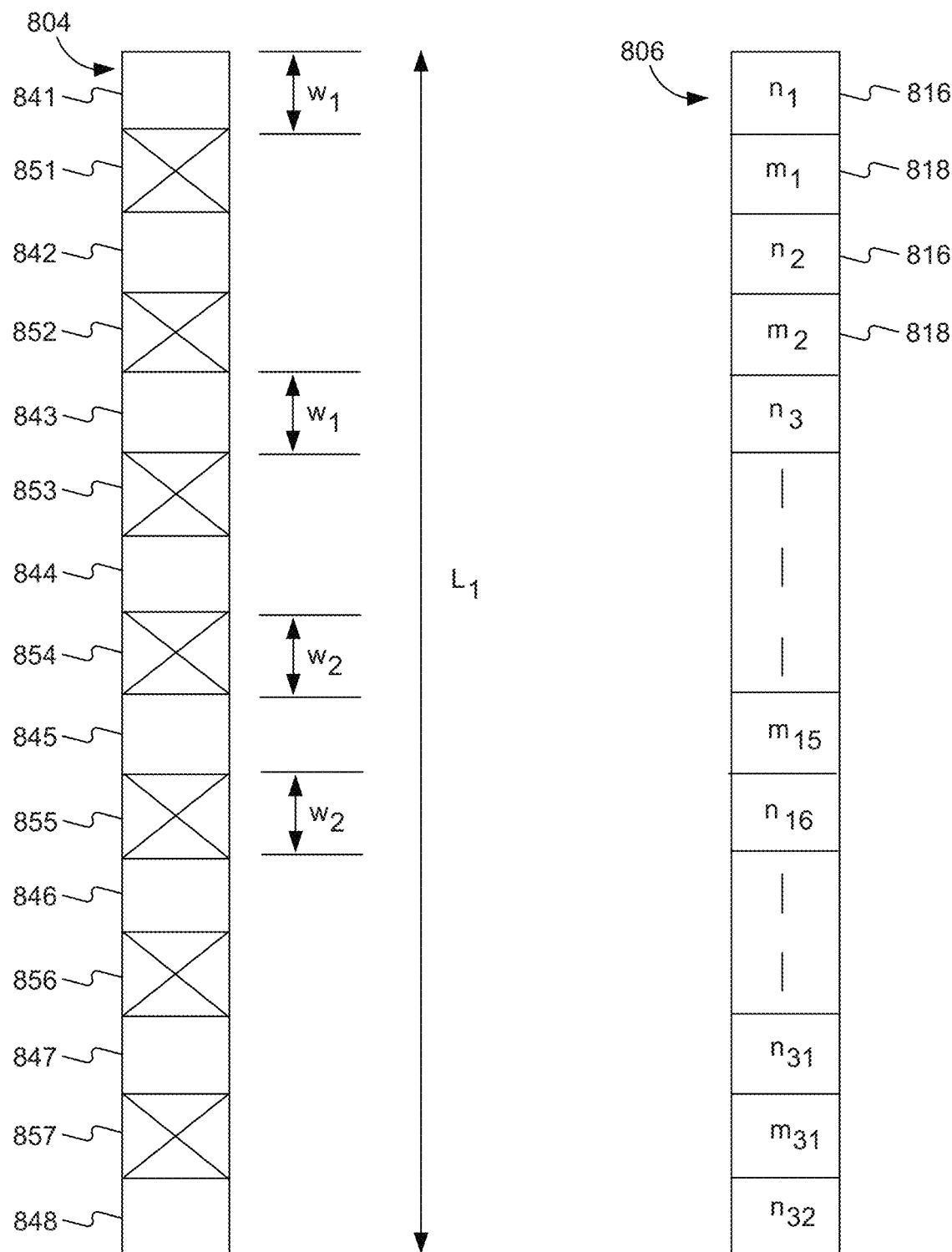
FIGS. 8C and 8D are diagrams illustrating exemplary monolithic laser arrays consistent with some embodiments of the present disclosure.

In some embodiments, the monolithic laser array may include at least two active laser emitting regions separated by a non-laser emitting inactive region. By way of example, monolithic laser array 814 (see FIG. 8B) may include a plurality of active regions 816. For example, as illustrated in FIG. 8B, monolithic laser array 814 includes four separate active laser emitting regions 816 and each pair of active laser emitting regions 816 is separated by a non-laser emitting inactive region 818. By way of another example, FIG. 8C illustrates a monolithic laser array 840 that includes a plurality of active regions (e.g., 841, 842, 843, 844, etc.). Moreover as also illustrated in FIG. 8C, adjacent pairs of active laser emitting regions (e.g., 841 and 842) are separated by a non-laser emitting inactive region 851. Likewise adjacent pairs of active laser emitting regions (e.g., 842 and 843) are separated by a non-laser emitting inactive region 852.

In some embodiments, between 50% and 75% of the monolithic laser array may be occupied by non-light emitting, inactive regions. As discussed above, monolithic laser may include active laser emitting regions separated by non-laser light emitting inactive regions. It is contemplated that in some exemplary embodiments between 50% and 75% of the monolithic laser array may be made up of the non-laser emitting inactive regions. It is to be understood that in two-dimensional monolithic laser arrays, between 50% to 75% of the array may include the non-laser light emitting inactive regions in each of the two directions. Although separating adjacent pairs of active laser emitting regions with non-laser emitting inactive regions appears counter-intuitive because it does not make use of all the available area on the silicon wafer, monolithic laser arrays may still provide a cost-effective solution as compared to discrete package laser light sources. This is because even though the material cost of using monolithic laser areas may be higher (because of the unused inactive regions), the manufacturing cost of such monolithic lasers is much smaller than that associated with discrete package laser light sources. This is because manufacturing the monolithic laser arrays on a single silicon wafer provides for automatic alignment of all the laser sources on the wafer, and does not require additional efforts to align the laser sources with respect to one another (alignment of the laser array with respect to the rest of the system is required). Furthermore because of the compact size of the monolithic laser array, a plurality of the active laser emitting areas may be able to use the same set of optical elements (e.g., lenses, collimators, optical filters, etc.) thereby reducing the cost of the additional components required for LIDAR system 802, and reducing the alignment complexity of LIDAR system 802.

In some embodiments, the monolithic laser array includes at least four active laser emitting regions separated from one another by non-laser emitting inactive regions. It is contemplated that a monolithic laser array may include any number of active laser light emitting regions. For example, as illustrated in FIG. 8A, monolithic laser array 814 includes four active laser light emitting regions 816 and three non-laser emitting inactive regions 818. It is also contemplated that monolithic laser 814 as used in, for example, LIDAR system 802, may include more than or less than four active laser emitting regions. By way of example, the number of active laser emitting regions may be based on a type of laser (e.g., edge emitter laser, vertical-cavity surface-emitting laser (VCSEL), etc.)

In some embodiments, the monolithic laser array may include at least eight active laser emitting regions separated from one another by non-laser emitting inactive regions. By way of example, FIG. 8C illustrates monolithic laser array 804 that includes eight active laser emitting regions (e.g., 841-848). As also illustrated in FIG. 8C, adjacent pairs of active regions in monolithic laser array 40 may be separated by inactive regions (e.g., 851-857). For example, as illustrated in FIG. 8C, active laser emitting regions 841 and 842 may be separated by an non-laser emitting inactive region 851, active laser emitting regions 842 and 843 may be separated by non-laser emitting inactive region 852, active laser emitting regions 843 and 844 may be separated by an non-laser emitting inactive region 853, etc. In some embodiments, the monolithic laser array may include at least sixteen active laser emitting regions separated from one another by non-laser emitting inactive regions. In some embodiments, the monolithic laser array may include at least 32 active laser emitting regions separated from one another by non-laser emitting inactive regions. In some embodiments, the monolithic laser array may include between 2 and 256 active laser emitting regions separated from one another by non-laser emitting inactive regions. By way of example, FIG. 8D illustrates an exemplary monolithic laser array 806 that may include 16 or 32 active regions 816. For example, as illustrated in FIG. 8D, monolithic laser array 806 may be divided into two monolithic laser arrays, each including active laser emitting regions 816 (e.g., $n_1$-$n_{16}$, OR $n_{17}$-$n_{32}$), with adjacent pair of active laser emitting regions spaced apart by non-laser emitting inactive regions 818 (e.g., $m_1$-$m_{15}$, OR $m_{16}$-$m_{31}$). As also illustrated in FIG. 8D, monolithic laser array may include 32 active laser emitting regions 816 (e.g., $n_1$-$n_{32}$), with adjacent pairs of active laser emitting regions being separated by non-laser emitting inactive regions 818 (e.g., $m_1$-$m_{31}$). It is contemplated, however, that one or more of monolithic laser arrays 814, 804, or 806 may include anywhere from between 2 to 256 active laser emitting regions with adjacent pairs of active laser emitting regions being separated by non-laser emitting inactive regions.

In some embodiments, active regions of the monolithic laser array may be separated from one another by inactive regions having a width of at least 20 µm. In some embodiments, active regions of the monolithic laser array are separated from one another by inactive regions having a width of at least 50 µm. In some embodiments, active regions of the monolithic laser array are separated from one another by inactive regions having a width of between 20 µm and 500 µm. In some embodiments, active regions of the monolithic laser array are separated from one another by inactive regions having a width of between 20 µm and 100 µm. Widths of active laser emitting regions (e.g., 816, 841-848, $n_1$-$n_{32}$) may be equal or unequal and may range from a few µm to several tens of µm. For example, as illustrated in FIG. 8C, active laser emitting regions 841 and 843 of monolithic laser array 804 may have a width "$W_1$" whereas non-laser emitting inactive regions 854, 855 may have a width "$W_2$." Widths $W_1$ and $W_2$ may also be equal or unequal. Widths $W_1$ and $W_2$ may be determined based on, for example, capabilities of the semiconductor manufacturing process, an amount of energy density desired from the laser beams emitted from each active laser emitting region, desire to minimize interference between laser beams emitted from adjacent active laser emitting regions, etc. W1 and W2 are limited by laser manufacturing process and laser design, and if W2 is much larger than W1 (e.g. W2/W1>2), the cost per Watt of the laser becomes prohibitive. As W2/W1 increases, the system will be more eye safe in most scenarios, however the cost of the laser source increases. It is contemplated that widths of the inactive regions may range between 20 µm and 500 µm. For example, in some embodiments, the width of the inactive regions may be 20 µm, while in other exemplary embodiments the width of the inactive regions may be 500 µm. It is also contemplated that a center-to-center spacing between a pair of active laser emitting regions may be about 300 µm, and range between 100 µm and 500 µm.

In some embodiments, active regions of the monolithic laser array may have a width between 1 µm and 20 µm. In some embodiments, active regions of the monolithic laser array have a width between 25 µm and 500 µm. As discussed above, width W1 of an active laser-emitting region may be determined based on, for example, a type of laser source, capabilities of the semiconductor manufacturing process, an amount of energy density desired from the laser beams emitted from each active laser emitting region, desire to minimize interference between laser beams emitted from adjacent active laser emitting regions, etc. In the disclosed embodiments, a width of each active laser-emitting region may range from 1 µm to 500 µm. In some exemplary embodiments, the width of each active laser-emitting region may range from 1 µm to 20 µm. In other exemplary embodiments, the width W1 may range from 25 µm to 500 µm. In other exemplary embodiments, the width W1 may be about 110 µm, and W2 may be about 200 µm.

In some embodiments, the monolithic laser array may be a 2-dimensional laser array including multiple active laser emitting regions separated from one another by non-laser emitting inactive regions in each dimension. Although monolithic arrays 804, 806, 814 above have been described and illustrated as one-dimensional arrays, the disclosed embodiments are not so limited. It is contemplated that in some exemplary embodiments, the monolithic laser arrays may be two dimensional arrays (e.g., 2×2, 3×3, 4×4, etc. arrays). It is also contemplated that the number of rows and columns in the two-dimensional monolithic laser arrays may be equal or unequal. It is further contemplated that the two-dimensional monolithic laser arrays may not be arranged in a rectangular shape but may instead be distributed over a circular or elliptical area or may be arranged in a honeycomb or other pattern.

In some embodiments, the monolithic laser array may have an overall length ranging between 0.5 mm to 20 mm. In some embodiments, the monolithic laser array may have an overall length ranging between 1 mm to 6 mm. By way of example, as illustrated in FIG. 8C, an overall length of monolithic laser array 804 may be $L_1$. An overall length of the monolithic laser array may be determined based on, for example, a size of the silicon wafer, a number of beams of laser light desired from the monolithic laser array, and/or other size consideration such as a size of laser light projection system 810 and/or optical system 820. It is contemplated that an overall length $L_1$ of monolithic laser array may range from a few tens of µm to hundreds of µm. In one exemplary embodiment, an overall length of monolithic laser array 804 may range from 0.5 mm to 20 mm. In another exemplary embodiment, an overall length of monolithic laser array 804 or 806 may range from 1 mm to 6 mm, although other lengths are also contemplated.

Figure 8E:
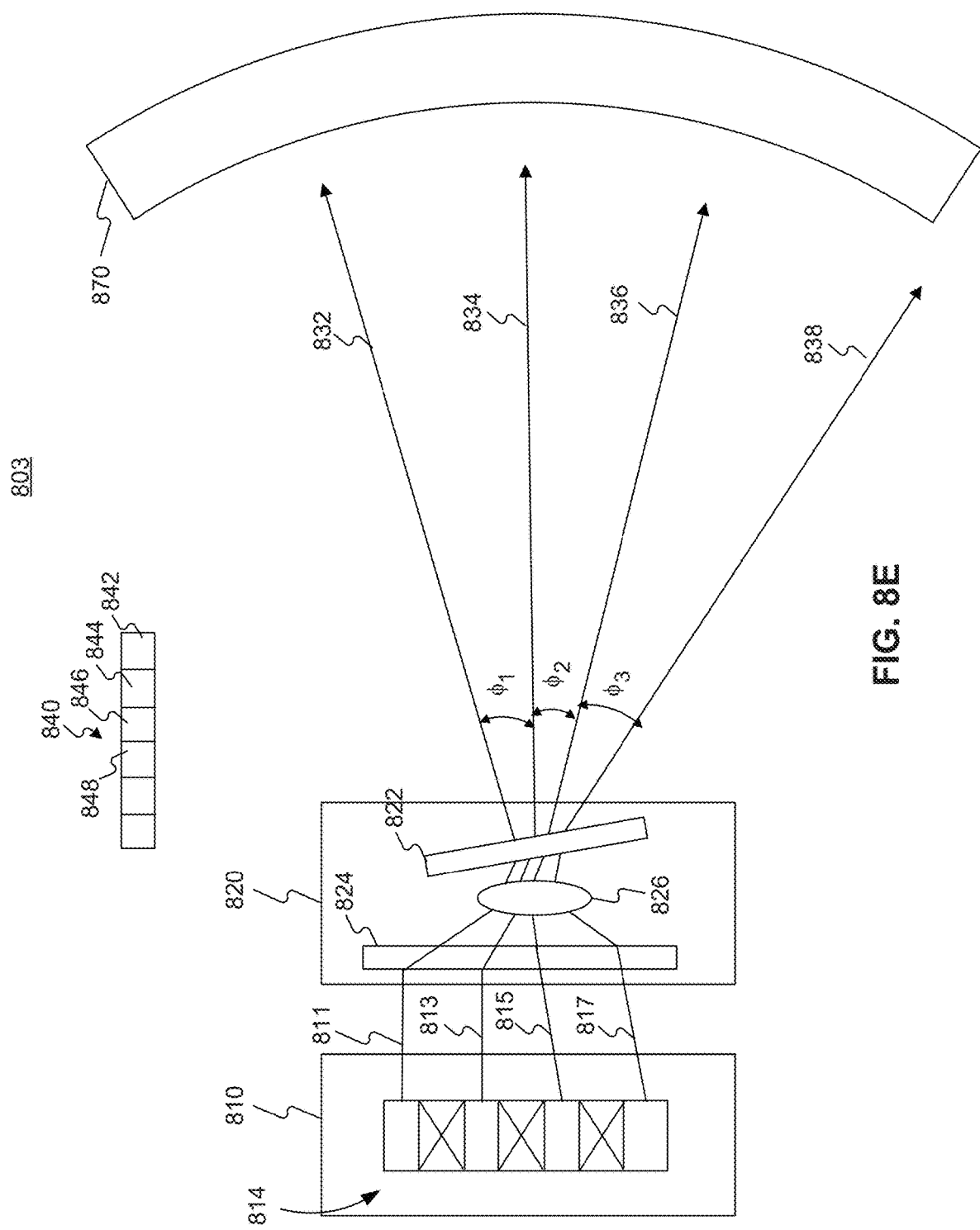

In some embodiments, the at least two laser light beams may be projected through a shared collimator included in the LIDAR system. In some embodiments, the at least two laser light beams may be project through at least one shared lens included in the LIDAR system. As discussed above, using the monolithic laser array may allow for reduction in size of the laser light projection system (e.g., 810). Further, as discussed above, using a monolithic array may also allow the different active laser emitting regions to use the same set of optical components (e.g., lenses or collimators, etc.). By way of example, FIG. 8E illustrates an exemplary LIDAR system 803 that may include laser light projections system 810, optical system 820, and detector 840. As discussed above with respect to LIDAR system 800 of FIG. 8A, laser light projection system 810 of LIDAR system 803 of FIG. 8E may include monolithic laser array 814 as a source of laser light. Monolithic laser array 814 may emit a plurality of laser beams (e.g., 811, 813, 815, and/or 817). The plurality of laser beams 811, 813, 815, 817 may be received by optical system 820 that may include, for example, collimator 824, deflector 822, and lens 826. Laser beams 811, 813, 815, and/or 817 may share collimator 824 that may receive laser beams 811, 813, 815, and/or 817 and direct the laser beams towards shared lens 826, which in turn may direct laser beams 811, 813, 815, and/or 817 towards shared deflector 822. Laser beams 811, 813, 815, 817 exiting deflector 822 may be represented by their associated chief rays 832, 834, 836, and/or 838. As discussed above with respect to LIDAR system 801, adjacent pairs of chief rays 832, 834, 836, and/or 838 may be angularly spaced apart from each other at an angle that may be equal to or greater than 5 mrad. Although only one collimator 824, one deflector 822, and one lens 826 has been illustrated in FIG. 8E and described above, it is contemplated that optical system 820 may have any number of collimators 824, deflectors 822, and/or lenses 826 that may be shared by a plurality of laser light beams (e.g., 811, 813, 815, 817, etc.) emitted by laser light projection system 810.

In some embodiments, the at least two laser light beams each may have a wavelength between 800 nm and 1000 nm. As discussed above, one or more of light sources (e.g., 712, 714, 812, 814, 816, 804, 806, etc.) may be a laser light source such as a solid-state laser, laser diode, a high power laser, or an alternative light source such as, a light emitting diode (LED)-based light source. In addition, the one or more light sources as illustrated throughout the figures, may emit light in differing formats, such as light pulses, continuous wave (CW), quasi-CW, and so on. For example, one type of light source that may be used is a vertical-cavity surface-emitting laser (VCSEL). Another type of light source that may be used is an edge emitting laser. In some examples, the light source (e.g., 712, 714, 812, 814, 816, 804, 806, etc.) may include a laser diode configured to emit light at a wavelength between about 650 nm and 1150 nm. Alternatively, the light source may include a laser diode configured to emit light at a wavelength between about 800 nm and about 1000 nm, between about 850 nm and about 950 nm, or between about 1300 nm and about 1600 nm.

In some embodiments, the LIDAR system may include a monolithic detector array, and reflections of the at least two laser light beams received from the field of view are received by the monolithic detector. For example, as discussed above, one or more of LIDAR systems (e.g., 700-702, 800, 802, 803) may include detectors configured to detect one or more objects in, for example FOV 770, 870, etc. As illustrated in FIG. 8A, laser light reflected from one or more objects in FOV 870 may be directed towards detector 840. For example, as illustrated in FIG. 8A, chief rays 832, 834, and/or 836 may be reflected by one or more objects in FOV 870 as reflected light rays 852, 854, and/or 856, respectively. As also illustrated in FIG. 8A, reflected light rays 852, 854, and/or 856 may be directed by deflector 822 towards detector 840. In one exemplary embodiment detector 840 may be a monolithic detector that may be fabricated on a single silicon wafer. Monolithic detector 840 may include a plurality of detection zones or pixels (e.g., 842, 844, 846, 848, etc.) Each zone or pixel 842, 844, 846, and/or 848 may be configured to detect light reflected from one or more objects in FOV 870.

In some embodiments, a number of pixels in the monolithic detector array is greater than or equal to a number of beams included in the two or more laser light beams. In some embodiments, a number of pixels in the monolithic detector array is greater than a number of beams included in the two or more laser light beams. It is contemplated that in some embodiments, detector 840 may have a dedicated zone or pixel configured to detect reflections of each of a plurality of laser light beams emitted by laser light projection system 810 and optical system 820. Thus, for example, in some exemplary embodiments, detector 840 may have the same number of zones or pixels as the number of light beams being emitted by optical system 820. By way of example, detector 840 may include just three zones or pixels (e.g., 842, 844, 846, 848, etc.) corresponding to, for example, light beams represented by chief rays 832, 834, and/or 836. It is contemplated, however, that the number of zones or pixels in detector 840 may be less than or more than the number of beams being emitted by optical system 820. By way of example, as illustrated in FIG. 8A, detector 840 of LIDAR system 802 may include more than or less than three pixels or zones (e.g., six zones) such as 842, 844, 846, 848, etc.

In some embodiments, each reflection is associated with a spot size incident on more than one pixel of the monolithic detector array. For example, as discussed above with respect to FIG. 7A, laser light beams (e.g., 730, 732) emitted by optical system (e.g., 720, 820) may diverge as they travel from optical system (e.g., 720, 820) towards FOV (e.g., 770, 870). In other words, each light beam 730, 732 may be represented by a plurality of rays, some or all of which may be reflected by one or more objects in FOV 770, 870. The reflected rays of light may be directed by, for example deflector (e.g., 722, 724, 822) towards a detector (e.g., 740, 840). The reflected rays of light may form a spot of reflected light on detector 740 or 840. In some embodiments the spot of reflected light may be incident on only one of the pixels or zones (e.g., 842) out of the plurality of pixels or zones (e.g., 842, 844, 846). In other exemplary embodiment, the spot of reflected light may be incident on more than one of the pixels or zones. By way of example, in FIG. 8B, outermost rays for a laser beam corresponding to chief ray 832 are represented by rays 833, 835. Further, in FIG. 8B, some of these rays reflected by one or more objects in FOV 870 are represented by dashed arrows 837, 839. As also illustrated in FIG. 8B, these reflected rays 837, 839 may be directed by deflector 822 onto detector 840 and may form a spot 843 that may be incident on for example pixels 842 and 844. By ensuring that spot 843 is incident on more than one pixel 842, 844, it may be possible to ensure that more than one pixel generates a signal corresponding to the detected object. The combination of signals detected by both pixels 842 and 844 may make it more likely that the LIDAR system (e.g., 700-702, 800, 802, 803, etc.) may detect the objects in the FOV, and increases the resolution of the detection by generating 2 pixels from a single spot.

Figure 9A:
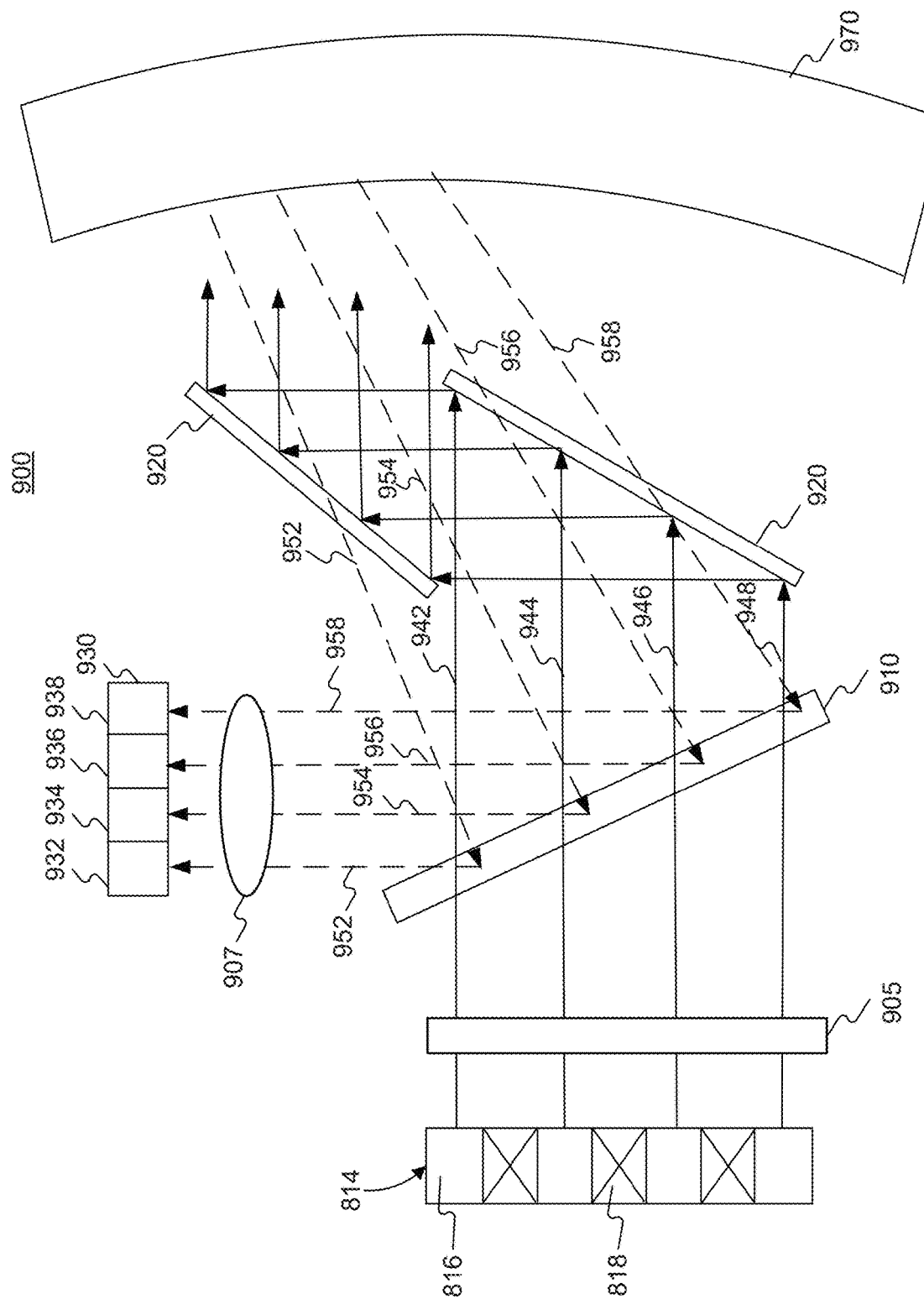

In some embodiments, the two or more laser light beams are provided to a common beam splitter configured to pass the two or more laser light beams toward the deflector and to redirect reflections of the at least two laser light beams received from the field of view toward a monolithic detector array. For example, as discussed above with respect to FIG. 2D, one or more of LIDAR systems 700-702, 800, 801, 803 may be equipped with an directional dependent splitter that may be configured to transmit laser light, while at the same time being configured to deflect light reflected from FOV 770 or 870 towards a detector. FIG. 9A illustrates one such exemplary LIDAR system 900. As illustrated in FIG. 9A, LIDAR system 100 may include monolithic laser array 814 configured to emit one or more beams of laser light (e.g., 942, 944, 946, 948). The one or more beams of laser light may be collimated by one or more collimators 905 before beams 942, 944, 946, and/or 948 are incident on beam splitter 910. Beam splitter 910 may allow light beams and 942, 944, 946, and 948 to pass through and be incident on deflectors 920, which may be configured to direct light beams 942, 944, 946, and/or 948 towards FOV 970. Although only two deflectors 920 has been illustrated in FIG. 9A, it is contemplated that LIDAR system 900 may include more than two deflectors 922 configured to direct one or more of the light beams 942, 944, 946, and/or 948 towards FOV 970. As discussed above, one or more objects in FOV 970 may reflect one or more of the light beams 942, 944, 946, 948. As illustrated in FIG. 9A, the reflected light beams may be represented as light beams 952, 954, 956, and/or 958. Although reflected light beams 952, 954, 956, and/or 958 are illustrated in FIG. 9A as being directly incident on beam splitter 910, it is contemplated that some or all of light beams 952, 954, 956, and/or 958 may be directed by deflectors 920 and/or another deflector towards beam splitter 910. When light beams 952, 954, 956, and/or 958 reach splitter 910, splitter 910 may be configured to direct reflected light beams 952, 954, 956, 958 towards detector 930. One or more lenses and or optical filters 907 may receive the reflected light beams 952, 954, 956, and/or 958 and direct these light beams towards detector 930. As also illustrated in FIG. 9A detector 930 may be a monolithic detector having one or more pixels or zones 932, 934, 936, etc., that may be configured to receive and detect reflected light beams 952, 954, 956, 958, etc. Although FIG. 9A illustrates four light beams being emitted by monolithic laser array 814, it is contemplated that monolithic laser array 814 may emit any number of light beams (e.g., less than or more than four). As also illustrated in FIG. 9A, beam splitter 910 may direct at least two reflected laser light beams (e.g., and 952, 954) towards detector 930.

In some embodiments, the two or more laser light beams are provided to a common beam splitter configured to direct the two or more laser light beams toward the deflector and to pass to a monolithic detector array reflections of the at least two laser light beams received from the field of view. By way of example, FIG. 9B illustrates an exemplary LIDAR system 902 that may include monolithic laser array 814, collimator 905, beam splitter 910, deflector 920, lens and/or optical filter 907 and detector 930. As illustrated in FIG. 9B, monolithic laser array 814 may emit one or more laser beams (e.g., 942, 944, 946, 948) that may be collimated by one of more collimators 905 before being incident on beam splitter 910. Beam splitter 910 may be configured to direct one or more of the laser beams 942, 944, 946 and/or 948 towards deflectors 920, which in turn may be configured to direct the one or more laser beams 942, 944, 946, 948 towards FOV 970. As discussed above, one or more objects in FOV 970 may reflect one or more of the light beams 942, 944, 946, 948. Reflected light beams 952, 954, 956, 958 may be directed by deflectors 920 to be incident on beam splitter 910. It is also contemplated that some or all of reflected light beams 952, 954, 956, 958 may reach beam splitter 910 without being directed by deflector 920 towards beam splitter 910. As illustrated in FIG. 9B beam splitter 910 may be configured to allow the reflected light beams 952, 954, 956 and/or 958 to pass through beam splitter 910 towards detector 930. One or more lenses and/or optical filters 907 may receive the reflected light beams 952, 954, 956, and/or 958 and direct these light beams towards detector 930. As also illustrated in FIG. 9B detector 930 may be a monolithic detector having one or more pixels or zones 932, 934, 936, etc., that may be configured to receive and detect reflected light beams 952, 954, 956, 958, etc. Although FIG. 9B illustrates four light beams being admitted by monolithic laser array 814, it is contemplated that monolithic laser 814 may emit any number of light beams (e.g., less than or more than four). As also illustrated in FIG. 9B, beam splitter 910 may direct at least two reflected laser light beams (e.g., 952, 954) towards detector 930.

Figure 9C:
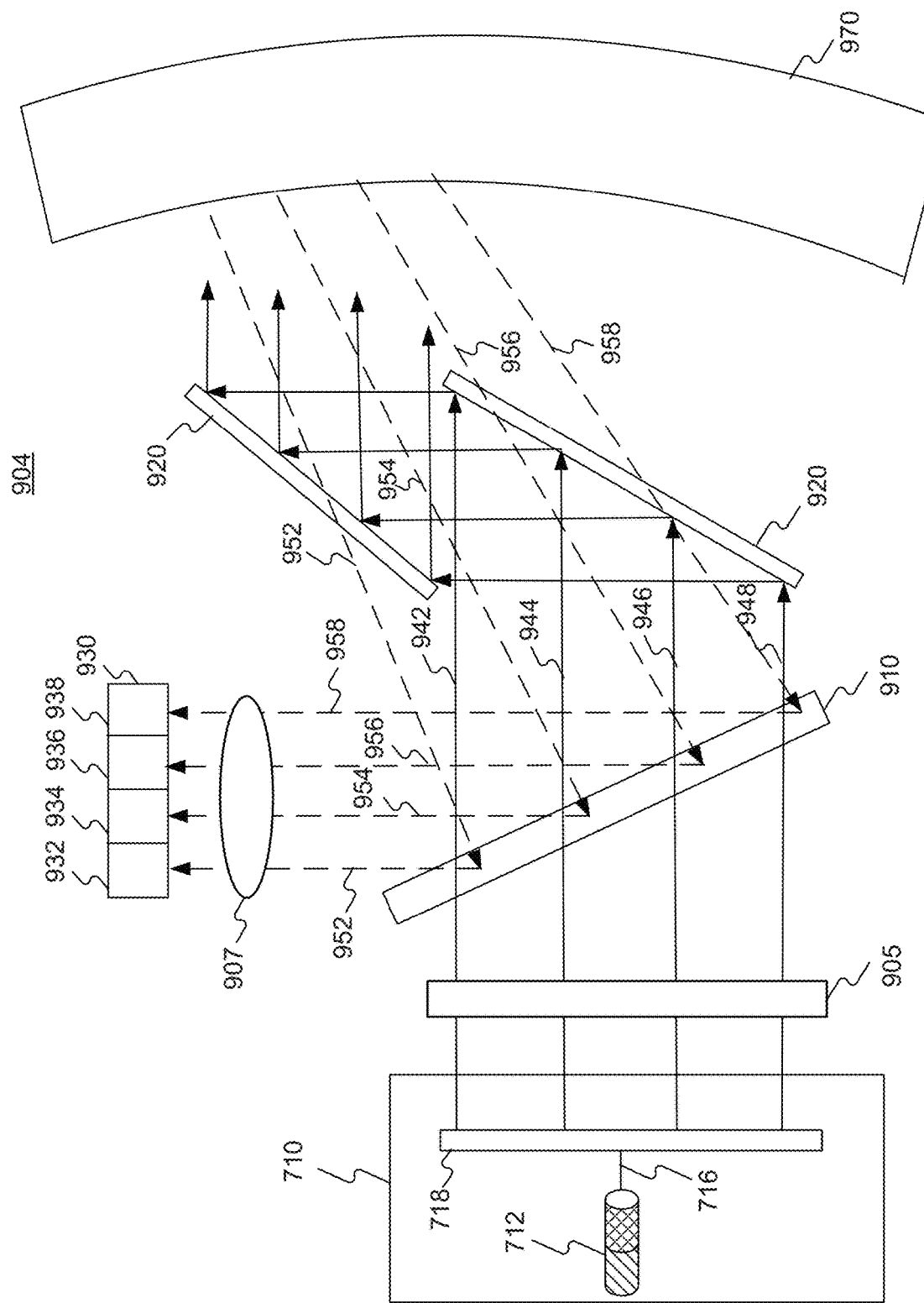

In some embodiments, the laser light projection system may include a light source configured to emit a single laser beam; and a beam splitter configured to split the single laser beam to generate the at least two laser light beams. For example, it is contemplated that in some embodiments, one or more of LIDAR systems 900 or 902 may include one or more laser light beam emitters and one or more beam splitters to generate the plurality of beams. For example, FIG. 9C illustrates one such exemplary LIDAR system 904. Many of the components and arrangements of components in LIDAR system 904 of FIG. 9C are similar to those of LIDAR system 900 of FIG. 9A and therefore description of these shared components and arrangements will not be repeated. Unlike LIDAR system 900, however, LIDAR system 904 of FIG. 9C may include laser light projection system 710 that may include a packaged or unpackaged laser light source 712 configured to emit laser light beam 716. Laser light projection system 710 of LIDAR system 904 may also include beam splitter 718 configured to split light beam 716 into four separate laser light beams 942, 944, 946, and/or 948. Although only one laser light source 712 and one beam splitter 718 are illustrated in FIG. 9C, it is contemplated that LIDAR system 904 may include any number of laser light sources 712 and any number of beam splitters 718 configured to generate a plurality of beams of laser light. Although not separately illustrated, it is also contemplated that monolithic laser array 814 in LIDAR system 902 of FIG. 9B may be replaced by laser light projection system 710 as illustrated in FIG. 9C.

Although sources 712, 714, 812, 814, and/or 816 have been described as being sources of laser light, it is contemplated that one or more of sources 712, 714, 812, 814, and/or 816 may instead emit other types of non-laser light (e.g., visible light, ultraviolet light, infrared light, etc.). It is contemplated that the various components of one or more of LIDAR systems 700, 701, 702, 800, 802, 803, 900, 902, and/or 904 may function as described even when the light sources 712, 714, 812, 814, and/or 816 emit non-laser light.

In some example embodiments, for maintaining or increasing desired levels of sensitivity, detection range, SNR, etc., but without increasing risks to eye safety, two or more light sources may be included in a LIDAR system. Rather than being arranged to illuminate different regions of a FOV, the two or more light sources may be arranged such that the light beams emitted from the two or more light sources are made incident on the same region of the LIDAR's FOV. In this way, overall light intensity directed towards a particular region of a FOV may be increased. At the same time, the optical geometry of the system may be arranged such that the system complies with eye-safety guidelines.

In some embodiments, the two or more light sources may be positioned at defined distances relative to one another. The distances between the light sources and the relative angle between light sources can be configured such that beams emitted from the light sources remain at least a desired or specified distance from one another over at least a predetermined distance from the LIDAR system. Alternatively or additionally, optical elements may be included and arranged such that the beams of two or more spaced-apart light sources are made incident on a single region of the FOV, but those beams remain separated by at least a desired or specified distance from one another over at least a predetermined distance from the LIDAR system.

In such embodiments, the overall intensity of light available for scanning a single region of the FOV may be increased relative to a single light source embodiment. At the same time, however, the multi-light source configurations and their associated optical geometry may ensure compliance with eye safety guidelines, regulations, etc. For example, where multiple light sources are included, each light source may have a power level at or below an eye-safe power level. Further, the optical geometry of the system, resulting from the spatial and relative orientation of the included light sources and optical elements may ensure that the beams emitted from the available light sources remain spaced apart by a distance sufficient such that no more than one of the emitted beams may enter an eye within a certain distance range from the LIDAR system. In some cases, the light sources may be oriented relative to one another such that the emitted beams remain spaced apart by at least 7 mm over a predetermined distance from the LIDAR system.

Controlling the geometry of the system may ensure that no more than a desired maximum number of beams can potentially enter an eye within a predetermined distance from the LIDAR system. For example, in a system with two laser sources both having a power level at or just below an eye-safe level, the system geometry may ensure that no more than one of the beams emitted from the two sources can enter an eye within a predetermined distance from the LIDAR system. In another example, the LIDAR system may include three or more laser sources that each having a power level below an eye-safe level. If more than one of the beams emitted from the three or more sources enter an eye, the system's optical geometry may ensure that the total intensity of those beams will not exceed an eye-safe level. For example, if a LIDAR system includes three light sources that each emit a beam with an intensity or power level at 50% of an eye safe level, the system's optical geometry may ensure that no more than two of the emitted beams can enter an eye within a certain distance of the LIDAR system. As a result, the disclosed embodiments may result in LIDAR systems that offer improved sensitivity, detection range, SNR, etc. while complying with established eye safety guidelines.

In one embodiment, a LIDAR system may include two laser light sources configured to emit light (e.g., light pulses) simultaneously. Additionally, the LIDAR system may include two scanning mirrors (e.g., Tx mirrors) each dedicated to transmission of light emitted from an associated one of the two laser light sources toward a particular region of the LIDAR's FOV. Alternatively, a single Tx mirror may be used to simultaneously transmit the light emitted by both of the light sources toward a particular region of the LIDAR's FOV. Scanning of the Tx mirror(s) may enable scanning of the LIDAR's FOV (e.g., by incrementally illuminating each particular region (e.g., pixel) in the LIDAR's FOV with the simultaneously emitted beams of the two light sources). To collect the return signals (e.g., laser light reflected from an object located at a particular region of the LIDAR's FOV), the LIDAR system may also include one or more mirrors (e.g., Rx mirrors) configured to collect received laser light reflections and directing those reflections toward one or more light detectors.

For example, in some cases, multiple light sources (e.g., provided by a 60 W laser bar configured to emit multiple laser beams) may be paired with a scanning mirror such that each emitted laser beam is transmitted to a different one of the available scanning mirrors. In one example, FOV1 may be scanned using two "FOV1" laser light sources. The FOV1 laser light sources may be directed to two different scanning mirrors and then transmitted to FOV1, such that the two spots from the laser light sources both impinge on a particular region of FOV1. FOV1 may be scanned by coordinated motion of the two scanning mirrors.

To maintain eye safety and to ensure that light beams emitted by the two light sources will not simultaneously enter the pupil of an eye, the laser light sources may be spaced apart and/or oriented such that the beams emitted by the two laser sources remain at least a certain distance apart from one another and within a predetermined distance from the LIDAR system. (e.g., the predetermined distance from the LIDAR system may be a minimum distance a human eye may focus on (e.g., greater than 10 cm) to the full range of the LIDAR system). For example, the two laser light sources may be spaced apart and/or oriented relative to one another such that the emitted beams cannot both enter an eye pupil (e.g., a 7 mm spot) within a predefined distance from the system. In some cases, this may be achieved by ensuring that the emitted beams remain spaced apart by at least a minimum distance of 7 mm. In some embodiments, such spacing between the beams may be achieved by using an optical system configured to generate parallel light beams spaced apart by a distance of, for example, 5 mm or 7 mm, and deflecting the emitted light with one or more mirrors (e.g., spaced apart by about 5 mm to 7 mm).

Additionally or alternatively, the LIDAR system may include a configuration for scanning a second portion of an FOV, e.g., FOV2. In this case, four laser light sources from the laser bar may be directed to corresponding scanning mirrors, as shown. Each of the four laser beams may then be transmitted from the respective scanning mirror to a particular region of FOV2, which can be scanned by moving the four scanning mirrors in a coordinated manner such that the four laser spots (which may be simultaneously incident upon a particular region of FOV2) are moved together over FOV2. Although two or four laser beams have been discussed above, different numbers of laser beams (e.g., 3, 5, 6, 10, 20, 50, or more) may also be used to scan a particular region of an FOV. Additionally, different numbers of laser beams may be used to simultaneously scan different regions of an FOV (e.g., FOV1 and FOV2).

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer-readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A LIDAR system, comprising:
 a laser light projection system configured to simultaneously project at least two laser light beams; and
 an optical system, including one or more deflectors configured to project the at least two laser light beams toward a field of view of the LIDAR system,
 wherein beam divergence causes the at least two laser light beams to at least partially overlap with one another in an overlap zone within the field of view,
 wherein each of the at least two laser light beams has an energy density below an eye safe level, but wherein a total combined energy density of the at least two laser light beams is above an eye safe level, and wherein the at least two laser light beams are projected toward the field of view such that chief rays associated with the at least two laser light beams are projected parallel to each other from the optical system toward the field of view and are spaced apart from one another by at least 7 mm.

2. The system of claim 1, wherein each of the at least two laser light beams is associated with a divergence of at least 0.03 degrees, and the overlap zone begins at about 4 meters from an origin of the at least two laser light beams.

3. The system of claim 1, wherein within the overlap zone, a total combined energy density of the at least two laser light beams is below an eye safe level and combined light associated with at least a portion of each of the at least two laser light beams is available for object detection.

4. The system of claim 3, wherein the combined light in the overlap zone is eye safe.

5. The system of claim 1, wherein the at least two laser light beams are projected toward the field of view such that chief rays associated with the at least two laser light beams are spaced apart from one another by between 7 mm and 20 mm.

6. The system of claim 1, wherein the at least two laser light beams are projected toward the field of view such that chief rays associated with the at least two laser light beams are spaced apart from one another by between 7 mm and 10 mm.

7. The system of claim 1, wherein the at least two laser light beams are generated by splitting at least one primary laser beam into two or more sub-beams.

8. The system of claim 7, wherein the LIDAR system further includes a beam splitter configured to split the at least one primary laser beam into the two or more sub-beams.

9. The system of claim 1, wherein the at least two laser light beams are provided by a laser array.

10. The system of claim 1, wherein the at least two laser light beams are provided by discrete lasers.

11. The system of claim 1, wherein the one or more deflectors include a common deflector configured to receive the at least two laser light beams.

12. The system of claim 1, wherein each of the at least two laser light beams is incident upon a different deflector of the one or more deflectors.

13. The system of claim 1, wherein each of the one or more deflectors includes a two-dimensional light deflector.

14. The system of claim 1, wherein each of the one or more deflectors includes a first one-dimensional light deflector configured to rotate in a first direction and a second one-dimensional light deflector configured to rotate in a second direction different from the first direction.

15. The system of claim 1, wherein no more than one chief ray associated with the at least two laser light beams can enter a human eye simultaneously.

16. The system of claim 1, wherein the one or more deflectors are also configured to receive light reflections from the field of view of the LIDAR system.

17. The system of claim 1, wherein the LIDAR system further includes at least one processor programmed to control positioning of the one or more deflectors to scan the field of view of the LIDAR system with the at least two laser light beams.

* * * * *